(12) United States Patent
Eagelberg et al.

(10) Patent No.: US 11,960,293 B2
(45) Date of Patent: *Apr. 16, 2024

(54) SYSTEMS AND METHODS FOR NAVIGATING LANE MERGES AND LANE SPLITS

(71) Applicant: MOBILEYE VISION TECHNOLOGIES LTD., Jerusalem (IL)

(72) Inventors: Dor Eagelberg, Jerusalem (IL); Gideon Stein, Jerusalem (IL); Yoav Taieb, Jerusalem (IL); Yoram Gdalyahu, Jerusalem (IL); Ofer Fridman, Jerusalem (IL)

(73) Assignee: Mobileye Vision Technologies Ltd., Jerusalem (IL)

( * ) Notice: Subject to any disclaimer, the term of this patent is extended or adjusted under 35 U.S.C. 154(b) by 93 days.

This patent is subject to a terminal disclaimer.

(21) Appl. No.: 17/824,508

(22) Filed: May 25, 2022

(65) Prior Publication Data
US 2022/0283591 A1 Sep. 8, 2022

Related U.S. Application Data

(63) Continuation of application No. 16/939,359, filed on Jul. 27, 2020, now Pat. No. 11,392,135, which is a
(Continued)

(51) Int. Cl.
*G05D 1/02* (2020.01)
*B60W 30/09* (2012.01)
(Continued)

(52) U.S. Cl.
CPC .......... *G05D 1/0246* (2013.01); *B60W 30/09* (2013.01); *G01C 21/34* (2013.01); *G05D 1/0088* (2013.01);
(Continued)

(58) Field of Classification Search
CPC ............... G05D 1/0246; G05D 1/0088; G05D 2201/0213; G06K 9/00791; G06K 9/00798; G06K 9/00805; B06N 3/00; G01C 21/34
See application file for complete search history.

(56) References Cited

U.S. PATENT DOCUMENTS 7,151,996 B2 12/2006 Stein
2005/0002558 A1 1/2005 Franke et al.
(Continued)

FOREIGN PATENT DOCUMENTS

CN 104870288 A 8/2015
CN 105008200 A 10/2015
(Continued)

OTHER PUBLICATIONS

International Search Report and Written Opinion for PCT Application No. PCT/US2017/059327, dated May 30, 2018 (15 pages).
(Continued)

*Primary Examiner* — Thomas Ingram
(74) *Attorney, Agent, or Firm* — Finnegan, Henderson, Farabow, Garrett & Dunner, LLP

(57) ABSTRACT

Systems and methods are provided for navigating an autonomous vehicle. In one implementation, a system includes a processing device programmed to receive a plurality of images representative of an environment of the host vehicle. The environment includes a road on which the host vehicle is traveling. The at least one processing device is further programmed to analyze the images to identify a target vehicle traveling in a lane of the road different from a lane in which the host vehicle is traveling; analyze the images to identify a lane mark associated with the lane in which the target vehicle is traveling; detect lane mark characteristics of the identified lane mark; use the detected lane mark characteristics to determine a type of the identified lane mark;
(Continued)

determine a characteristic of the target vehicle; and determine a navigational action for the host vehicle based on the determined lane mark type and the determined characteristic of the target vehicle.

37 Claims, 35 Drawing Sheets

Related U.S. Application Data continuation of application No. 15/799,428, filed on Oct. 31, 2017, now Pat. No. 10,739,782.

(60) Provisional application No. 62/415,135, filed on Oct. 31, 2016.

(51) Int. Cl.
*G01C 21/34* (2006.01)
*G05D 1/00* (2006.01)
*G06N 3/045* (2023.01)
*G06V 20/56* (2022.01)
*G06V 20/58* (2022.01)

(52) U.S. Cl.
CPC ............ *G06V 20/58* (2022.01); *G06V 20/588* (2022.01); *G05D 2201/0213* (2013.01); *G06N 3/045* (2023.01)

(56) References Cited

U.S. PATENT DOCUMENTS

| | | | |
|---|---|---|---|
| 2005/0015203 A1* | 1/2005 | Nishira | B60W 50/16 340/436 |
| 2007/0150196 A1* | 6/2007 | Grimm | B60T 7/22 348/148 |
| 2012/0166017 A1* | 6/2012 | Kobayashi | B60T 7/22 701/1 |
| 2013/0208945 A1* | 8/2013 | Nunn | G06V 20/588 382/103 |
| 2014/0129073 A1* | 5/2014 | Ferguson | B60W 30/18163 701/23 |
| 2014/0195093 A1* | 7/2014 | Litkouhi | B60W 30/18163 701/23 |
| 2014/0236414 A1 | 8/2014 | Droz et al. | |
| 2015/0100216 A1* | 4/2015 | Rayes | G01S 13/867 701/96 |
| 2015/0354976 A1 | 12/2015 | Ferencz et al. | |
| 2015/0363934 A1* | 12/2015 | Ko | G06T 7/73 701/431 |
| 2015/0367778 A1 | 12/2015 | Vladimerou et al. | |
| 2016/0132705 A1* | 5/2016 | Kovarik | G06K 7/10376 340/10.3 |
| 2016/0229410 A1 | 8/2016 | Clarke et al. | |
| 2017/0132933 A1* | 5/2017 | Habu | B60Q 5/006 |

FOREIGN PATENT DOCUMENTS

| | | |
|---|---|---|
| CN | 105300401 A | 2/2016 |
| JP | 2005-038325 | 2/2005 |
| WO | WO 2014/130178 A1 | 8/2014 |

OTHER PUBLICATIONS

Armingol et al: "IVVI: Intelligent vehicle based on visual information", Robotics and Autonomous Systems, vol. 55, No. 12, pp. 904-916, dated Nov. 5, 2007.

Sivaraman Sayanan et al: "Looking at Vehicles on the Road: A Survey of Vision-Based Vehicle Detection, Tracking, and Behavior Analysis", IEEE Transactions on Intelligent Transportation Systems, vol. 14, No. 4, pp. 1773-1795, dated Dec. 1, 2013.

Extended European Search Report received from European Patent Office for European Patent Application No. 20214370.7, dated May 10, 2021 (10 pages).

Office Action received from Chinese Patent Office for Chinese Patent Application No. 201780067421.8, dated Dec. 1, 2022 (11 pages) with English Translation (15 pages).

Office Action received from Chinese Patent Office for Chinese Patent Application No. 201780067421.8, dated May 30, 2023 with English Translation (11 pages).

Office Action received from Korean Patent Office for Korean Patent Application No. 10-2019-7013557, dated Jul. 20, 2022 (6 pages) with English Translation (8 pages).

* cited by examiner

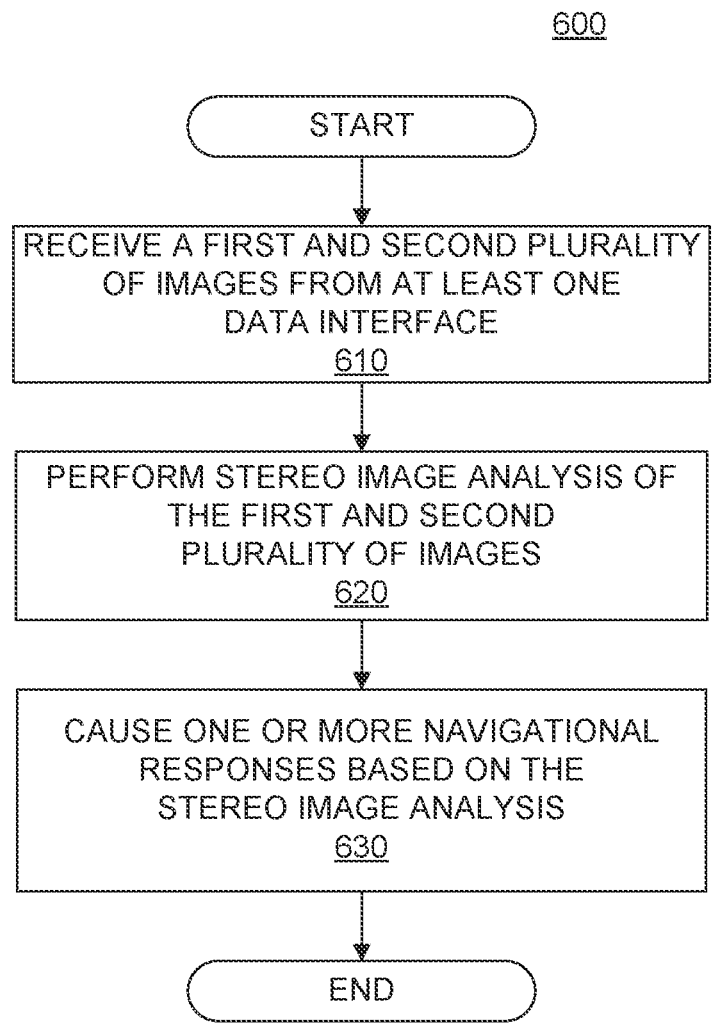

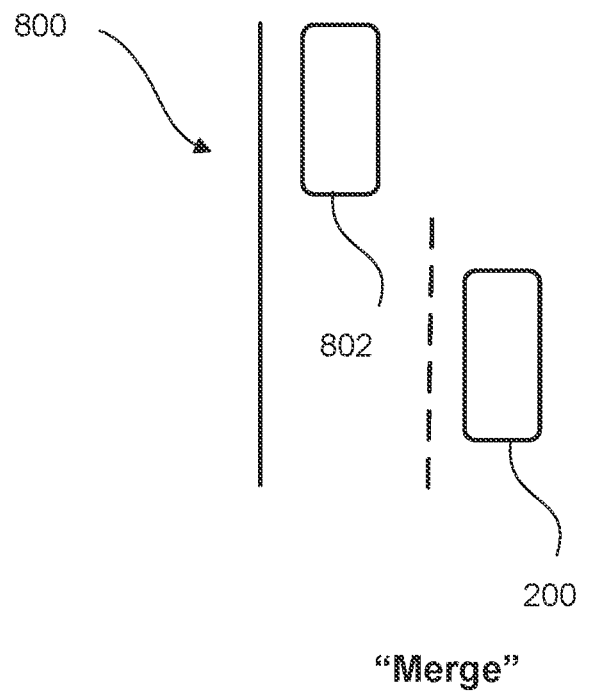
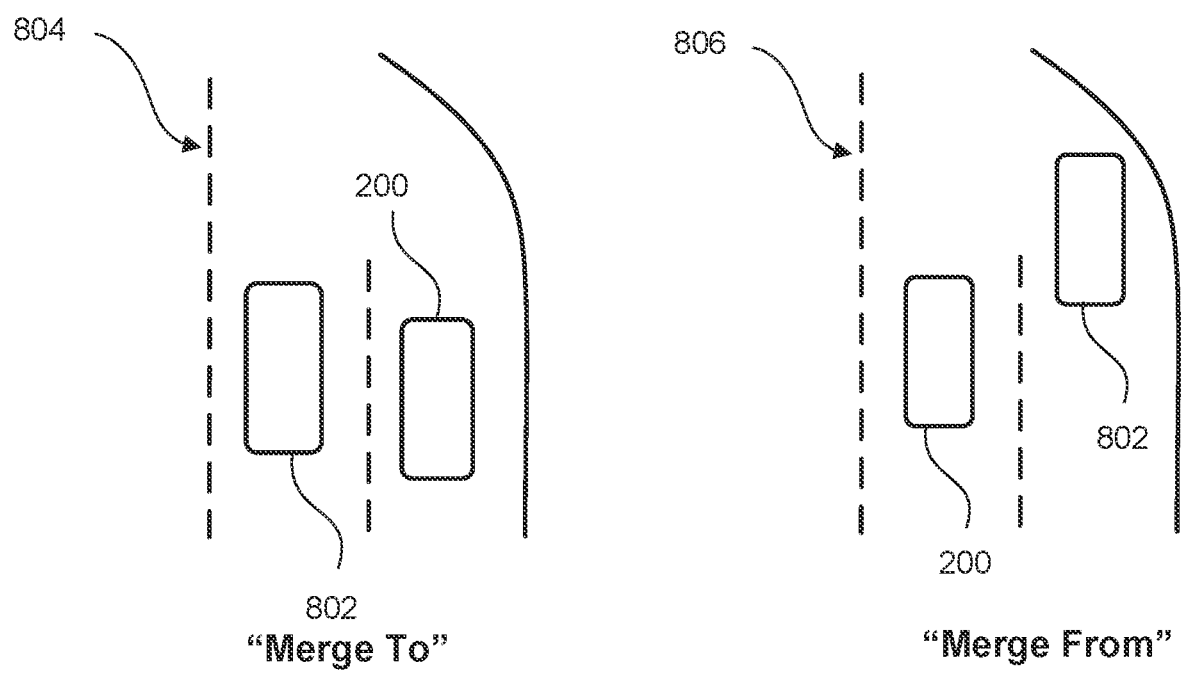
FIG. 8A

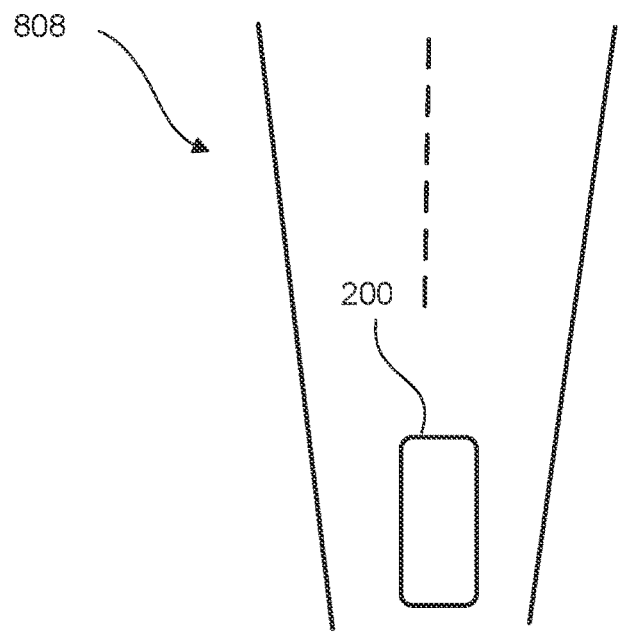
"Split"
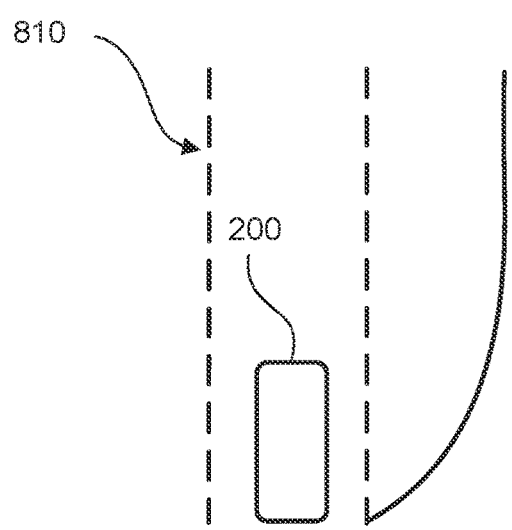
"Lane Open"
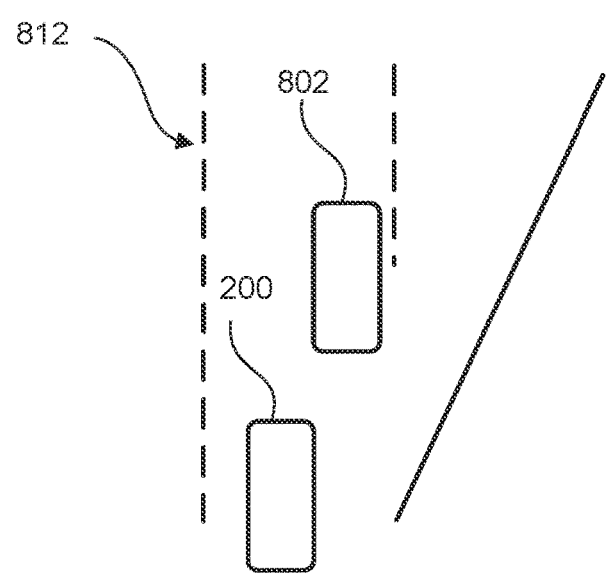
"Lane Expansion"
FIG. 8B

SYSTEMS AND METHODS FOR NAVIGATING LANE MERGES AND LANE SPLITS

CROSS REFERENCE TO RELATED APPLICATION

This application is a continuation of application Ser. No. 16/939,359, filed Jul. 27, 2020, which is a continuation of application Ser. No. 15/799,428, filed Oct. 31, 2017 (now U.S. Pat. No. 10,739,782, issued Aug. 11, 2020), which claims the benefit of priority of U.S. Provisional Patent Application No. 62/415,135, filed Oct. 31, 2016. The foregoing applications are incorporated herein by reference in their entirety.

BACKGROUND

Technical Field

The present disclosure relates generally to autonomous vehicle navigation. Additionally, this disclosure relates to systems and methods and systems for identifying lane marks, determining lane mark types, and navigating lane merges and lane splits.

Background Information

As technology continues to advance, the goal of a fully autonomous vehicle that is capable of navigating on roadways is on the horizon. Autonomous vehicles may need to take into account a variety of factors and make appropriate decisions based on those factors to safely and accurately reach an intended destination. For example, an autonomous vehicle may need to process and interpret visual information (e.g., information captured from a camera), information from radar or lidar, and may also use information obtained from other sources (e.g., from a GPS device, a speed sensor, an accelerometer, a suspension sensor, etc.). At the same time, in order to navigate to a destination, an autonomous vehicle may also need to identify its location within a particular roadway (e.g., a specific lane within a multi-lane road), navigate alongside other vehicles, avoid obstacles and pedestrians, observe traffic signals and signs, travel from one road to another road at appropriate intersections or interchanges, and respond to any other situation that occurs or develops during the vehicle's operation. Still further, an autonomous vehicle may also need to take into account road characteristics, such as different types of lane marks.

While navigating, an autonomous vehicle may typically travel on a road that includes lanes of various types. For example, the lane in which an autonomous vehicle is traveling may merge with an adjacent lane. In some instances, another vehicle in range of the autonomous vehicle may be traveling in a neighboring lane that is ending and may merge in front of the autonomous vehicle. As another example, the lane in which an autonomous vehicle is traveling may split to form an additional adjacent lane, such as an exit lane. In some instances, another vehicle ahead of the autonomous vehicle may change lanes or exit a road and no longer be positioned ahead of the autonomous vehicle. In each of these situations, the autonomous vehicle may need to take these lane changes and any potential maneuvers neighboring vehicles may make in view of the lane changes into consideration while navigating. Moreover, when these lane changes occur, the autonomous vehicle may need to make an adjustment to its navigational path or speed to travel safely and accurately.

SUMMARY

Embodiments consistent with the present disclosure provide systems and methods for autonomous vehicle navigation. The disclosed embodiments may use cameras to provide autonomous vehicle navigation features. For example, consistent with the disclosed embodiments, the disclosed systems may include one, two, or more cameras that monitor the environment of a vehicle. The disclosed systems may determine one or more navigational actions for the vehicle on, for example, an analysis of images captured by one or more of the cameras. The one or more navigational actions may also take into account other data including, for example, global positioning system (GPS) data, sensor data (e.g., from an accelerometer, a speed sensor, a suspension sensor, etc.), and/or other map data.

In one embodiment, a system for navigating a host vehicle is disclosed. The system may include at least one processing device programmed to receive, from an image capture device, a plurality of images representative of an environment of the host vehicle. The environment includes a road on which the host vehicle is traveling. The at least one processing device is further programmed to analyze at least one of the plurality of images to identify a target vehicle traveling in a lane of the road different from a lane in which the host vehicle is traveling; analyze at least one of the plurality of images to identify at least one lane mark associated with the lane in which the target vehicle is traveling; detect one or more lane mark characteristics of the at least one identified lane mark; use the one or more detected lane mark characteristics to determine a type of the at least one identified lane mark; determine at least one characteristic of the target vehicle; and determine a navigational action for the host vehicle based on the determined lane mark type and the determined characteristic of the target vehicle.

In another embodiment, a system for navigating a host vehicle is disclosed. The system may include at least one processing device programmed to receive, from an image capture device, a plurality of images representative of an environment of the host vehicle. The environment includes a road on which the host vehicle is traveling. The at least one processing device is further programmed to analyze at least one of the plurality of images to identify a target vehicle traveling in a lane of the road in which the host vehicle is traveling; analyze at least one of the plurality of images to identify at least one lane mark associated with the lane; detect one or more characteristics of the at least one identified lane mark; use the one or more detected lane mark characteristics to determine a type of the at least one identified lane mark; determine at least one characteristic of the target vehicle; and determine a navigational action for the host vehicle based on the determined lane mark type and the determined characteristic of the target vehicle.

In another embodiment, a method for navigating a host vehicle is disclosed. The method includes receiving, from an image capture device, a plurality of images representative of an environment of the host vehicle, the environment including a road on which the host vehicle is traveling; analyzing, by at least one processing device, at least one of the plurality of images to identify a target vehicle traveling in a lane of the road different from a lane in which the host vehicle is traveling; analyzing at least one of the plurality of images to identify at least one lane mark associated with the lane in which the target vehicle is traveling; detecting one or more lane mark characteristics of the at least one identified lane mark; use the one or more detected lane mark characteristics to determine a type of the at least one identified lane mark; determining at least one characteristic of the target vehicle; and determining a navigational action for the host vehicle based on the determined lane mark type and the determined characteristic of the target vehicle.

In yet another embodiment, a method for navigating a host vehicle is disclosed. The method includes receiving, from an image capture device, a plurality of images representative of an environment of the host vehicle, the environment including a road on which the host vehicle is traveling; analyzing, by at least one processing device, at least one of the plurality of images to identify a target vehicle traveling in a lane of the road in which the host vehicle is traveling; analyzing at least one of the plurality of images to identify at least one lane mark associated with the lane; detecting one or more characteristics of the at least one identified lane mark; use the one or more detected lane mark characteristics to determine a type of the at least one identified lane mark; determining at least one characteristic of the target vehicle; and determining a navigational action for the host vehicle based on the determined lane mark type and the determined characteristic of the target vehicle.

Consistent with other disclosed embodiments, non-transitory computer-readable storage media may store program instructions, which are executed by at least one processing device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIG. 6 is a flowchart showing an exemplary process for causing one or more navigational responses based on stereo image analysis consistent with the disclosed embodiments.

FIG. 8A is an illustration of exemplary lane merges on a roadway consistent with the disclosed embodiments.

FIG. 8B is an illustration of exemplary lane splits on a roadway consistent with the disclosed embodiments.

DETAILED DESCRIPTION

Figure 1:
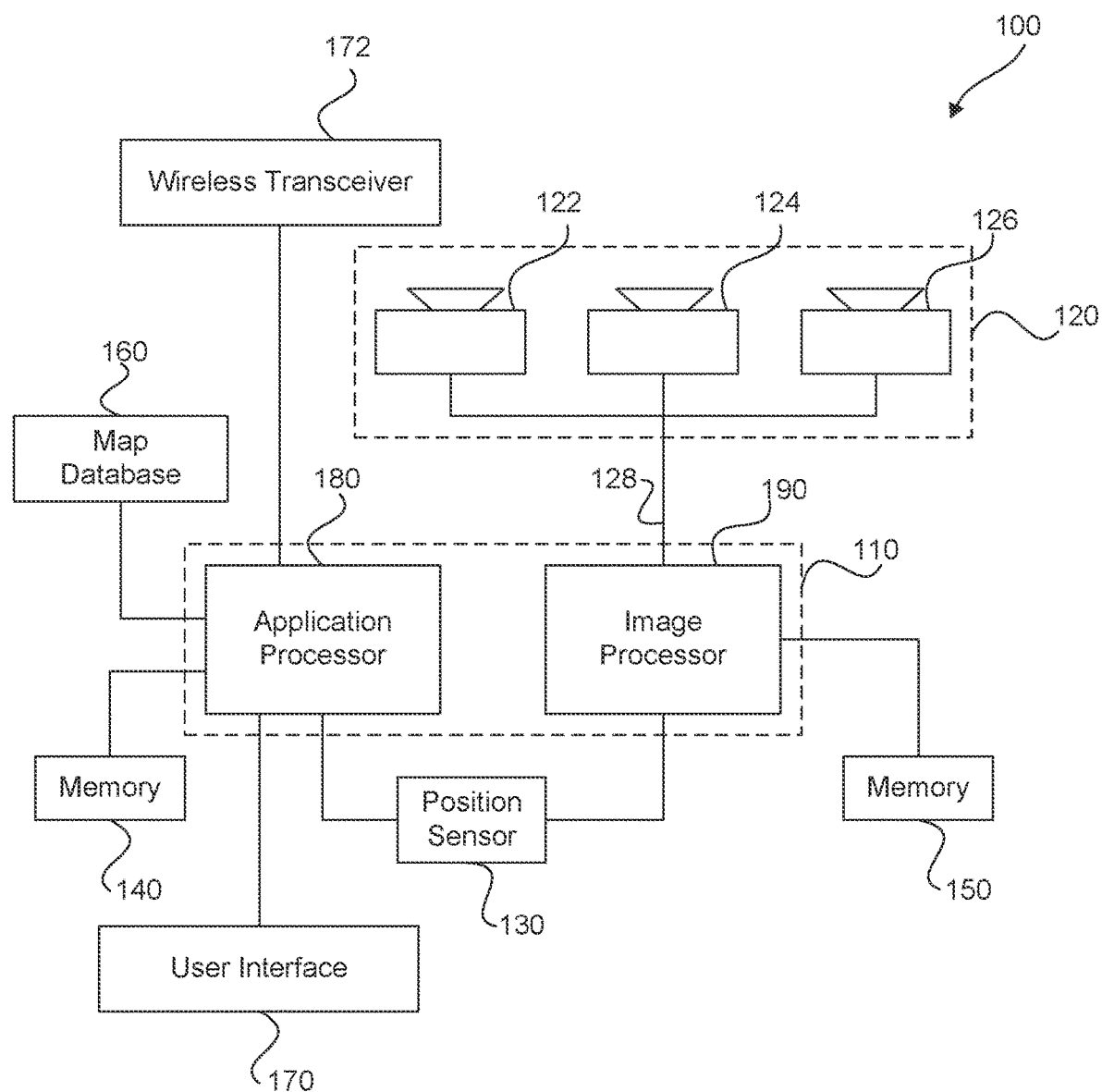
FIG. 1 is a diagrammatic representation of an exemplary system consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

Autonomous Vehicle Overview

As used throughout this disclosure, the term "autonomous vehicle" refers to a vehicle capable of implementing at least one navigational change without driver input. A "navigational change" refers to a change in one or more of steering, braking, or acceleration/deceleration of the vehicle. To be autonomous, a vehicle need not be fully automatic (e.g., fully operational without a driver or without driver input). Rather, an autonomous vehicle includes those that can operate under driver control during certain time periods and without driver control during other time periods. Autonomous vehicles may also include vehicles that control only some aspects of vehicle navigation, such as steering (e.g., to maintain a vehicle course between vehicle lane constraints) or some steering operations under certain circumstances (but not under all circumstances), but may leave other aspects to the driver (e.g., braking or braking under certain circumstances). In some cases, autonomous vehicles may handle some or all aspects of braking, speed control, and/or steering of the vehicle.

As human drivers typically rely on visual cues and observations in order to control a vehicle, transportation infrastructures are built accordingly, with lane markings, traffic signs, and traffic lights designed to provide visual information to drivers. In view of these design characteristics of transportation infrastructures, an autonomous vehicle may include a camera and a processing unit that analyzes visual information captured from the environment of the vehicle. The visual information may include, for example, images representing components of the transportation infrastructure (e.g., lane markings, traffic signs, traffic lights, etc.) that are observable by drivers and other obstacles (e.g., other vehicles, pedestrians, debris, etc.). Additionally, an autonomous vehicle may also use stored information, such as information that provides a model of the vehicle's environment when navigating. For example, the vehicle may use GPS data, sensor data (e.g., from an accelerometer, a speed sensor, a suspension sensor, etc.), and/or other map data to provide information related to its environment while it is traveling, and the vehicle (as well as other vehicles) may use the information to localize itself on the model. Some vehicles can also be capable of communication among them, sharing information, altering the peer vehicle of hazards or changes in the vehicles' surroundings, etc.

System Overview

FIG. 1 is a block diagram representation of a system 100 consistent with the exemplary disclosed embodiments. System 100 may include various components depending on the requirements of a particular implementation. In some embodiments, system 100 may include a processing unit 110, an image acquisition unit 120, a position sensor 130, one or more memory units 140, 150, a map database 160, a user interface 170, and a wireless transceiver 172. Processing unit 110 may include one or more processing devices. In some embodiments, processing unit 110 may include an applications processor 180, an image processor 190, or any other suitable processing device. Similarly, image acquisition unit 120 may include any number of image acquisition devices and components depending on the requirements of a particular application. In some embodiments, image acquisition unit 120 may include one or more image capture devices (e.g., cameras, CCDs, or any other type of image sensor), such as image capture device 122, image capture device 124, and image capture device 126. System 100 may also include a data interface 128 communicatively connecting processing unit 110 to image acquisition unit 120. For example, data interface 128 may include any wired and/or wireless link or links for transmitting image data acquired by image acquisition unit 120 to processing unit 110.

Wireless transceiver 172 may include one or more devices configured to exchange transmissions over an air interface to one or more networks (e.g., cellular, the Internet, etc.) by use of a radio frequency, infrared frequency, magnetic field, or an electric field. Wireless transceiver 172 may use any known standard to transmit and/or receive data (e.g., Wi-Fi, Bluetooth®, Bluetooth Smart, 802.15.4, ZigBee, etc.). Such transmissions can include communications from the host vehicle to one or more remotely located servers. Such transmissions may also include communications (one-way or two-way) between the host vehicle and one or more target vehicles in an environment of the host vehicle (e.g., to facilitate coordination of navigation of the host vehicle in view of or together with target vehicles in the environment of the host vehicle), or even a broadcast transmission to unspecified recipients in a vicinity of the transmitting vehicle.

Both applications processor 180 and image processor 190 may include various types of hardware-based processing devices. For example, either or both of applications processor 180 and image processor 190 may include a microprocessor, preprocessors (such as an image preprocessor), graphics processors, a central processing unit (CPU), support circuits, digital signal processors, integrated circuits, memory, or any other types of devices suitable for running applications and for image processing and analysis. In some embodiments, applications processor 180 and/or image processor 190 may include any type of single or multi-core processor, mobile device microcontroller, central processing unit, etc. Various processing devices may be used, including, for example, processors available from manufacturers such as Intel®, AMD®, etc. and may include various architectures (e.g., x86 processor, ARM®, etc.).

In some embodiments, applications processor 180 and/or image processor 190 may include any of the EyeQ series of processor chips available from Mobileye®. These processor designs each include multiple processing units with local memory and instruction sets. Such processors may include video inputs for receiving image data from multiple image sensors and may also include video out capabilities. In one example, the EyeQ2® uses 90 nm-micron technology operating at 332 Mhz. The EyeQ2® architecture consists of two floating point, hyper-thread 32-bit RISC CPUs (MIPS32® 34K® cores), five Vision Computing Engines (VCE), three Vector Microcode Processors (VMP®), Denali 64-bit Mobile DDR Controller, 128-bit internal Sonics Interconnect, dual 16-bit Video input and 18-bit Video output controllers, 16 channels DMA and several peripherals. The MIPS34K CPU manages the five VCEs, three VMP™ and the DMA, the second MIPS34K CPU and the multi-channel DMA as well as the other peripherals. The five VCEs, three VMP® and the MIPS34K CPU can perform intensive vision computations required by multi-function bundle applications. In another example, the EyeQ3®, which is a third generation processor and is six times more powerful that the EyeQ2®, may be used in the disclosed embodiments. In other examples, the EyeQ4® and/or the EyeQ5® may be used in the disclosed embodiments. Of course, any newer or future EyeQ processing devices may also be used together with the disclosed embodiments.

Any of the processing devices disclosed herein may be configured to perform certain functions. Configuring a processing device, such as any of the described EyeQ processors or other controller or microprocessor, to perform certain functions may include programming of computer executable instructions and making those instructions available to the processing device for execution during operation of the processing device. In some embodiments, configuring a processing device may include programming the processing device directly with architectural instructions. In other embodiments, configuring a processing device may include storing executable instructions on a memory that is accessible to the processing device during operation. For example, the processing device may access the memory to obtain and execute the stored instructions during operation. In either case, the processing device configured to perform the sensing, image analysis, and/or navigational functions disclosed herein represents a specialized hardware-based system in control of multiple hardware based components of a host vehicle.

While FIG. 1 depicts two separate processing devices included in processing unit 110, more or fewer processing devices may be used. For example, in some embodiments, a single processing device may be used to accomplish the tasks of applications processor 180 and image processor 190. In other embodiments, these tasks may be performed by more than two processing devices. Further, in some embodiments, system 100 may include one or more of processing unit 110 without including other components, such as image acquisition unit 120.

Processing unit 110 may comprise various types of devices. For example, processing unit 110 may include various devices, such as a controller, an image preprocessor, a central processing unit (CPU), support circuits, digital signal processors, integrated circuits, memory, or any other types of devices for image processing and analysis. The image preprocessor may include a video processor for capturing, digitizing and processing the imagery from the image sensors. The CPU may comprise any number of microcontrollers or microprocessors. The support circuits may be any number of circuits generally well known in the art, including cache, power supply, clock and input-output circuits. The memory may store software that, when executed by the processor, controls the operation of the system. The memory may include databases and image processing software. The memory may comprise any number of random access memories, read only memories, flash memories, disk drives, optical storage, tape storage, removable storage and other types of storage. In one instance, the memory may be separate from the processing unit 110. In another instance, the memory may be integrated into the processing unit 110.

Each memory 140, 150 may include software instructions that when executed by a processor (e.g., applications processor 180 and/or image processor 190), may control operation of various aspects of system 100. These memory units may include various databases and image processing software, as well as a trained system, such as a neural network, or a deep neural network, for example. The memory units may include random access memory, read only memory, flash memory, disk drives, optical storage, tape storage, removable storage and/or any other types of storage. In some embodiments, memory units 140, 150 may be separate from the applications processor 180 and/or image processor 190. In other embodiments, these memory units may be integrated into applications processor 180 and/or image processor 190.

Position sensor 130 may include any type of device suitable for determining a location associated with at least one component of system 100. In some embodiments, position sensor 130 may include a GPS receiver. Such receivers can determine a user position and velocity by processing signals broadcasted by global positioning system satellites. Position information from position sensor 130 may be made available to applications processor 180 and/or image processor 190.

In some embodiments, system 100 may include components such as a speed sensor (e.g., a speedometer) for measuring a speed of vehicle 200. System 100 may also include one or more accelerometers (either single axis or multiaxis) for measuring accelerations of vehicle 200 along one or more axes.

The memory units 140, 150 may include a database, or data organized in any other form, that indication a location of known landmarks. Sensory information (such as images, radar signal, depth information from lidar or stereo processing of two or more images) of the environment may be processed together with position information, such as a GPS coordinate, vehicle's ego motion, etc. to determine a current location of the vehicle relative to the known landmarks, and refine the vehicle location. Certain aspects of this technology are included in a localization technology known as REM™, which is being marketed by the assignee of the present application.

User interface 170 may include any device suitable for providing information to or for receiving inputs from one or more users of system 100. In some embodiments, user interface 170 may include user input devices, including, for example, a touchscreen, microphone, keyboard, pointer devices, track wheels, cameras, knobs, buttons, etc. With such input devices, a user may be able to provide information inputs or commands to system 100 by typing instructions or information, providing voice commands, selecting menu options on a screen using buttons, pointers, or eye-tracking capabilities, or through any other suitable techniques for communicating information to system 100.

User interface 170 may be equipped with one or more processing devices configured to provide and receive information to or from a user and process that information for use by, for example, applications processor 180. In some embodiments, such processing devices may execute instructions for recognizing and tracking eye movements, receiving and interpreting voice commands, recognizing and interpreting touches and/or gestures made on a touchscreen, responding to keyboard entries or menu selections, etc. In some embodiments, user interface 170 may include a display, speaker, tactile device, and/or any other devices for providing output information to a user.

Map database 160 may include any type of database for storing map data useful to system 100. In some embodiments, map database 160 may include data relating to the position, in a reference coordinate system, of various items, including roads, water features, geographic features, businesses, points of interest, restaurants, gas stations, etc. Map database 160 may store not only the locations of such items, but also descriptors relating to those items, including, for example, names associated with any of the stored features. In some embodiments, map database 160 may be physically located with other components of system 100. Alternatively or additionally, map database 160 or a portion thereof may be located remotely with respect to other components of system 100 (e.g., processing unit 110). In such embodiments, information from map database 160 may be downloaded over a wired or wireless data connection to a network (e.g., over a cellular network and/or the Internet, etc.). In some cases, map database 160 may store a sparse data model including polynomial representations of certain road features (e.g., lane markings) or target trajectories for the host vehicle. Map database 160 may also include stored representations of various recognized landmarks that may be used to determine or update a known position of the host vehicle with respect to a target trajectory. The landmark representations may include data fields such as landmark type, landmark location, among other potential identifiers.

Image capture devices 122, 124, and 126 may each include any type of device suitable for capturing at least one image from an environment. Moreover, any number of image capture devices may be used to acquire images for input to the image processor. Some embodiments may include only a single image capture device, while other embodiments may include two, three, or even four or more image capture devices. Image capture devices 122, 124, and 126 will be further described with reference to FIGS. 2B-2E, below.

One or more cameras (e.g., image capture devices 122, 124, and 126) may be part of a sensing block included on a vehicle. Various other sensors may be included in the sensing block, and any or all of the sensors may be relied upon to develop a sensed navigational state of the vehicle. In addition to cameras (forward, sideward, rearward, etc.), other sensors such as RADAR, LIDAR, and acoustic sensors may be included in the sensing block. Additionally, the sensing block may include one or more components configured to communicate and transmit/receive information relating to the environment of the vehicle. For example, such components may include wireless transceivers (RF, etc.) that may receive from a source remotely located with respect to the host vehicle sensor based information or any other type of information relating to the environment of the host vehicle. Such information may include sensor output information, or related information, received from vehicle systems other than the host vehicle. In some embodiments, such information may include information received from a remote computing device, a centralized server, etc. Furthermore, the cameras may take on many different configurations: single camera units, multiple cameras, camera clusters, long FOV, short FOV, wide angle, fisheye, etc.

Figure 2A:
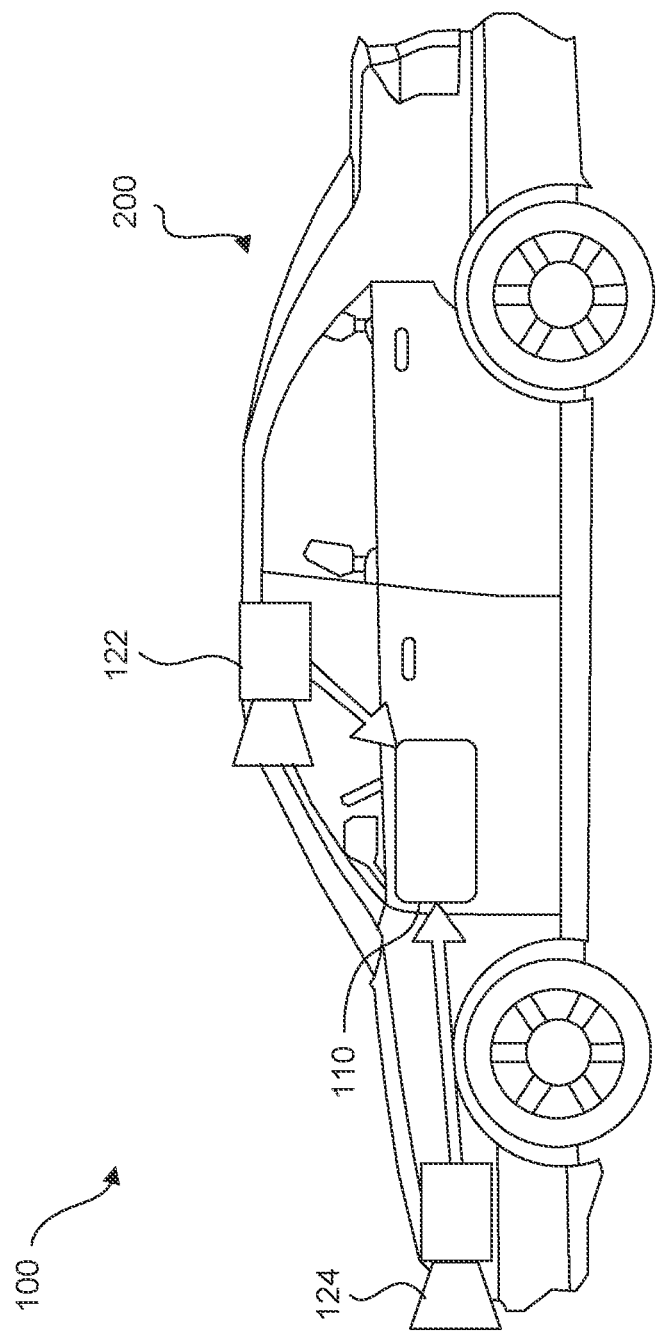
FIG. 2A is a diagrammatic side view representation of an exemplary vehicle including a system consistent with the disclosed embodiments.

System 100, or various components thereof, may be incorporated into various different platforms. In some embodiments, system 100 may be included on a vehicle 200, as shown in FIG. 2A. For example, vehicle 200 may be equipped with a processing unit 110 and any of the other components of system 100, as described above relative to FIG. 1. While in some embodiments vehicle 200 may be equipped with only a single image capture device (e.g., camera), in other embodiments, such as those discussed in connection with FIGS. 2B-2E, multiple image capture devices may be used. For example, either of image capture devices 122 and 124 of vehicle 200, as shown in FIG. 2A, may be part of an ADAS (Advanced Driver Assistance Systems) imaging set.

The image capture devices included on vehicle 200 as part of the image acquisition unit 120 may be positioned at any suitable location. In some embodiments, as shown in FIGS. 2A-2E and 3A-3C, image capture device 122 may be located in the vicinity of the rearview mirror. This position may provide a line of sight similar to that of the driver of vehicle 200, which may aid in determining what is and is not visible to the driver. Image capture device 122 may be positioned at any location near the rearview mirror, but placing image capture device 122 on the driver side of the mirror may further aid in obtaining images representative of the driver's field of view and/or line of sight.

Other locations for the image capture devices of image acquisition unit 120 may also be used. For example, image capture device 124 may be located on or in a bumper of vehicle 200. Such a location may be especially suitable for image capture devices having a wide field of view. The line of sight of bumper-located image capture devices can be different from that of the driver and, therefore, the bumper image capture device and driver may not always see the same objects. The image capture devices (e.g., image capture devices 122, 124, and 126) may also be located in other locations. For example, the image capture devices may be located on or in one or both of the side mirrors of vehicle 200, on the roof of vehicle 200, on the hood of vehicle 200, on the trunk of vehicle 200, on the sides of vehicle 200, mounted on, positioned behind, or positioned in front of any of the windows of vehicle 200, and mounted in or near light fixtures on the front and/or back of vehicle 200, etc.

In addition to image capture devices, vehicle 200 may include various other components of system 100. For example, processing unit 110 may be included on vehicle 200 either integrated with or separate from an engine control unit (ECU) of the vehicle. Vehicle 200 may also be equipped with a position sensor 130, such as a GPS receiver and may also include a map database 160 and memory units 140 and 150.

As discussed earlier, wireless transceiver 172 may and/or receive data over one or more networks (e.g., cellular networks, the Internet, etc.). For example, wireless transceiver 172 may upload data collected by system 100 to one or more servers, and download data from the one or more servers. Via wireless transceiver 172, system 100 may receive, for example, periodic or on demand updates to data stored in map database 160, memory 140, and/or memory 150. Similarly, wireless transceiver 172 may upload any data (e.g., images captured by image acquisition unit 120, data received by position sensor 130 or other sensors, vehicle control systems, etc.) from system 100 and/or any data processed by processing unit 110 to the one or more servers.

System 100 may upload data to a server (e.g., to the cloud) based on a privacy level setting. For example, system 100 may implement privacy level settings to regulate or limit the types of data (including metadata) sent to the server that may uniquely identify a vehicle and or driver/owner of a vehicle. Such settings may be set by user via, for example, wireless transceiver 172, be initialized by factory default settings, or by data received by wireless transceiver 172.

In some embodiments, system 100 may upload data according to a "high" privacy level, and under setting a setting, system 100 may transmit data (e.g., location information related to a route, captured images, etc.) without any details about the specific vehicle and/or driver/owner. For example, when uploading data according to a "high" privacy setting, system 100 may not include a vehicle identification number (VIN) or a name of a driver or owner of the vehicle, and may instead transmit data, such as captured images and/or limited location information related to a route.

Other privacy levels are contemplated as well. For example, system 100 may transmit data to a server according to an "intermediate" privacy level and include additional information not included under a "high" privacy level, such as a make and/or model of a vehicle and/or a vehicle type (e.g., a passenger vehicle, sport utility vehicle, truck, etc.). In some embodiments, system 100 may upload data according to a "low" privacy level. Under a "low" privacy level setting, system 100 may upload data and include information sufficient to uniquely identify a specific vehicle, owner/driver, and/or a portion or entirely of a route traveled by the vehicle. Such "low" privacy level data may include one or more of, for example, a VIN, a driver/owner name, an origination point of a vehicle prior to departure, an intended destination of the vehicle, a make and/or model of the vehicle, a type of the vehicle, etc.

Figure 2B:
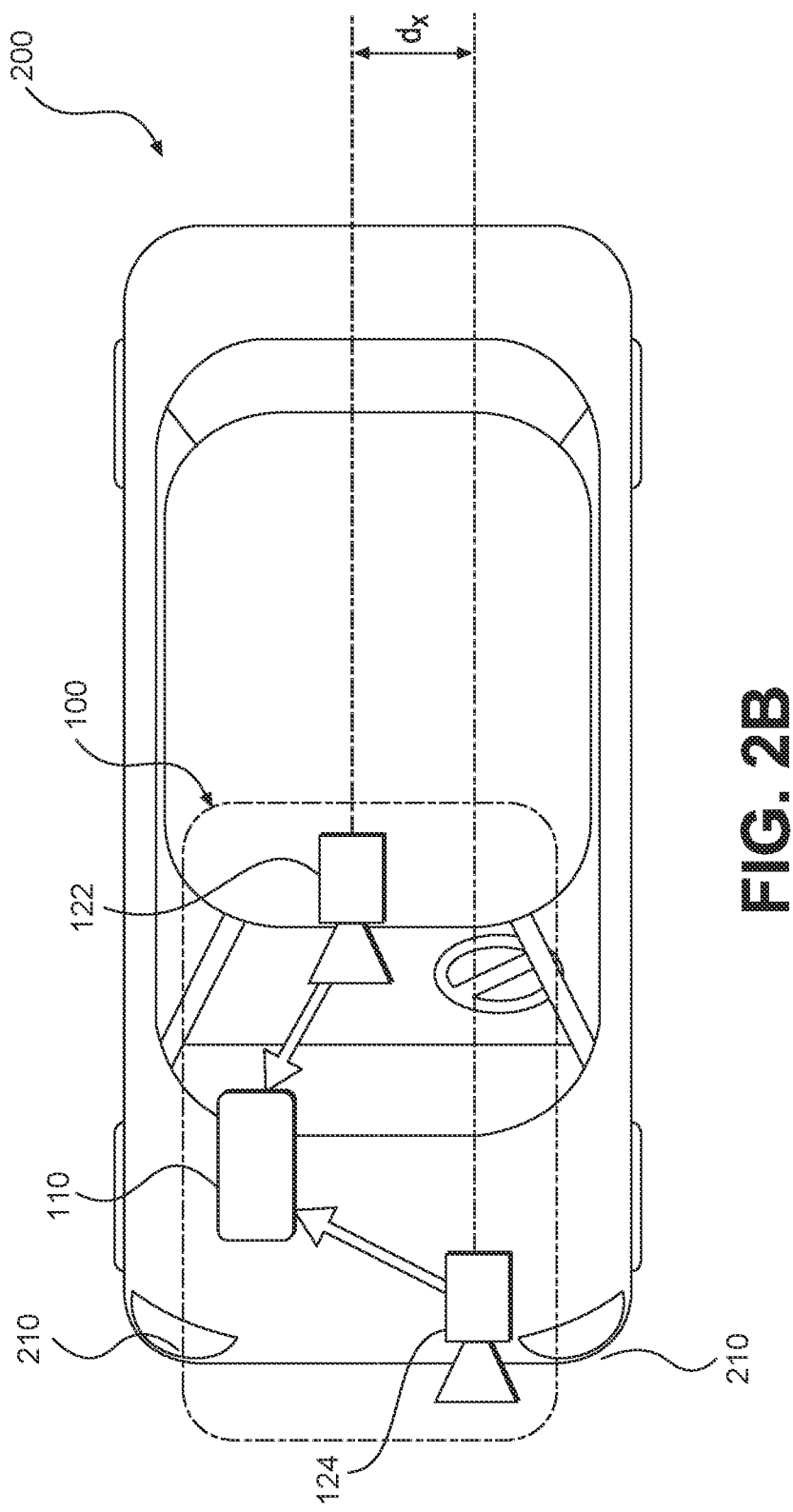
FIG. 2B is a diagrammatic top view representation of the vehicle and system shown in FIG. 2A consistent with the disclosed embodiments.

FIG. 2A is a diagrammatic side view representation of an exemplary vehicle imaging system consistent with the disclosed embodiments. FIG. 2B is a diagrammatic top view illustration of the embodiment shown in FIG. 2A. As illustrated in FIG. 2B, the disclosed embodiments may include a vehicle 200 including in its body a system 100 with a first image capture device 122 positioned in the vicinity of the rearview mirror and/or near the driver of vehicle 200, a second image capture device 124 positioned on or in a bumper region (e.g., one of bumper regions 210) of vehicle 200, and a processing unit 110.

Figure 2C:
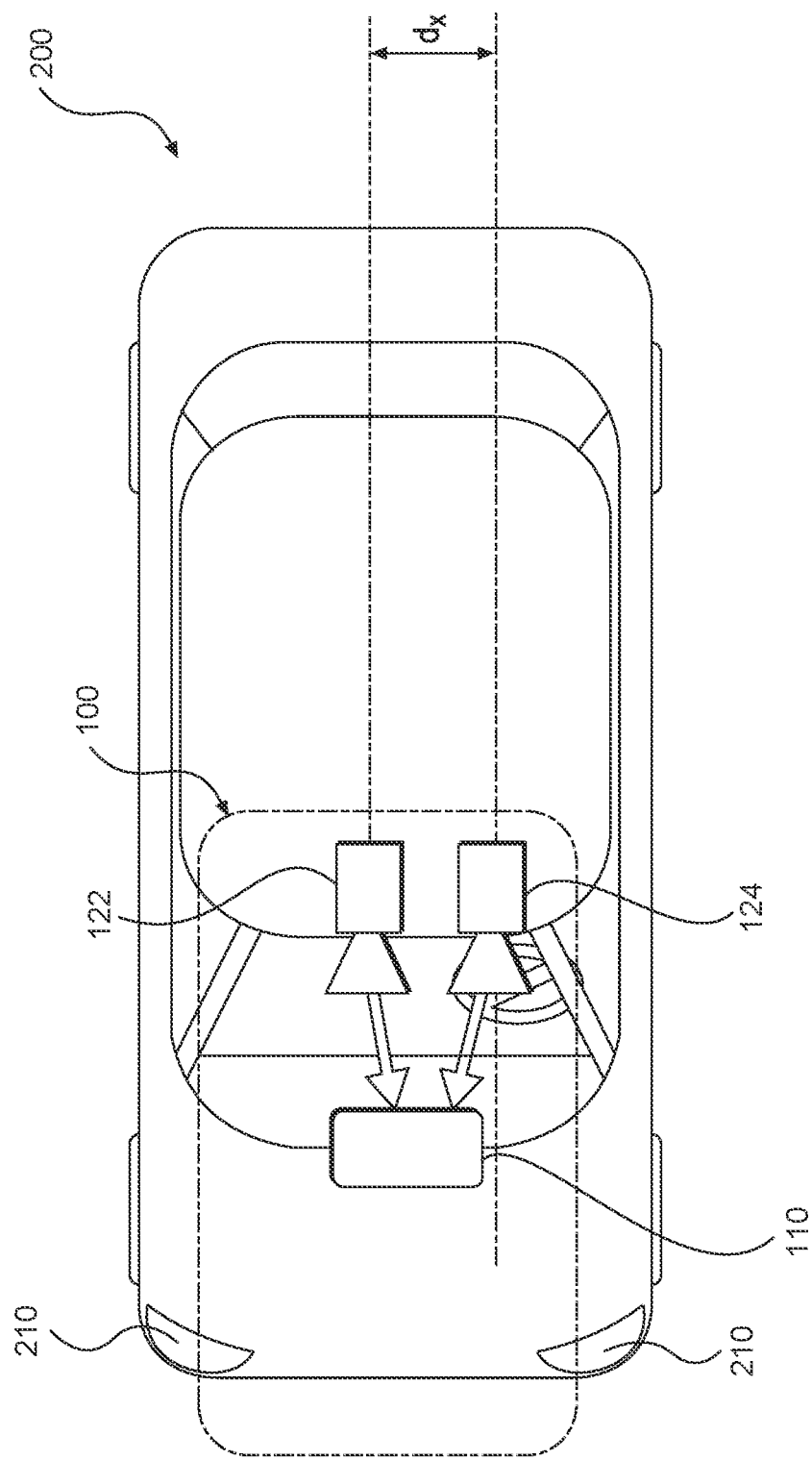
FIG. 2C is a diagrammatic top view representation of another embodiment of a vehicle including a system consistent with the disclosed embodiments.

As illustrated in FIG. 2C, image capture devices 122 and 124 may both be positioned in the vicinity of the rearview mirror and/or near the driver of vehicle 200. Additionally, while two image capture devices 122 and 124 are shown in FIGS. 2B and 2C, it should be understood that other embodiments may include more than two image capture devices. For example, in the embodiments shown in FIGS. 2D and 2E, first, second, and third image capture devices 122, 124, and 126, are included in the system 100 of vehicle 200.

Figure 2D:
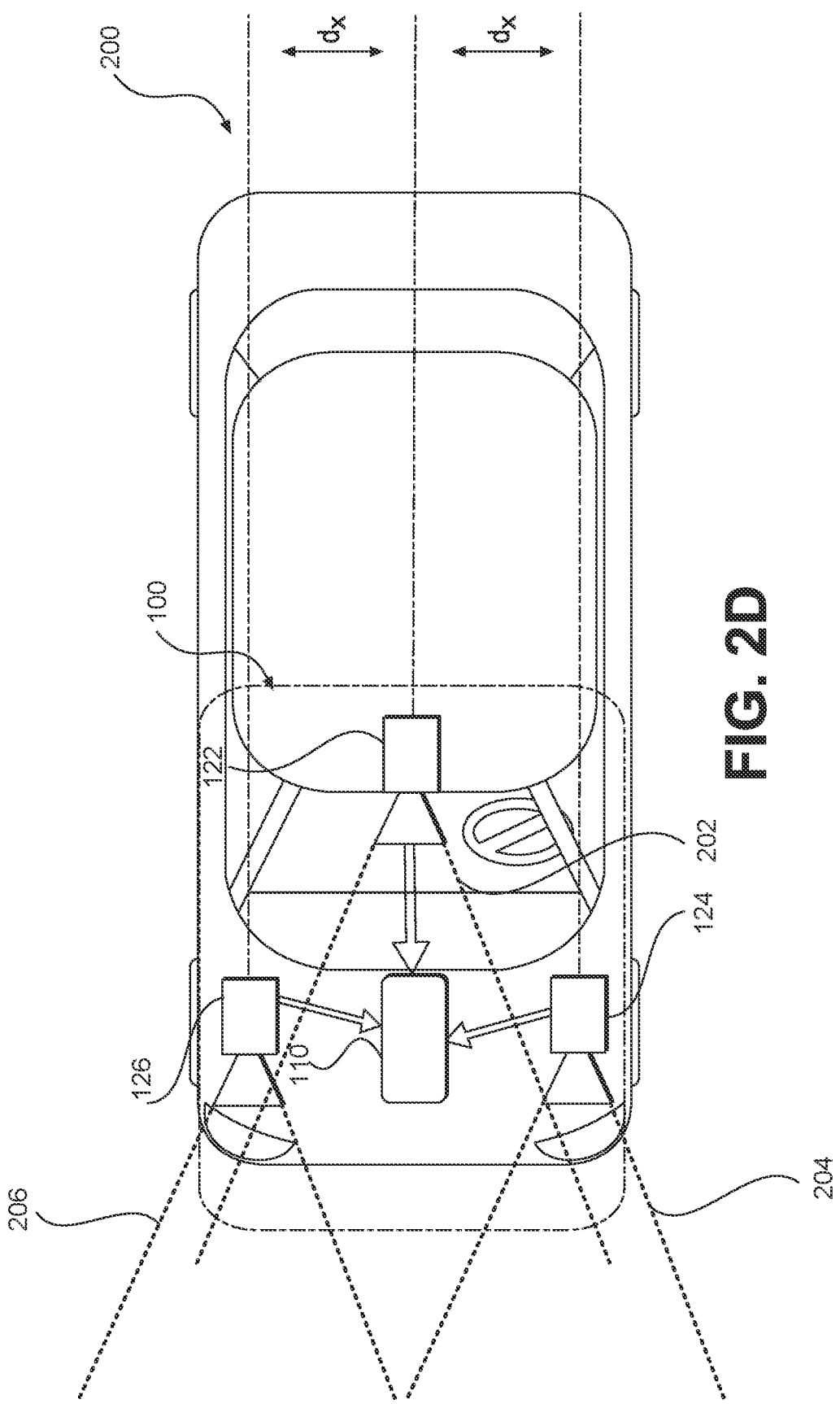
FIG. 2D is a diagrammatic top view representation of yet another embodiment of a vehicle including a system consistent with the disclosed embodiments.
Figure 2E:
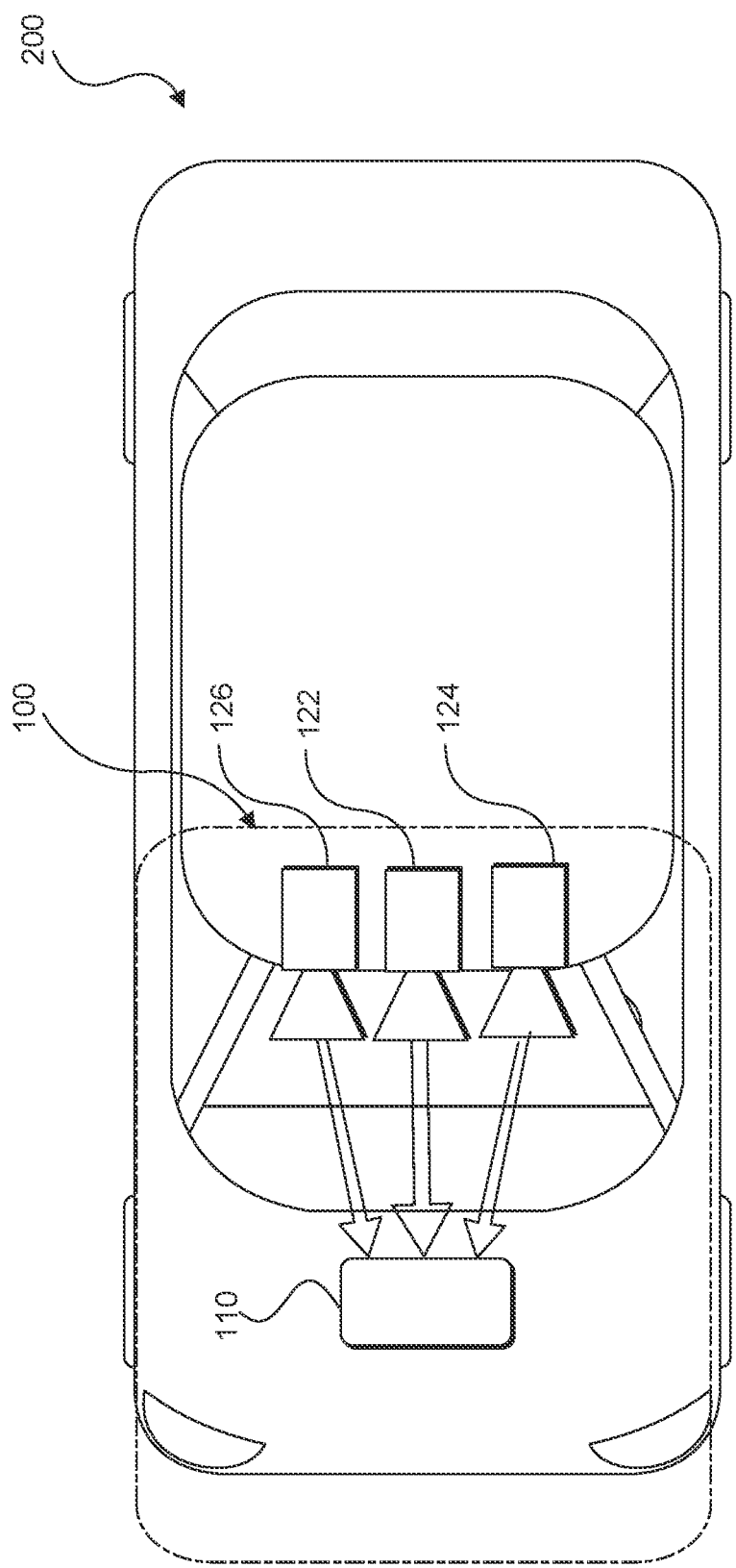
FIG. 2E is a diagrammatic top view representation of yet another embodiment of a vehicle including a system consistent with the disclosed embodiments.

As illustrated in FIG. 2D, image capture device 122 may be positioned in the vicinity of the rearview mirror and/or near the driver of vehicle 200, and image capture devices 124 and 126 may be positioned on or in a bumper region (e.g., one of bumper regions 210) of vehicle 200. And as shown in FIG. 2E, image capture devices 122, 124, and 126 may be positioned in the vicinity of the rearview mirror and/or near the driver seat of vehicle 200. The disclosed embodiments are not limited to any particular number and configuration of the image capture devices, and the image capture devices may be positioned in any appropriate location within and/or on vehicle 200.

It is to be understood that the disclosed embodiments are not limited to vehicles and could be applied in other contexts. It is also to be understood that disclosed embodiments are not limited to a particular type of vehicle 200 and may be applicable to all types of vehicles including automobiles, trucks, trailers, and other types of vehicles.

The first image capture device 122 may include any suitable type of image capture device. Image capture device 122 may include an optical axis. In one instance, the image capture device 122 may include an Aptina M9V024 WVGA sensor with a global shutter. In other embodiments, image capture device 122 may provide a resolution of 1280×960 pixels and may include a rolling shutter. Image capture device 122 may include various optical elements. In some embodiments one or more lenses may be included, for example, to provide a desired focal length and field of view for the image capture device. In some embodiments, image capture device 122 may be associated with a 6 mm lens or a 12 mm lens. In some embodiments, image capture device 122 may be configured to capture images having a desired field-of-view (FOV) 202, as illustrated in FIG. 2D. For example, image capture device 122 may be configured to have a regular FOV, such as within a range of 40 degrees to 56 degrees, including a 46 degree FOV, 50 degree FOV, 52 degree FOV, or greater. Alternatively, image capture device 122 may be configured to have a narrow FOV in the range of 23 to 40 degrees, such as a 28 degree FOV or 36 degree FOV. In addition, image capture device 122 may be configured to have a wide FOV in the range of 100 to 180 degrees. In some embodiments, image capture device 122 may include a wide angle bumper camera or one with up to a 180 degree FOV. In some embodiments, image capture device 122 may be a 7.2M pixel image capture device with an aspect ratio of about 2:1 (e.g., H×V=3800×1900 pixels) with about 100 degree horizontal FOV. Such an image capture device may be used in place of a three image capture device configuration. Due to significant lens distortion, the vertical FOV of such an image capture device may be significantly less than 50 degrees in implementations in which the image capture device uses a radially symmetric lens. For example, such a lens may not be radially symmetric which would allow for a vertical FOV greater than 50 degrees with 100 degree horizontal FOV.

The first image capture device 122 may acquire a plurality of first images relative to a scene associated with vehicle 200. Each of the plurality of first images may be acquired as a series of image scan lines, which may be captured using a rolling shutter. Each scan line may include a plurality of pixels.

The first image capture device 122 may have a scan rate associated with acquisition of each of the first series of image scan lines. The scan rate may refer to a rate at which an image sensor can acquire image data associated with each pixel included in a particular scan line.

Image capture devices 122, 124, and 126 may contain any suitable type and number of image sensors, including CCD sensors or CMOS sensors, for example. In one embodiment, a CMOS image sensor may be employed along with a rolling shutter, such that each pixel in a row is read one at a time, and scanning of the rows proceeds on a row-by-row basis until an entire image frame has been captured. In some embodiments, the rows may be captured sequentially from top to bottom relative to the frame.

In some embodiments, one or more of the image capture devices (e.g., image capture devices 122, 124, and 126) disclosed herein may constitute a high resolution imager and may have a resolution greater than 5M pixel, 7M pixel, 10M pixel, or greater.

The use of a rolling shutter may result in pixels in different rows being exposed and captured at different times, which may cause skew and other image artifacts in the captured image frame. On the other hand, when the image capture device 122 is configured to operate with a global or synchronous shutter, all of the pixels may be exposed for the same amount of time and during a common exposure period. As a result, the image data in a frame collected from a system employing a global shutter represents a snapshot of the entire FOV (such as FOV 202) at a particular time. In contrast, in a rolling shutter application, each row in a frame is exposed and data is capture at different times. Thus, moving objects may appear distorted in an image capture device having a rolling shutter. This phenomenon will be described in greater detail below.

The second image capture device 124 and the third image capturing device 126 may be any type of image capture device. Like the first image capture device 122, each of image capture devices 124 and 126 may include an optical axis. In one embodiment, each of image capture devices 124 and 126 may include an Aptina M9V024 WVGA sensor with a global shutter. Alternatively, each of image capture devices 124 and 126 may include a rolling shutter. Like image capture device 122, image capture devices 124 and 126 may be configured to include various lenses and optical elements. In some embodiments, lenses associated with image capture devices 124 and 126 may provide FOVs (such as FOVs 204 and 206) that are the same as, or narrower than, a FOV (such as FOV 202) associated with image capture device 122. For example, image capture devices 124 and 126 may have FOVs of 40 degrees, 30 degrees, 26 degrees, 23 degrees, 20 degrees, or less.

Image capture devices 124 and 126 may acquire a plurality of second and third images relative to a scene associated with vehicle 200. Each of the plurality of second and third images may be acquired as a second and third series of image scan lines, which may be captured using a rolling shutter. Each scan line or row may have a plurality of pixels. Image capture devices 124 and 126 may have second and third scan rates associated with acquisition of each of image scan lines included in the second and third series.

Each image capture device 122, 124, and 126 may be positioned at any suitable position and orientation relative to vehicle 200. The relative positioning of the image capture devices 122, 124, and 126 may be selected to aid in fusing together the information acquired from the image capture devices. For example, in some embodiments, a FOV (such as FOV 204) associated with image capture device 124 may overlap partially or fully with a FOV (such as FOV 202) associated with image capture device 122 and a FOV (such as FOV 206) associated with image capture device 126.

Image capture devices 122, 124, and 126 may be located on vehicle 200 at any suitable relative heights. In one instance, there may be a height difference between the image capture devices 122, 124, and 126, which may provide sufficient parallax information to enable stereo analysis. For example, as shown in FIG. 2A, the two image capture devices 122 and 124 are at different heights. There may also be a lateral displacement difference between image capture devices 122, 124, and 126, giving additional parallax information for stereo analysis by processing unit 110, for example. The difference in the lateral displacement may be denoted by $d_x$, as shown in FIGS. 2C and 2D. In some embodiments, fore or aft displacement (e.g., range displacement) may exist between image capture devices 122, 124, and 126. For example, image capture device 122 may be located 0.5 to 2 meters or more behind image capture device 124 and/or image capture device 126. This type of displacement may enable one of the image capture devices to cover potential blind spots of the other image capture device(s).

Image capture devices 122 may have any suitable resolution capability (e.g., number of pixels associated with the image sensor), and the resolution of the image sensor(s) associated with the image capture device 122 may be higher, lower, or the same as the resolution of the image sensor(s) associated with image capture devices 124 and 126. In some embodiments, the image sensor(s) associated with image capture device 122 and/or image capture devices 124 and 126 may have a resolution of 640×480, 1024×768, 1280×960, or any other suitable resolution.

The frame rate (e.g., the rate at which an image capture device acquires a set of pixel data of one image frame before moving on to capture pixel data associated with the next image frame) may be controllable. The frame rate associated with image capture device 122 may be higher, lower, or the same as the frame rate associated with image capture devices 124 and 126. The frame rate associated with image capture devices 122, 124, and 126 may depend on a variety of factors that may affect the timing of the frame rate. For example, one or more of image capture devices 122, 124, and 126 may include a selectable pixel delay period imposed before or after acquisition of image data associated with one or more pixels of an image sensor in image capture device 122, 124, and/or 126. Generally, image data corresponding to each pixel may be acquired according to a clock rate for the device (e.g., one pixel per clock cycle). Additionally, in embodiments including a rolling shutter, one or more of image capture devices 122, 124, and 126 may include a selectable horizontal blanking period imposed before or after acquisition of image data associated with a row of pixels of an image sensor in image capture device 122, 124, and/or 126. Further, one or more of image capture devices 122, 124, and/or 126 may include a selectable vertical blanking period imposed before or after acquisition of image data associated with an image frame of image capture device 122, 124, and 126.

These timing controls may enable synchronization of frame rates associated with image capture devices 122, 124, and 126, even where the line scan rates of each are different. Additionally, as will be discussed in greater detail below, these selectable timing controls, among other factors (e.g., image sensor resolution, maximum line scan rates, etc.) may enable synchronization of image capture from an area where the FOV of image capture device 122 overlaps with one or more FOVs of image capture devices 124 and 126, even where the field of view of image capture device 122 is different from the FOVs of image capture devices 124 and 126.

Frame rate timing in image capture device 122, 124, and 126 may depend on the resolution of the associated image sensors. For example, assuming similar line scan rates for both devices, if one device includes an image sensor having a resolution of 640×480 and another device includes an image sensor with a resolution of 1280×960, then more time will be required to acquire a frame of image data from the sensor having the higher resolution.

Another factor that may affect the timing of image data acquisition in image capture devices 122, 124, and 126 is the maximum line scan rate. For example, acquisition of a row of image data from an image sensor included in image capture device 122, 124, and 126 will require some minimum amount of time. Assuming no pixel delay periods are added, this minimum amount of time for acquisition of a row of image data will be related to the maximum line scan rate for a particular device. Devices that offer higher maximum line scan rates have the potential to provide higher frame rates than devices with lower maximum line scan rates. In some embodiments, one or more of image capture devices 124 and 126 may have a maximum line scan rate that is higher than a maximum line scan rate associated with image capture device 122. In some embodiments, the maximum line scan rate of image capture device 124 and/or 126 may be 1.25, 1.5, 1.75, or 2 times or more than a maximum line scan rate of image capture device 122.

In another embodiment, image capture devices 122, 124, and 126 may have the same maximum line scan rate, but image capture device 122 may be operated at a scan rate less than or equal to its maximum scan rate. The system may be configured such that one or more of image capture devices 124 and 126 operate at a line scan rate that is equal to the line scan rate of image capture device 122. In other instances, the system may be configured such that the line scan rate of image capture device 124 and/or image capture device 126 may be 1.25, 1.5, 1.75, or 2 times or more than the line scan rate of image capture device 122.

In some embodiments, image capture devices 122, 124, and 126 may be asymmetric. That is, they may include cameras having different fields of view (FOV) and focal lengths. The fields of view of image capture devices 122, 124, and 126 may include any desired area relative to an environment of vehicle 200, for example. In some embodiments, one or more of image capture devices 122, 124, and 126 may be configured to acquire image data from an environment in front of vehicle 200, behind vehicle 200, to the sides of vehicle 200, or combinations thereof.

Further, the focal length associated with each image capture device 122, 124, and/or 126 may be selectable (e.g., by inclusion of appropriate lenses etc.) such that each device acquires images of objects at a desired distance range relative to vehicle 200. For example, in some embodiments image capture devices 122, 124, and 126 may acquire images of close-up objects within a few meters from the vehicle. Image capture devices 122, 124, and 126 may also be configured to acquire images of objects at ranges more distant from the vehicle (e.g., 25 m, 50 m, 100 m, 150 m, or more). Further, the focal lengths of image capture devices 122, 124, and 126 may be selected such that one image capture device (e.g., image capture device 122) can acquire images of objects relatively close to the vehicle (e.g., within 10 m or within 20 m) while the other image capture devices (e.g., image capture devices 124 and 126) can acquire images of more distant objects (e.g., greater than 20 m, 50 m, 100 m, 150 m, etc.) from vehicle 200.

According to some embodiments, the FOV of one or more image capture devices 122, 124, and 126 may have a wide angle. For example, it may be advantageous to have a FOV of 140 degrees, especially for image capture devices 122, 124, and 126 that may be used to capture images of the area in the vicinity of vehicle 200. For example, image capture device 122 may be used to capture images of the area to the right or left of vehicle 200 and, in such embodiments, it may be desirable for image capture device 122 to have a wide FOV (e.g., at least 140 degrees).

The field of view associated with each of image capture devices 122, 124, and 126 may depend on the respective focal lengths. For example, as the focal length increases, the corresponding field of view decreases.

Image capture devices 122, 124, and 126 may be configured to have any suitable fields of view. In one particular example, image capture device 122 may have a horizontal FOV of 46 degrees, image capture device 124 may have a horizontal FOV of 23 degrees, and image capture device 126 may have a horizontal FOV in between 23 and 46 degrees. In another instance, image capture device 122 may have a horizontal FOV of 52 degrees, image capture device 124 may have a horizontal FOV of 26 degrees, and image capture device 126 may have a horizontal FOV in between 26 and 52 degrees. In some embodiments, a ratio of the FOV of image capture device 122 to the FOVs of image capture device 124 and/or image capture device 126 may vary from 1.5 to 2.0. In other embodiments, this ratio may vary between 1.25 and 2.25.

System 100 may be configured so that a field of view of image capture device 122 overlaps, at least partially or fully, with a field of view of image capture device 124 and/or image capture device 126. In some embodiments, system 100 may be configured such that the fields of view of image capture devices 124 and 126, for example, fall within (e.g., are narrower than) and share a common center with the field of view of image capture device 122. In other embodiments, the image capture devices 122, 124, and 126 may capture adjacent FOVs or may have partial overlap in their FOVs. In some embodiments, the fields of view of image capture devices 122, 124, and 126 may be aligned such that a center of the narrower FOV image capture devices 124 and/or 126 may be located in a lower half of the field of view of the wider FOV device 122.

Figure 2F:
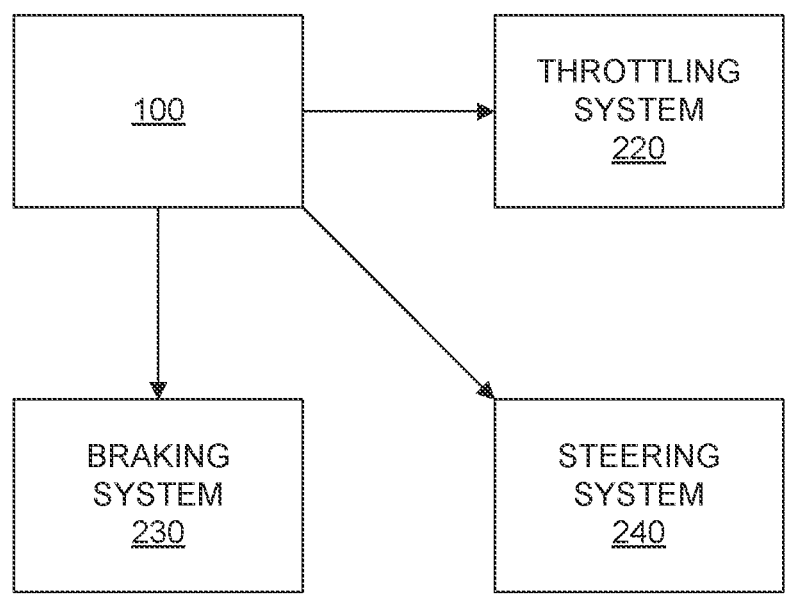
FIG. 2F is a diagrammatic representation of exemplary vehicle control systems consistent with the disclosed embodiments.

FIG. 2F is a diagrammatic representation of exemplary vehicle control systems, consistent with the disclosed embodiments. As indicated in FIG. 2F, vehicle 200 may include throttling system 220, braking system 230, and steering system 240. System 100 may provide inputs (e.g., control signals) to one or more of throttling system 220, braking system 230, and steering system 240 over one or more data links (e.g., any wired and/or wireless link or links for transmitting data). For example, based on analysis of images acquired by image capture devices 122, 124, and/or 126, system 100 may provide control signals to one or more of throttling system 220, braking system 230, and steering system 240 to navigate vehicle 200 (e.g., by causing an acceleration, a turn, a lane shift, etc.). Further, system 100 may receive inputs from one or more of throttling system 220, braking system 230, and steering system 24 indicating operating conditions of vehicle 200 (e.g., speed, whether vehicle 200 is braking and/or turning, etc.). Further details are provided in connection with FIGS. 4-7, below.

Figure 3A:
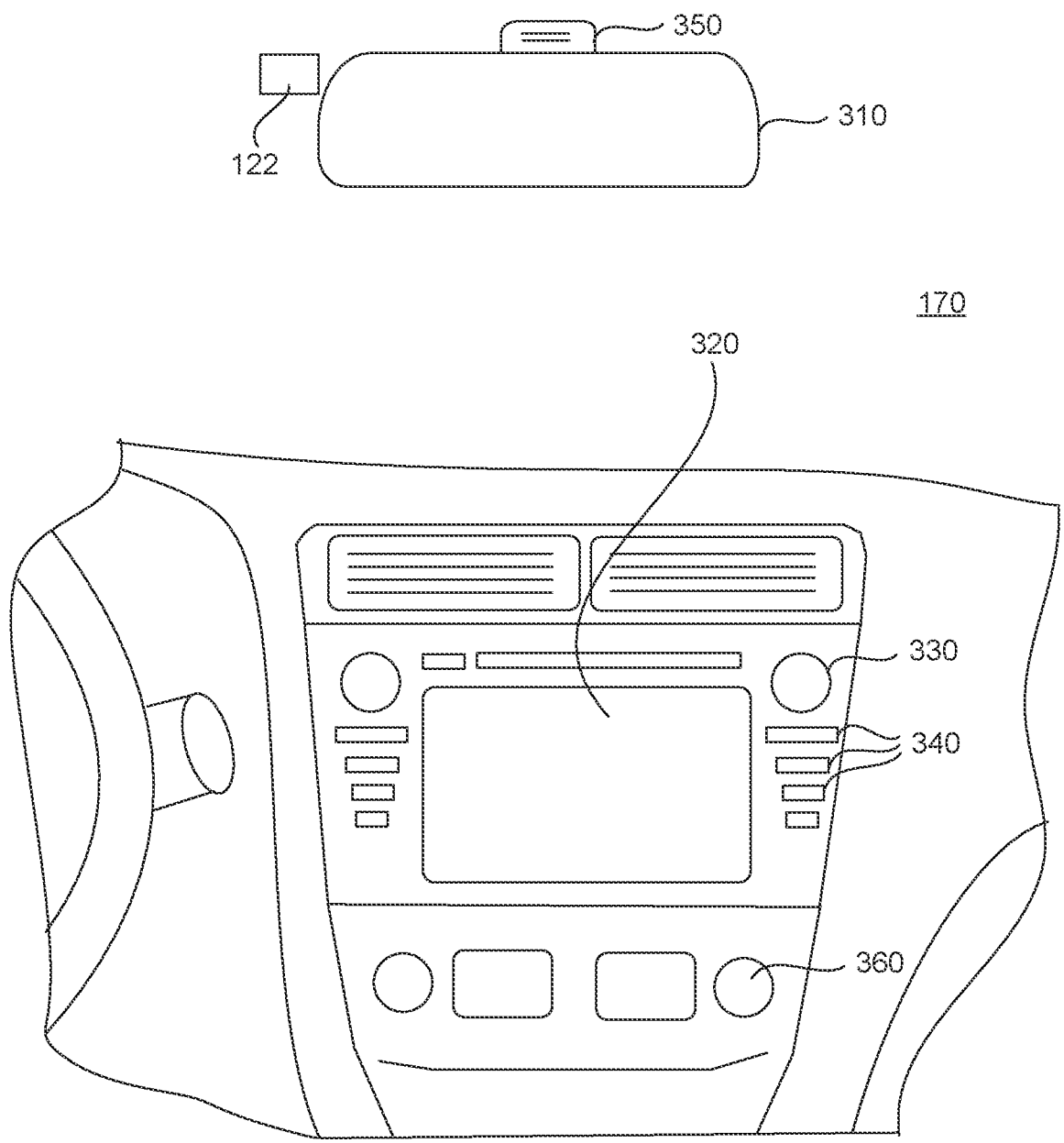
FIG. 3A is a diagrammatic representation of an interior of a vehicle including a rearview mirror and a user interface for a vehicle imaging system consistent with the disclosed embodiments.

As shown in FIG. 3A, vehicle 200 may also include a user interface 170 for interacting with a driver or a passenger of vehicle 200. For example, user interface 170 in a vehicle application may include a touch screen 320, knobs 330, buttons 340, and a microphone 350. A driver or passenger of vehicle 200 may also use handles (e.g., located on or near the steering column of vehicle 200 including, for example, turn signal handles), buttons (e.g., located on the steering wheel of vehicle 200), and the like, to interact with system 100. In some embodiments, microphone 350 may be positioned adjacent to a rearview mirror 310. Similarly, in some embodiments, image capture device 122 may be located near rearview mirror 310. In some embodiments, user interface 170 may also include one or more speakers 360 (e.g., speakers of a vehicle audio system). For example, system 100 may provide various notifications (e.g., alerts) via speakers 360.

Figure 3B:
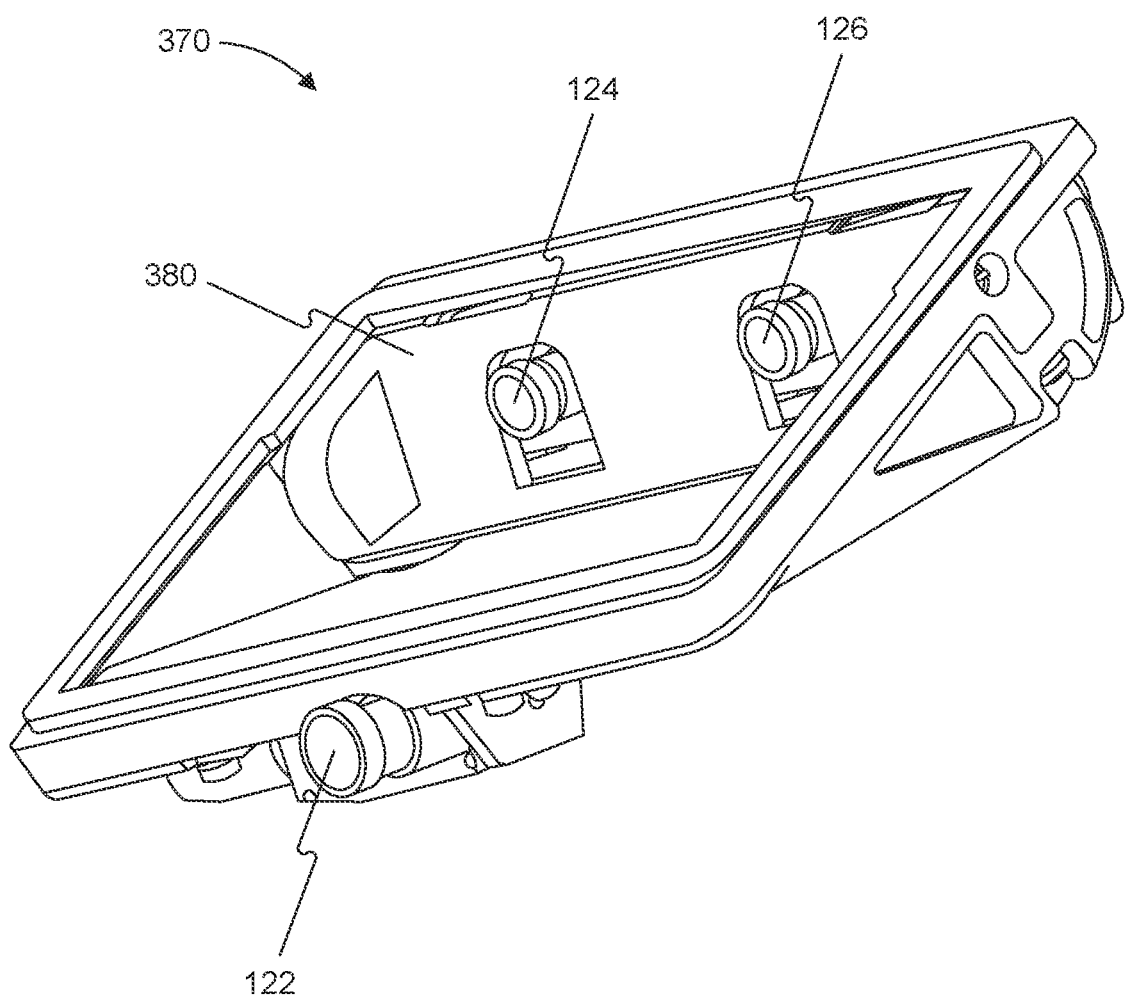
FIG. 3B is an illustration of an example of a camera mount that is configured to be positioned behind a rearview mirror and against a vehicle windshield consistent with the disclosed embodiments.
Figure 3C:
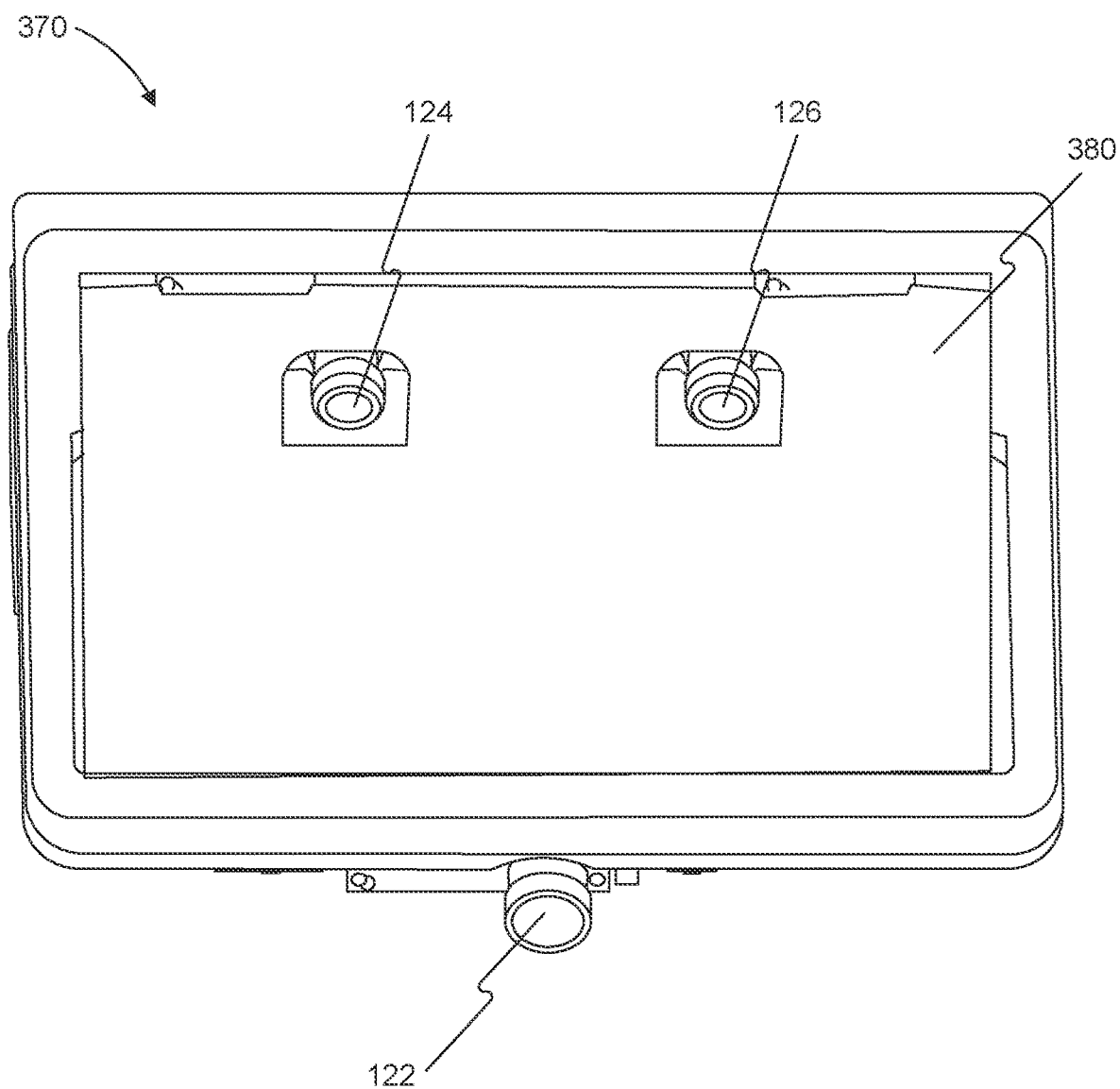
FIG. 3C is an illustration of the camera mount shown in FIG. 3B from a different perspective consistent with the disclosed embodiments.
Figure 3D:
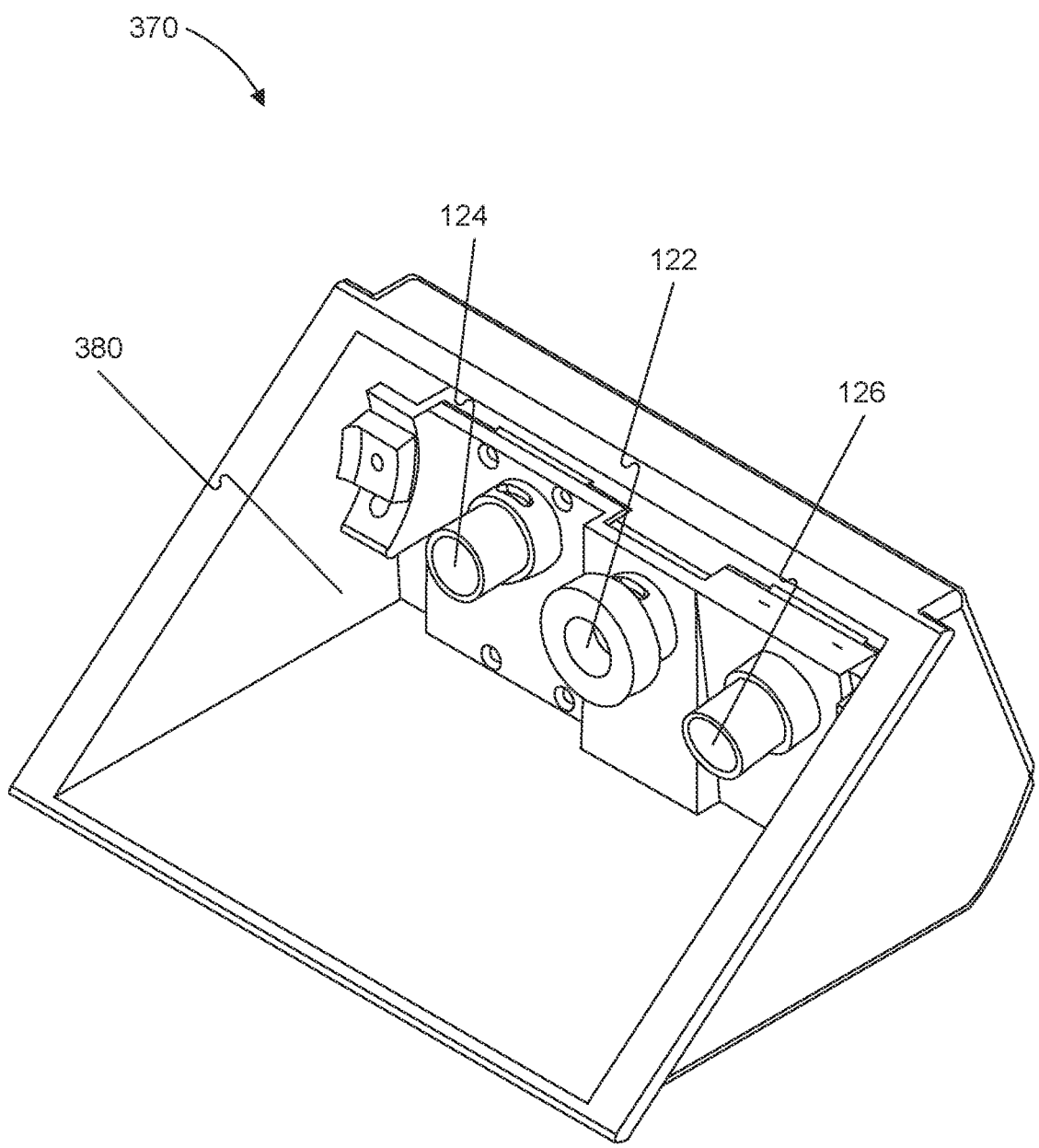
FIG. 3D is an illustration of an example of a camera mount that is configured to be positioned behind a rearview mirror and against a vehicle windshield consistent with the disclosed embodiments.

FIGS. 3B-3D are illustrations of an exemplary camera mount 370 configured to be positioned behind a rearview mirror (e.g., rearview mirror 310) and against a vehicle windshield, consistent with disclosed embodiments. As shown in FIG. 3B, camera mount 370 may include image capture devices 122, 124, and 126. Image capture devices 124 and 126 may be positioned behind a glare shield 380, which may be flush against the vehicle windshield and include a composition of film and/or anti-reflective materials. For example, glare shield 380 may be positioned such that it aligns against a vehicle windshield having a matching slope. In some embodiments, each of image capture devices 122, 124, and 126 may be positioned behind glare shield 380, as depicted, for example, in FIG. 3D. The disclosed embodiments are not limited to any particular configuration of image capture devices 122, 124, and 126, camera mount 370, and glare shield 380. FIG. 3C is an illustration of camera mount 370 shown in FIG. 3B from a front perspective.

As will be appreciated by a person skilled in the art having the benefit of this disclosure, numerous variations and/or modifications may be made to the foregoing disclosed embodiments. For example, not all components are essential for the operation of system 100. Further, any component may be located in any appropriate part of system 100 and the components may be rearranged into a variety of configurations while providing the functionality of the disclosed embodiments. Therefore, the foregoing configurations are examples and, regardless of the configurations discussed above, system 100 can provide a wide range of functionality to analyze the surroundings of vehicle 200 and navigate vehicle 200 in response to the analysis.

As discussed below in further detail and consistent with various disclosed embodiments, system 100 may provide a variety of features related to autonomous driving and/or driver assist technology. For example, system 100 may analyze image data, position data (e.g., GPS location information), map data, speed data, and/or data from sensors included in vehicle 200. System 100 may collect the data for analysis from, for example, image acquisition unit 120, position sensor 130, and other sensors. Further, system 100 may analyze the collected data to determine whether or not vehicle 200 should take a certain action, and then automatically take the determined action without human intervention. For example, when vehicle 200 navigates without human intervention, system 100 may automatically control the braking, acceleration, and/or steering of vehicle 200 (e.g., by sending control signals to one or more of throttling system 220, braking system 230, and steering system 240). Further, system 100 may analyze the collected data and issue warnings and/or alerts to vehicle occupants based on the analysis of the collected data. Additional details regarding the various embodiments that are provided by system 100 are provided below.

Forward-Facing Multi-Imaging System

As discussed above, system 100 may provide drive assist functionality that uses a multi-camera system. The multi-camera system may use one or more cameras facing in the forward direction of a vehicle. In other embodiments, the multi-camera system may include one or more cameras facing to the side of a vehicle or to the rear of the vehicle. In one embodiment, for example, system 100 may use a two-camera imaging system, where a first camera and a second camera (e.g., image capture devices 122 and 124) may be positioned at the front and/or the sides of a vehicle (e.g., vehicle 200). Other camera configurations are consistent with the disclosed embodiments, and the configurations disclosed herein are examples. For example, system 100 may include a configuration of any number of cameras (e.g., one, two, three, four, five, six, seven, eight, etc.) Furthermore, system 100 may include "clusters" of cameras. For example, a cluster of cameras (including any appropriate number of cameras, e.g., one, four, eight, etc.) may be forward-facing relative to a vehicle, or may be facing any other direction (e.g., reward-facing, side-facing, at an angle, etc.) Accordingly, system 100 may include multiple clusters of cameras, with each cluster oriented in a particular direction to capture images from a particular region of a vehicle's environment.

The first camera may have a field of view that is greater than, less than, or partially overlapping with, the field of view of the second camera. In addition, the first camera may be connected to a first image processor to perform monocular image analysis of images provided by the first camera, and the second camera may be connected to a second image processor to perform monocular image analysis of images provided by the second camera. The outputs (e.g., processed information) of the first and second image processors may be combined. In some embodiments, the second image processor may receive images from both the first camera and second camera to perform stereo analysis. In another embodiment, system 100 may use a three-camera imaging system where each of the cameras has a different field of view. Such a system may, therefore, make decisions based on information derived from objects located at varying distances both forward and to the sides of the vehicle. References to monocular image analysis may refer to instances where image analysis is performed based on images captured from a single point of view (e.g., from a single camera). Stereo image analysis may refer to instances where image analysis is performed based on two or more images captured with one or more variations of an image capture parameter. For example, captured images suitable for performing stereo image analysis may include images captured: from two or more different positions, from different fields of view, using different focal lengths, along with parallax information, etc.

For example, in one embodiment, system 100 may implement a three camera configuration using image capture devices 122-126. In such a configuration, image capture device 122 may provide a narrow field of view (e.g., 34 degrees, or other values selected from a range of about 20 to 45 degrees, etc.), image capture device 124 may provide a wide field of view (e.g., 150 degrees or other values selected from a range of about 100 to about 180 degrees), and image capture device 126 may provide an intermediate field of view (e.g., 46 degrees or other values selected from a range of about 35 to about 60 degrees). In some embodiments, image capture device 126 may act as a main or primary camera. Image capture devices 122-126 may be positioned behind rearview mirror 310 and positioned substantially side-by-side (e.g., 6 cm apart). Further, in some embodiments, as discussed above, one or more of image capture devices 122-126 may be mounted behind glare shield 380 that is flush with the windshield of vehicle 200. Such shielding may act to minimize the impact of any reflections from inside the car on image capture devices 122-126.

In another embodiment, as discussed above in connection with FIGS. 3B and 3C, the wide field of view camera (e.g., image capture device 124 in the above example) may be mounted lower than the narrow and main field of view cameras (e.g., image devices 122 and 126 in the above example). This configuration may provide a free line of sight from the wide field of view camera. To reduce reflections, the cameras may be mounted close to the windshield of vehicle 200, and may include polarizers on the cameras to damp reflected light.

A three camera system may provide certain performance characteristics. For example, some embodiments may include an ability to validate the detection of objects by one camera based on detection results from another camera. In the three camera configuration discussed above, processing unit 110 may include, for example, three processing devices (e.g., three EyeQ series of processor chips, as discussed above), with each processing device dedicated to processing images captured by one or more of image capture devices 122-126.

In a three camera system, a first processing device may receive images from both the main camera and the narrow field of view camera, and perform vision processing of the narrow FOV camera to, for example, detect other vehicles, pedestrians, lane marks, traffic signs, traffic lights, and other road objects. Further, the first processing device may calculate a disparity of pixels between the images from the main camera and the narrow camera and create a 3D reconstruction of the environment of vehicle 200. The first processing device may then combine the 3D reconstruction with 3D map data or with 3D information calculated based on information from another camera.

The second processing device may receive images from the main camera and perform vision processing to detect other vehicles, pedestrians, lane marks, traffic signs, traffic lights, and other road objects. Additionally, the second processing device may calculate a camera displacement and, based on the displacement, calculate a disparity of pixels between successive images and create a 3D reconstruction of the scene (e.g., a structure from motion). The second processing device may send the structure from motion based 3D reconstruction to the first processing device to be combined with the stereo 3D images.

The third processing device may receive images from the wide FOV camera and process the images to detect vehicles, pedestrians, lane marks, traffic signs, traffic lights, and other road objects. The third processing device may further execute additional processing instructions to analyze images to identify objects moving in the image, such as vehicles changing lanes, pedestrians, etc.

In some embodiments, having streams of image-based information captured and processed independently may provide an opportunity for providing redundancy in the system. Such redundancy may include, for example, using a first image capture device and the images processed from that device to validate and/or supplement information obtained by capturing and processing image information from at least a second image capture device.

In some embodiments, system 100 may use two image capture devices (e.g., image capture devices 122 and 124) in providing navigation assistance for vehicle 200 and use a third image capture device (e.g., image capture device 126) to provide redundancy and validate the analysis of data received from the other two image capture devices. For example, in such a configuration, image capture devices 122 and 124 may provide images for stereo analysis by system 100 for navigating vehicle 200, while image capture device 126 may provide images for monocular analysis by system 100 to provide redundancy and validation of information obtained based on images captured from image capture device 122 and/or image capture device 124. That is, image capture device 126 (and a corresponding processing device) may be considered to provide a redundant sub-system for providing a check on the analysis derived from image capture devices 122 and 124 (e.g., to provide an automatic emergency braking (AEB) system). Furthermore, in some embodiments, redundancy and validation of received data may be supplemented based on information received from one more sensors (e.g., radar, lidar, acoustic sensors, information received from one or more transceivers outside of a vehicle, etc.).

One of skill in the art will recognize that the above camera configurations, camera placements, number of cameras, camera locations, etc., are examples only. These components and others described relative to the overall system may be assembled and used in a variety of different configurations without departing from the scope of the disclosed embodiments. Further details regarding usage of a multi-camera system to provide driver assist and/or autonomous vehicle functionality follow below.

Figure 4:
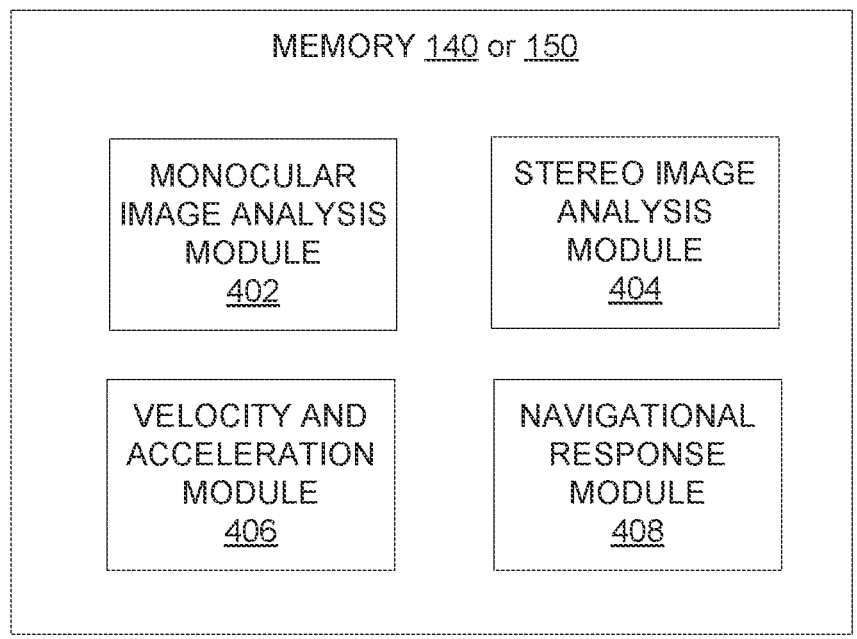
FIG. 4 is an exemplary block diagram of a memory configured to store instructions for performing one or more operations consistent with the disclosed embodiments.

FIG. 4 is an exemplary functional block diagram of memory 140 and/or 150, which may be stored/programmed with instructions for performing one or more operations consistent with the disclosed embodiments. Although the following refers to memory 140, one of skill in the art will recognize that instructions may be stored in memory 140 and/or 150.

As shown in FIG. 4, memory 140 may store a monocular image analysis module 402, a stereo image analysis module 404, a velocity and acceleration module 406, and a navigational response module 408. The disclosed embodiments are not limited to any particular configuration of memory 140. Further, applications processor 180 and/or image processor 190 may execute the instructions stored in any of modules 402-408 included in memory 140. One of skill in the art will understand that references in the following discussions to processing unit 110 may refer to applications processor 180 and image processor 190 individually or collectively. Accordingly, steps of any of the following processes may be performed by one or more processing devices.

In one embodiment, monocular image analysis module 402 may store instructions (such as computer vision software) which, when executed by processing unit 110, performs monocular image analysis of a set of images acquired by one of image capture devices 122, 124, and 126. In some embodiments, processing unit 110 may combine information from a set of images with additional sensory information (e.g., information from radar) to perform the monocular image analysis. As described in connection with FIGS. 5A-5D below, monocular image analysis module 402 may include instructions for detecting a set of features within the set of images, such as lane markings, vehicles, pedestrians, road signs, highway exit ramps, traffic lights, hazardous objects, and any other feature associated with an environment of a vehicle. Based on the analysis, system 100 (e.g., via processing unit 110) may cause one or more navigational responses in vehicle 200, such as a turn, a lane shift, a change in acceleration, and the like, as discussed below in connection with navigational response module 408.

In one embodiment, monocular image analysis module 402 may store instructions (such as computer vision software) which, when executed by processing unit 110, performs monocular image analysis of a set of images acquired by one of image capture devices 122, 124, and 126. In some embodiments, processing unit 110 may combine information from a set of images with additional sensory information (e.g., information from radar, lidar, etc.) to perform the monocular image analysis. As described in connection with FIGS. 5A-5D below, monocular image analysis module 402 may include instructions for detecting a set of features within the set of images, such as lane markings, vehicles, pedestrians, road signs, highway exit ramps, traffic lights, hazardous objects, and any other feature associated with an environment of a vehicle. Based on the analysis, system 100 (e.g., via processing unit 110) may cause one or more navigational responses in vehicle 200, such as a turn, a lane shift, a change in acceleration, and the like, as discussed below in connection with determining a navigational response.

In one embodiment, stereo image analysis module 404 may store instructions (such as computer vision software)

which, when executed by processing unit 110, performs stereo image analysis of first and second sets of images acquired by a combination of image capture devices selected from any of image capture devices 122, 124, and 126. In some embodiments, processing unit 110 may combine information from the first and second sets of images with additional sensory information (e.g., information from radar) to perform the stereo image analysis. For example, stereo image analysis module 404 may include instructions for performing stereo image analysis based on a first set of images acquired by image capture device 124 and a second set of images acquired by image capture device 126. As described in connection with FIG. 6 below, stereo image analysis module 404 may include instructions for detecting a set of features within the first and second sets of images, such as lane markings, vehicles, pedestrians, road signs, highway exit ramps, traffic lights, hazardous objects, and the like. Based on the analysis, processing unit 110 may cause one or more navigational responses in vehicle 200, such as a turn, a lane shift, a change in acceleration, and the like, as discussed below in connection with navigational response module 408. Furthermore, in some embodiments, stereo image analysis module 404 may implement techniques associated with a trained system (such as a neural network or a deep neural network) or an untrained system.

In one embodiment, velocity and acceleration module 406 may store software configured to analyze data received from one or more computing and electromechanical devices in vehicle 200 that are configured to cause a change in velocity and/or acceleration of vehicle 200. For example, processing unit 110 may execute instructions associated with velocity and acceleration module 406 to calculate a target speed for vehicle 200 based on data derived from execution of monocular image analysis module 402 and/or stereo image analysis module 404. Such data may include, for example, a target position, velocity, and/or acceleration, the position and/or speed of vehicle 200 relative to a nearby vehicle, pedestrian, or road object, position information for vehicle 200 relative to lane markings of the road, and the like. In addition, processing unit 110 may calculate a target speed for vehicle 200 based on sensory input (e.g., information from radar) and input from other systems of vehicle 200, such as throttling system 220, braking system 230, and/or steering system 240 of vehicle 200. Based on the calculated target speed, processing unit 110 may transmit electronic signals to throttling system 220, braking system 230, and/or steering system 240 of vehicle 200 to trigger a change in velocity and/or acceleration by, for example, physically depressing the brake or easing up off the accelerator of vehicle 200.

In one embodiment, navigational response module 408 may store software executable by processing unit 110 to determine a desired navigational response based on data derived from execution of monocular image analysis module 402 and/or stereo image analysis module 404. Such data may include position and speed information associated with nearby vehicles, pedestrians, and road objects, target position information for vehicle 200, and the like. Additionally, in some embodiments, the navigational response may be based (partially or fully) on map data, a predetermined position of vehicle 200, and/or a relative velocity or a relative acceleration between vehicle 200 and one or more objects detected from execution of monocular image analysis module 402 and/or stereo image analysis module 404. Navigational response module 408 may also determine a desired navigational response based on sensory input (e.g., information from radar) and inputs from other systems of vehicle 200, such as throttling system 220, braking system 230, and steering system 240 of vehicle 200. Based on the desired navigational response, processing unit 110 may transmit electronic signals to throttling system 220, braking system 230, and steering system 240 of vehicle 200 to trigger a desired navigational response by, for example, turning the steering wheel of vehicle 200 to achieve a rotation of a predetermined angle. In some embodiments, processing unit 110 may use the output of navigational response module 408 (e.g., the desired navigational response) as an input to execution of velocity and acceleration module 406 for calculating a change in speed of vehicle 200.

Furthermore, any of the modules (e.g., modules 402, 404, and 406) disclosed herein may implement techniques associated with a trained system (such as a neural network or a deep neural network) or an untrained system.

Figure 5A:
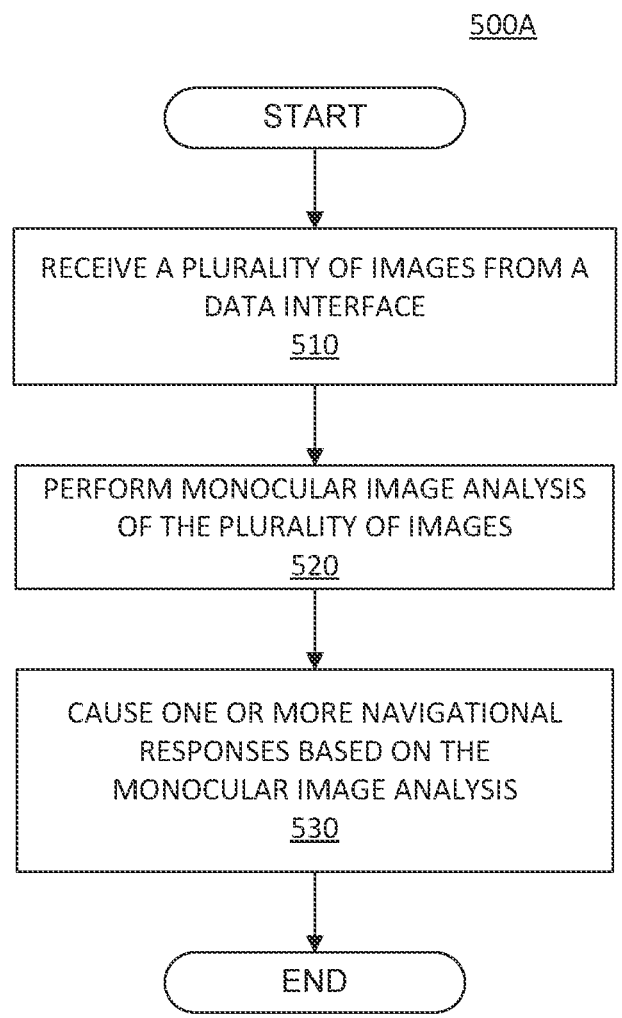
FIG. 5A is a flowchart showing an exemplary process for causing one or more navigational responses based on monocular image analysis consistent with disclosed embodiments.

FIG. 5A is a flowchart showing an exemplary process 500A for causing one or more navigational responses based on monocular image analysis, consistent with disclosed embodiments. At step 510, processing unit 110 may receive a plurality of images via data interface 128 between processing unit 110 and image acquisition unit 120. For instance, a camera included in image acquisition unit 120 (such as image capture device 122 having field of view 202) may capture a plurality of images of an area forward of vehicle 200 (or to the sides or rear of a vehicle, for example) and transmit them over a data connection (e.g., digital, wired, USB, wireless, Bluetooth, etc.) to processing unit 110. Processing unit 110 may execute monocular image analysis module 402 to analyze the plurality of images at step 520, as described in further detail in connection with FIGS. 5B-5D below. By performing the analysis, processing unit 110 may detect a set of features within the set of images, such as lane markings, vehicles, pedestrians, road signs, highway exit ramps, traffic lights, and the like.

Processing unit 110 may also execute monocular image analysis module 402 to detect various road hazards at step 520, such as, for example, parts of a truck tire, fallen road signs, loose cargo, small animals, and the like. Road hazards may vary in structure, shape, size, and color, which may make detection of such hazards more challenging. In some embodiments, processing unit 110 may execute monocular image analysis module 402 to perform multi-frame analysis on the plurality of images to detect road hazards. For example, processing unit 110 may estimate camera motion between consecutive image frames and calculate the disparities in pixels between the frames to construct a 3D-map of the road. Processing unit 110 may then use the 3D-map to detect the road surface, as well as hazards existing above the road surface.

At step 530, processing unit 110 may execute navigational response module 408 to cause one or more navigational responses in vehicle 200 based on the analysis performed at step 520 and the techniques as described above in connection with FIG. 4. Navigational responses may include, for example, a turn, a lane shift, a change in acceleration, and the like. In some embodiments, processing unit 110 may use data derived from execution of velocity and acceleration module 406 to cause the one or more navigational responses. Additionally, multiple navigational responses may occur simultaneously, in sequence, or any combination thereof. For instance, processing unit 110 may cause vehicle 200 to shift one lane over and then accelerate by, for example, sequentially transmitting control signals to steering system 240 and throttling system 220 of vehicle 200. Alternatively, processing unit 110 may cause vehicle 200 to brake while at the same time shifting lanes by, for example, simultaneously transmitting control signals to braking system 230 and steering system 240 of vehicle 200.

Figure 5B:
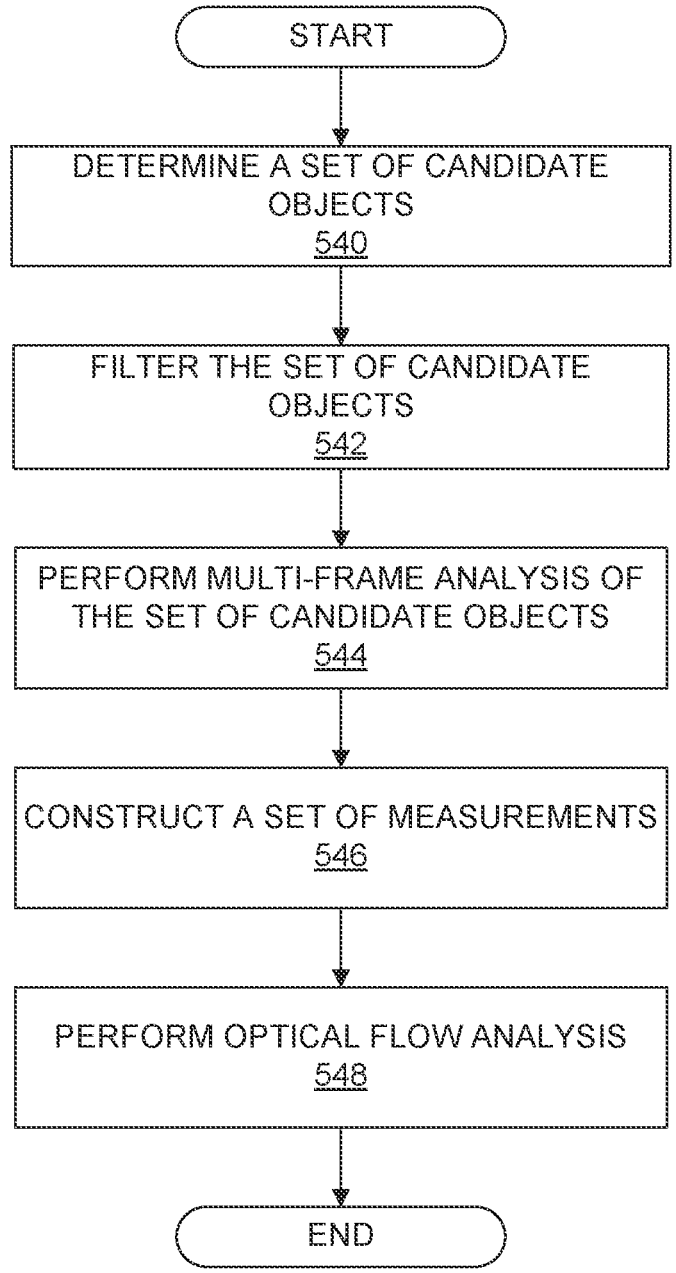
FIG. 5B is a flowchart showing an exemplary process for detecting one or more vehicles and/or pedestrians in a set of images consistent with the disclosed embodiments.

FIG. 5B is a flowchart showing an exemplary process 500B for detecting one or more vehicles and/or pedestrians in a set of images, consistent with disclosed embodiments. Processing unit 110 may execute monocular image analysis module 402 to implement process 500B. At step 540, processing unit 110 may determine a set of candidate objects representing possible vehicles and/or pedestrians. For example, processing unit 110 may scan one or more images, compare the images to one or more predetermined patterns, and identify within each image possible locations that may contain objects of interest (e.g., vehicles, pedestrians, or portions thereof). The predetermined patterns may be designed in such a way to achieve a high rate of "false hits" and a low rate of "misses." For example, processing unit 110 may use a low threshold of similarity to predetermined patterns for identifying candidate objects as possible vehicles or pedestrians. Doing so may allow processing unit 110 to reduce the probability of missing (e.g., not identifying) a candidate object representing a vehicle or pedestrian.

At step 542, processing unit 110 may filter the set of candidate objects to exclude certain candidates (e.g., irrelevant or less relevant objects) based on classification criteria. Such criteria may be derived from various properties associated with object types stored in a database (e.g., a database stored in memory 140). Properties may include object shape, dimensions, texture, position (e.g., relative to vehicle 200), and the like. Thus, processing unit 110 may use one or more sets of criteria to reject false candidates from the set of candidate objects.

At step 544, processing unit 110 may analyze multiple frames of images to determine whether objects in the set of candidate objects represent vehicles and/or pedestrians. For example, processing unit 110 may track a detected candidate object across consecutive frames and accumulate frame-by-frame data associated with the detected object (e.g., size, position relative to vehicle 200, etc.). Additionally, processing unit 110 may estimate parameters for the detected object and compare the object's frame-by-frame position data to a predicted position.

At step 546, processing unit 110 may construct a set of measurements for the detected objects. Such measurements may include, for example, position, velocity, and acceleration values (relative to vehicle 200) associated with the detected objects. In some embodiments, processing unit 110 may construct the measurements based on estimation techniques using a series of time-based observations such as Kalman filters or linear quadratic estimation (LQE), and/or based on available modeling data for different object types (e.g., cars, trucks, pedestrians, bicycles, road signs, etc.). The Kalman filters may be based on a measurement of an object's scale, where the scale measurement is proportional to a time to collision (e.g., the amount of time for vehicle 200 to reach the object). Thus, by performing steps 540-546, processing unit 110 may identify vehicles and pedestrians appearing within the set of captured images and derive information (e.g., position, speed, size) associated with the vehicles and pedestrians. Based on the identification and the derived information, processing unit 110 may cause one or more navigational responses in vehicle 200, as described in connection with FIG. 5A, above.

At step 548, processing unit 110 may perform an optical flow analysis of one or more images to reduce the probabilities of detecting a "false hit" and missing a candidate object that represents a vehicle or pedestrian. The optical flow analysis may refer to, for example, analyzing motion patterns relative to vehicle 200 in the one or more images associated with other vehicles and pedestrians, and that are distinct from road surface motion. Processing unit 110 may calculate the motion of candidate objects by observing the different positions of the objects across multiple image frames, which are captured at different times. Processing unit 110 may use the position and time values as inputs into mathematical models for calculating the motion of the candidate objects. Thus, optical flow analysis may provide another method of detecting vehicles and pedestrians that are nearby vehicle 200. Processing unit 110 may perform optical flow analysis in combination with steps 540-546 to provide redundancy for detecting vehicles and pedestrians and increase the reliability of system 100.

Figure 5C:
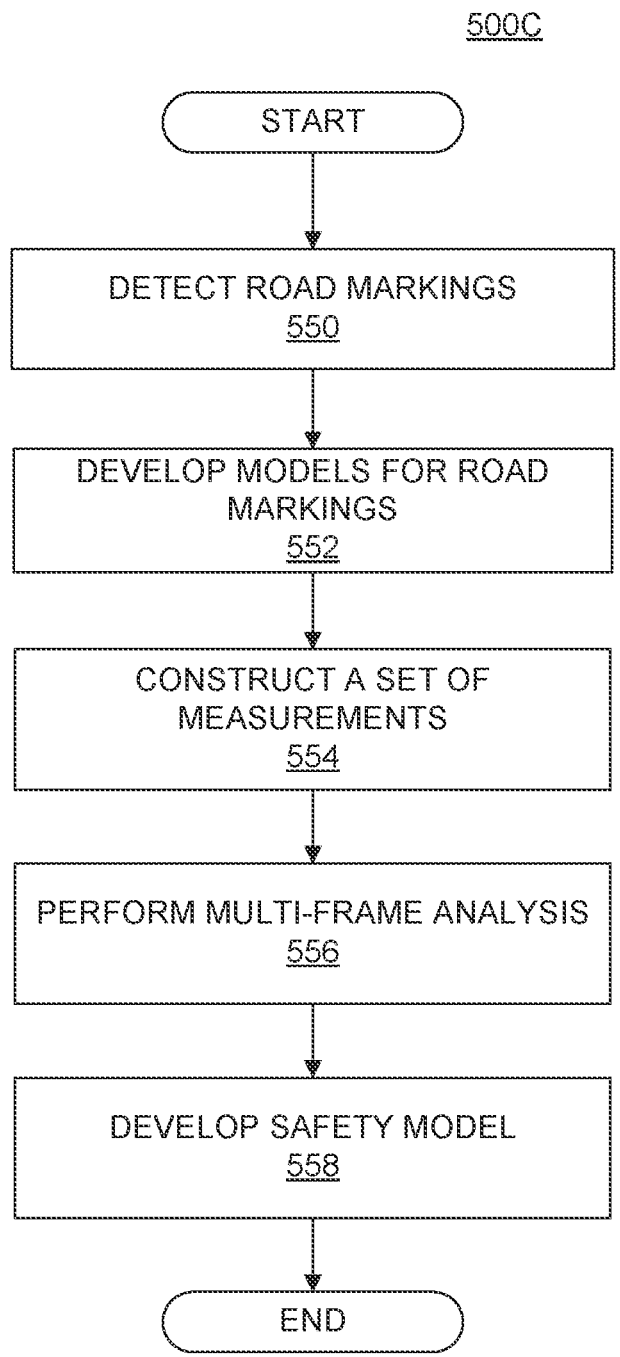
FIG. 5C is a flowchart showing an exemplary process for detecting road marks and/or lane geometry information in a set of images consistent with the disclosed embodiments.

FIG. 5C is a flowchart showing an exemplary process 500C for detecting road marks and/or lane geometry information in a set of images, consistent with disclosed embodiments. Processing unit 110 may execute monocular image analysis module 402 to implement process 500C. At step 550, processing unit 110 may detect a set of objects by scanning one or more images. To detect segments of lane markings, lane geometry information, and other pertinent road marks, processing unit 110 may filter the set of objects to exclude those determined to be irrelevant (e.g., minor potholes, small rocks, etc.). At step 552, processing unit 110 may group together the segments detected in step 550 belonging to the same road mark or lane mark. Based on the grouping, processing unit 110 may develop a model to represent the detected segments, such as a mathematical model.

At step 554, processing unit 110 may construct a set of measurements associated with the detected segments. In some embodiments, processing unit 110 may create a projection of the detected segments from the image plane onto the real-world plane. The projection may be characterized using a 3rd-degree polynomial having coefficients corresponding to physical properties such as the position, slope, curvature, and curvature derivative of the detected road. In generating the projection, processing unit 110 may take into account changes in the road surface, as well as pitch and roll rates associated with vehicle 200. In addition, processing unit 110 may model the road elevation by analyzing position and motion cues present on the road surface. Further, processing unit 110 may estimate the pitch and roll rates associated with vehicle 200 by tracking a set of feature points in the one or more images.

At step 556, processing unit 110 may perform multi-frame analysis by, for example, tracking the detected segments across consecutive image frames and accumulating frame-by-frame data associated with detected segments. As processing unit 110 performs multi-frame analysis, the set of measurements constructed at step 554 may become more reliable and associated with an increasingly higher confidence level. Thus, by performing steps 550-556, processing unit 110 may identify road marks appearing within the set of captured images and derive lane geometry information. Based on the identification and the derived information, processing unit 110 may cause one or more navigational responses in vehicle 200, as described in connection with FIG. 5A, above.

At step 558, processing unit 110 may consider additional sources of information to further develop a safety model for vehicle 200 in the context of its surroundings. Processing unit 110 may use the safety model to define a context in which system 100 may execute autonomous control of vehicle 200 in a safe manner. To develop the safety model, in some embodiments, processing unit 110 may consider the position and motion of other vehicles, the detected road edges and barriers, and/or general road shape descriptions extracted from map data (such as data from map database 160). By considering additional sources of information, processing unit 110 may provide redundancy for detecting road marks and lane geometry and increase the reliability of system 100.

Figure 5D:
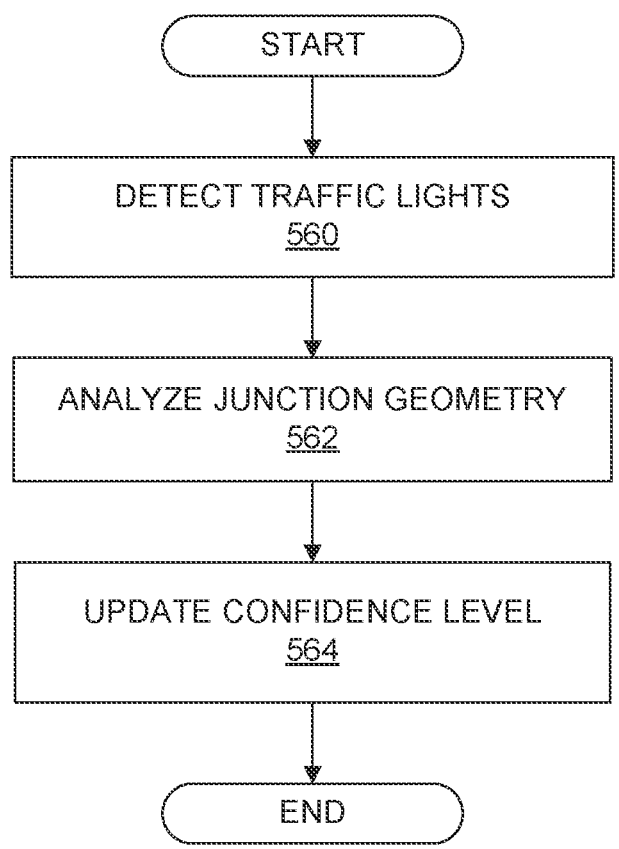
FIG. 5D is a flowchart showing an exemplary process for detecting traffic lights in a set of images consistent with the disclosed embodiments.

FIG. 5D is a flowchart showing an exemplary process 500D for detecting traffic lights in a set of images, consistent with disclosed embodiments. Processing unit 110 may execute monocular image analysis module 402 to implement process 500D. At step 560, processing unit 110 may scan the set of images and identify objects appearing at locations in the images likely to contain traffic lights. For example, processing unit 110 may filter the identified objects to construct a set of candidate objects, excluding those objects unlikely to correspond to traffic lights. The filtering may be done based on various properties associated with traffic lights, such as shape, dimensions, texture, position (e.g., relative to vehicle 200), and the like. Such properties may be based on multiple examples of traffic lights and traffic control signals and stored in a database. In some embodiments, processing unit 110 may perform multi-frame analysis on the set of candidate objects reflecting possible traffic lights. For example, processing unit 110 may track the candidate objects across consecutive image frames, estimate the real-world position of the candidate objects, and filter out those objects that are moving (which are unlikely to be traffic lights). In some embodiments, processing unit 110 may perform color analysis on the candidate objects and identify the relative position of the detected colors appearing inside possible traffic lights.

At step 562, processing unit 110 may analyze the geometry of a junction. The analysis may be based on any combination of: (i) the number of lanes detected on either side of vehicle 200, (ii) markings (such as arrow marks) detected on the road, and (iii) descriptions of the junction extracted from map data (such as data from map database 160). Processing unit 110 may conduct the analysis using information derived from execution of monocular analysis module 402. In addition, Processing unit 110 may determine a correspondence between the traffic lights detected at step 560 and the lanes appearing near vehicle 200.

As vehicle 200 approaches the junction, at step 564, processing unit 110 may update the confidence level associated with the analyzed junction geometry and the detected traffic lights. For instance, the number of traffic lights estimated to appear at the junction as compared with the number actually appearing at the junction may impact the confidence level. Thus, based on the confidence level, processing unit 110 may delegate control to the driver of vehicle 200 in order to improve safety conditions. By performing steps 560-564, processing unit 110 may identify traffic lights appearing within the set of captured images and analyze junction geometry information. Based on the identification and the analysis, processing unit 110 may cause one or more navigational responses in vehicle 200, as described in connection with FIG. 5A, above.

Figure 5E:
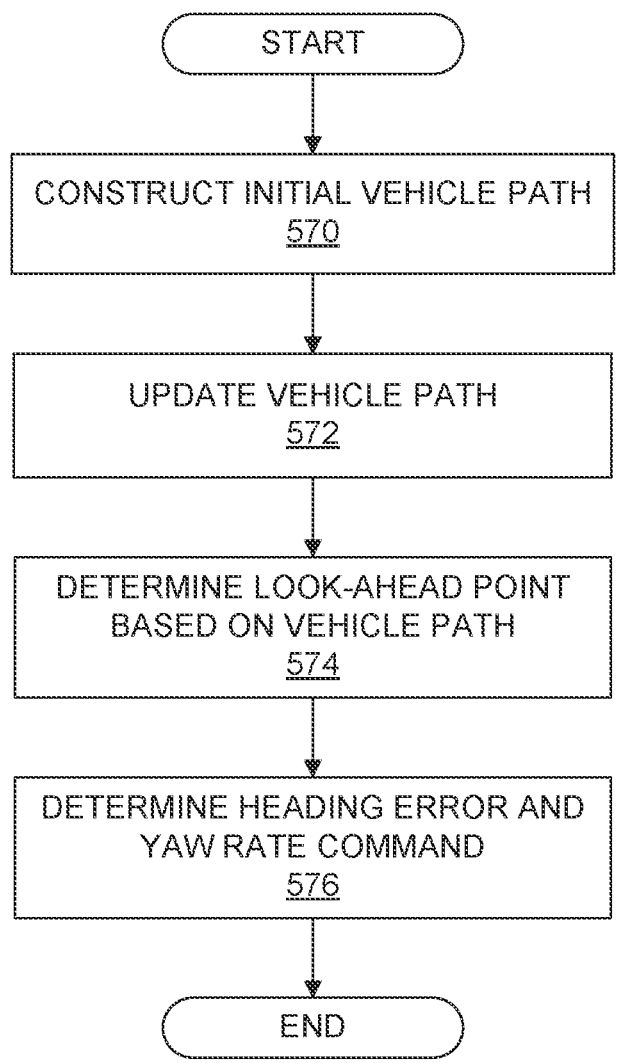
FIG. 5E is a flowchart showing an exemplary process for causing one or more navigational responses based on a vehicle path consistent with the disclosed embodiments.

FIG. 5E is a flowchart showing an exemplary process 500E for causing one or more navigational responses in vehicle 200 based on a vehicle path, consistent with the disclosed embodiments. At step 570, processing unit 110 may construct an initial vehicle path associated with vehicle 200. The vehicle path may be represented using a set of points expressed in coordinates (x, z), and the distance $d_i$ between two points in the set of points may fall in the range of 1 to 5 meters. In one embodiment, processing unit 110 may construct the initial vehicle path using two polynomials, such as left and right road polynomials. Processing unit 110 may calculate the geometric midpoint between the two polynomials and offset each point included in the resultant vehicle path by a predetermined offset (e.g., a smart lane offset), if any (an offset of zero may correspond to travel in the middle of a lane). The offset may be in a direction perpendicular to a segment between any two points in the vehicle path. In another embodiment, processing unit 110 may use one polynomial and an estimated lane width to offset each point of the vehicle path by half the estimated lane width plus a predetermined offset (e.g., a smart lane offset).

At step 572, processing unit 110 may update the vehicle path constructed at step 570. Processing unit 110 may reconstruct the vehicle path constructed at step 570 using a higher resolution, such that the distance $d_k$ between two points in the set of points representing the vehicle path is less than the distance $d_i$ described above. For example, the distance $d_k$ may fall in the range of 0.1 to 0.3 meters. Processing unit 110 may reconstruct the vehicle path using a parabolic spline algorithm, which may yield a cumulative distance vector S corresponding to the total length of the vehicle path (i.e., based on the set of points representing the vehicle path).

At step 574, processing unit 110 may determine a look-ahead point (expressed in coordinates as $(x_l, z_l)$) based on the updated vehicle path constructed at step 572. Processing unit 110 may extract the look-ahead point from the cumulative distance vector S, and the look-ahead point may be associated with a look-ahead distance and look-ahead time. The look-ahead distance, which may have a lower bound ranging from 10 to 20 meters, may be calculated as the product of the speed of vehicle 200 and the look-ahead time. For example, as the speed of vehicle 200 decreases, the look-ahead distance may also decrease (e.g., until it reaches the lower bound). The look-ahead time, which may range from 0.5 to 1.5 seconds, may be inversely proportional to the gain of one or more control loops associated with causing a navigational response in vehicle 200, such as the heading error tracking control loop. For example, the gain of the heading error tracking control loop may depend on the bandwidth of a yaw rate loop, a steering actuator loop, car lateral dynamics, and the like. Thus, the higher the gain of the heading error tracking control loop, the lower the look-ahead time.

At step 576, processing unit 110 may determine a heading error and yaw rate command based on the look-ahead point determined at step 574. Processing unit 110 may determine the heading error by calculating the arctangent of the look-ahead point, e.g., arctan $(x_l/z_l)$. Processing unit 110 may determine the yaw rate command as the product of the heading error and a high-level control gain. The high-level control gain may be equal to: (2/look-ahead time), if the look-ahead distance is not at the lower bound. Otherwise, the high-level control gain may be equal to: (2*speed of vehicle 200/look-ahead distance).

Figure 5F:
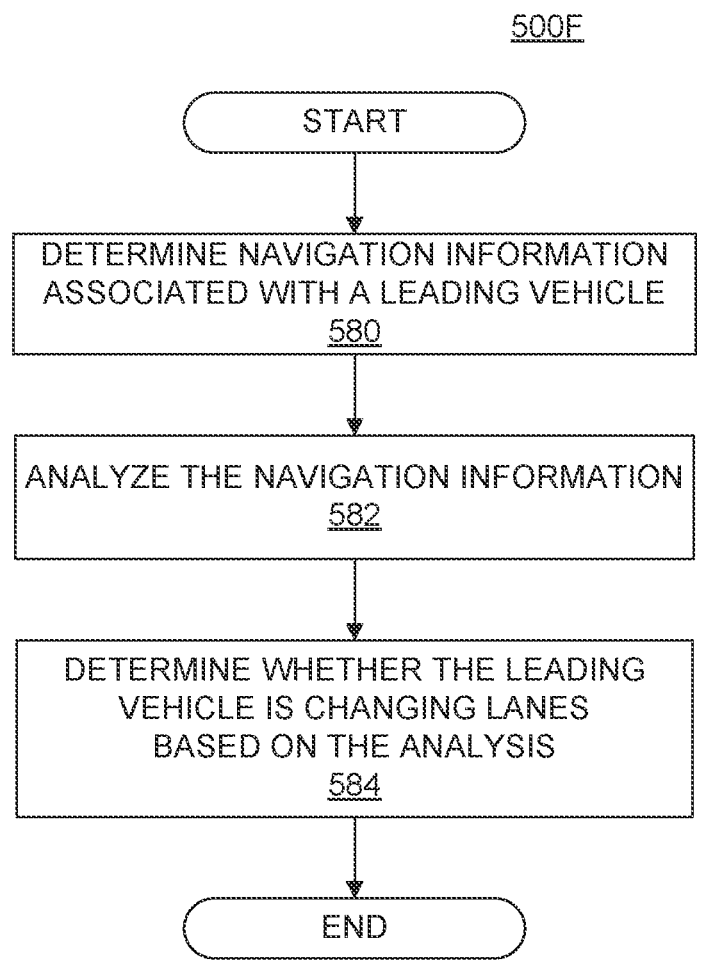
FIG. 5F is a flowchart showing an exemplary process for determining whether a leading vehicle is changing lanes consistent with the disclosed embodiments.

FIG. 5F is a flowchart showing an exemplary process 500F for determining whether a leading vehicle is changing lanes, consistent with the disclosed embodiments. At step 580, processing unit 110 may determine navigation information associated with a leading vehicle (e.g., a vehicle traveling ahead of vehicle 200). For example, processing unit 110 may determine the position, velocity (e.g., direction and speed), and/or acceleration of the leading vehicle, using the techniques described in connection with FIGS. 5A and 5B, above. Processing unit 110 may also determine one or more road polynomials, a look-ahead point (associated with vehicle 200), and/or a snail trail (e.g., a set of points describing a path taken by the leading vehicle), using the techniques described in connection with FIG. 5E, above.

At step 582, processing unit 110 may analyze the navigation information determined at step 580. In one embodiment, processing unit 110 may calculate the distance between a snail trail and a road polynomial (e.g., along the trail). If the variance of this distance along the trail exceeds a predetermined threshold (for example, 0.1 to 0.2 meters on a straight road, 0.3 to 0.4 meters on a moderately curvy road, and 0.5 to 0.6 meters on a road with sharp curves), processing unit 110 may determine that the leading vehicle is likely changing lanes. In the case where multiple vehicles are detected traveling ahead of vehicle 200, processing unit 110 may compare the snail trails associated with each vehicle. Based on the comparison, processing unit 110 may determine that a vehicle whose snail trail does not match with the snail trails of the other vehicles is likely changing lanes. Processing unit 110 may additionally compare the curvature of the snail trail (associated with the leading vehicle) with the expected curvature of the road segment in which the leading vehicle is traveling. The expected curvature may be extracted from map data (e.g., data from map database 160), from road polynomials, from other vehicles' snail trails, from prior knowledge about the road, and the like. If the difference in curvature of the snail trail and the expected curvature of the road segment exceeds a predetermined threshold, processing unit 110 may determine that the leading vehicle is likely changing lanes.

In another embodiment, processing unit 110 may compare the leading vehicle's instantaneous position with the look-ahead point (associated with vehicle 200) over a specific period of time (e.g., 0.5 to 1.5 seconds). If the distance between the leading vehicle's instantaneous position and the look-ahead point varies during the specific period of time, and the cumulative sum of variation exceeds a predetermined threshold (for example, 0.3 to 0.4 meters on a straight road, 0.7 to 0.8 meters on a moderately curvy road, and 1.3 to 1.7 meters on a road with sharp curves), processing unit 110 may determine that the leading vehicle is likely changing lanes. In another embodiment, processing unit 110 may analyze the geometry of the snail trail by comparing the lateral distance traveled along the trail with the expected curvature of the snail trail. The expected radius of curvature may be determined according to the calculation: $(\delta_z^2 + \delta_x^2)/2/(\delta_x)$, where $\delta_x$ represents the lateral distance traveled and $\delta_z$ represents the longitudinal distance traveled. If the difference between the lateral distance traveled and the expected curvature exceeds a predetermined threshold (e.g., 500 to 700 meters), processing unit 110 may determine that the leading vehicle is likely changing lanes. In another embodiment, processing unit 110 may analyze the position of the leading vehicle. If the position of the leading vehicle obscures a road polynomial (e.g., the leading vehicle is overlaid on top of the road polynomial), then processing unit 110 may determine that the leading vehicle is likely changing lanes. In the case where the position of the leading vehicle is such that, another vehicle is detected ahead of the leading vehicle and the snail trails of the two vehicles are not parallel, processing unit 110 may determine that the (closer) leading vehicle is likely changing lanes.

At step 584, processing unit 110 may determine whether or not leading vehicle 200 is changing lanes based on the analysis performed at step 582. For example, processing unit 110 may make the determination based on a weighted average of the individual analyses performed at step 582. Under such a scheme, for example, a decision by processing unit 110 that the leading vehicle is likely changing lanes based on a particular type of analysis may be assigned a value of "1" (and "0" to represent a determination that the leading vehicle is not likely changing lanes). Different analyses performed at step 582 may be assigned different weights, and the disclosed embodiments are not limited to any particular combination of analyses and weights. Furthermore, in some embodiments, the analysis may make use of trained system (e.g., a machine learning or deep learning system), which may, for example, estimate a future path ahead of a current location of a vehicle based on an image captured at the current location.

FIG. 6 is a flowchart showing an exemplary process 600 for causing one or more navigational responses based on stereo image analysis, consistent with disclosed embodiments. At step 610, processing unit 110 may receive a first and second plurality of images via data interface 128. For example, cameras included in image acquisition unit 120 (such as image capture devices 122 and 124 having fields of view 202 and 204) may capture a first and second plurality of images of an area forward of vehicle 200 and transmit them over a digital connection (e.g., USB, wireless, Bluetooth, etc.) to processing unit 110. In some embodiments, processing unit 110 may receive the first and second plurality of images via two or more data interfaces. The disclosed embodiments are not limited to any particular data interface configurations or protocols.

At step 620, processing unit 110 may execute stereo image analysis module 404 to perform stereo image analysis of the first and second plurality of images to create a 3D map of the road in front of the vehicle and detect features within the images, such as lane markings, vehicles, pedestrians, road signs, highway exit ramps, traffic lights, road hazards, and the like. Stereo image analysis may be performed in a manner similar to the steps described in connection with FIGS. 5A-5D, above. For example, processing unit 110 may execute stereo image analysis module 404 to detect candidate objects (e.g., vehicles, pedestrians, road marks, traffic lights, road hazards, etc.) within the first and second plurality of images, filter out a subset of the candidate objects based on various criteria, and perform multi-frame analysis, construct measurements, and determine a confidence level for the remaining candidate objects. In performing the steps above, processing unit 110 may consider information from both the first and second plurality of images, rather than information from one set of images alone. For example, processing unit 110 may analyze the differences in pixel-level data (or other data subsets from among the two streams of captured images) for a candidate object appearing in both the first and second plurality of images. As another example, processing unit 110 may estimate a position and/or velocity of a candidate object (e.g., relative to vehicle 200) by observing that the object appears in one of the plurality of images but not the other or relative to other differences that may exist relative to objects appearing in the two image streams. For example, position, velocity, and/or acceleration relative to vehicle 200 may be determined based on trajectories, positions, movement characteristics, etc. of features associated with an object appearing in one or both of the image streams.

At step 630, processing unit 110 may execute navigational response module 408 to cause one or more navigational responses in vehicle 200 based on the analysis performed at step 620 and the techniques as described above in connection with FIG. 4. Navigational responses may include, for example, a turn, a lane shift, a change in acceleration, a change in velocity, braking, and the like. In some embodiments, processing unit 110 may use data derived from execution of velocity and acceleration module 406 to cause the one or more navigational responses. Additionally, multiple navigational responses may occur simultaneously, in sequence, or any combination thereof.

Figure 7:
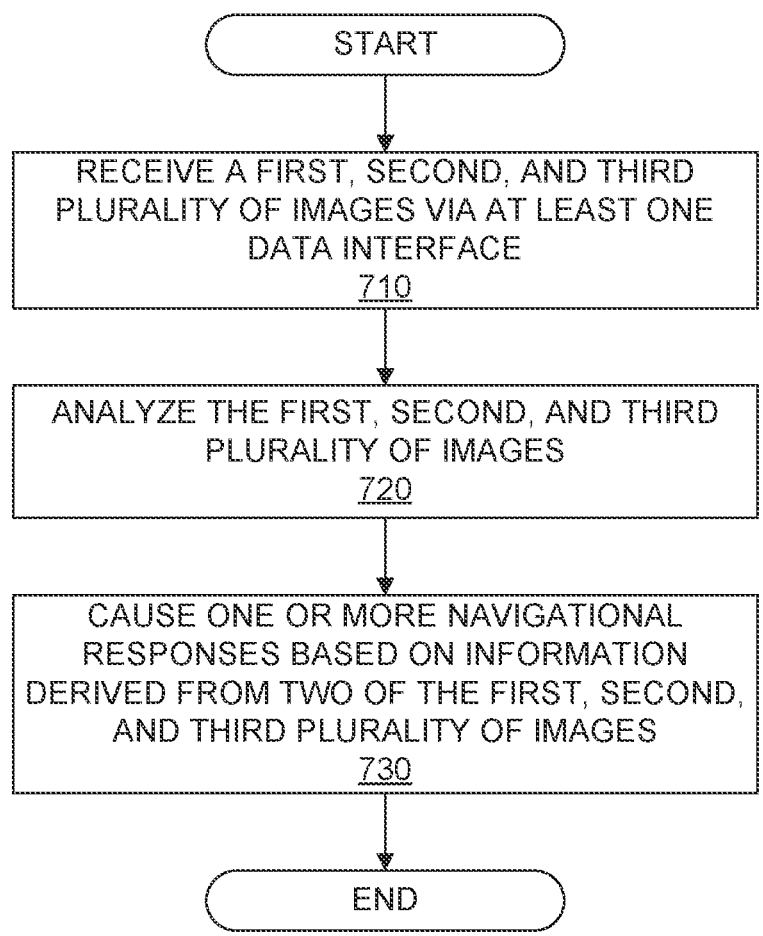
FIG. 7 is a flowchart showing an exemplary process for causing one or more navigational responses based on an analysis of three sets of images consistent with the disclosed embodiments.

FIG. 7 is a flowchart showing an exemplary process 700 for causing one or more navigational responses based on an analysis of three sets of images, consistent with disclosed embodiments. At step 710, processing unit 110 may receive a first, second, and third plurality of images via data interface 128. For instance, cameras included in image acquisition unit 120 (such as image capture devices 122, 124, and 126 having fields of view 202, 204, and 206) may capture a first, second, and third plurality of images of an area forward and/or to the side of vehicle 200 and transmit them over a digital connection (e.g., USB, wireless, Bluetooth, etc.) to processing unit 110. In some embodiments, processing unit 110 may receive the first, second, and third plurality of images via three or more data interfaces. For example, each of image capture devices 122, 124, 126 may have an associated data interface for communicating data to processing unit 110. The disclosed embodiments are not limited to any particular data interface configurations or protocols.

At step 720, processing unit 110 may analyze the first, second, and third plurality of images to detect features within the images, such as lane markings, vehicles, pedestrians, road signs, highway exit ramps, traffic lights, road hazards, and the like. The analysis may be performed in a manner similar to the steps described in connection with FIGS. 5A-5D and 6, above. For instance, processing unit 110 may perform monocular image analysis (e.g., via execution of monocular image analysis module 402 and based on the steps described in connection with FIGS. 5A-5D, above) on each of the first, second, and third plurality of images. Alternatively, processing unit 110 may perform stereo image analysis (e.g., via execution of stereo image analysis module 404 and based on the steps described in connection with FIG. 6, above) on the first and second plurality of images, the second and third plurality of images, and/or the first and third plurality of images. The processed information corresponding to the analysis of the first, second, and/or third plurality of images may be combined. In some embodiments, processing unit 110 may perform a combination of monocular and stereo image analyses. For example, processing unit 110 may perform monocular image analysis (e.g., via execution of monocular image analysis module 402) on the first plurality of images and stereo image analysis (e.g., via execution of stereo image analysis module 404) on the second and third plurality of images. The configuration of image capture devices 122, 124, and 126—including their respective locations and fields of view 202, 204, and 206—may influence the types of analyses conducted on the first, second, and third plurality of images. The disclosed embodiments are not limited to a particular configuration of image capture devices 122, 124, and 126, or the types of analyses conducted on the first, second, and third plurality of images.

In some embodiments, processing unit 110 may perform testing on system 100 based on the images acquired and analyzed at steps 710 and 720. Such testing may provide an indicator of the overall performance of system 100 for certain configurations of image capture devices 122, 124, and 126. For example, processing unit 110 may determine the proportion of "false hits" (e.g., cases where system 100 incorrectly determined the presence of a vehicle or pedestrian) and "misses."

At step 730, processing unit 110 may cause one or more navigational responses in vehicle 200 based on information derived from two of the first, second, and third plurality of images. Selection of two of the first, second, and third plurality of images may depend on various factors, such as, for example, the number, types, and sizes of objects detected in each of the plurality of images. Processing unit 110 may also make the selection based on image quality and resolution, the effective field of view reflected in the images, the number of captured frames, the extent to which one or more objects of interest actually appear in the frames (e.g., the percentage of frames in which an object appears, the proportion of the object that appears in each such frame, etc.), and the like.

In some embodiments, processing unit 110 may select information derived from two of the first, second, and third plurality of images by determining the extent to which information derived from one image source is consistent with information derived from other image sources. For example, processing unit 110 may combine the processed information derived from each of image capture devices 122, 124, and 126 (whether by monocular analysis, stereo analysis, or any combination of the two) and determine visual indicators (e.g., lane markings, a detected vehicle and its location and/or path, a detected traffic light, etc.) that are consistent across the images captured from each of image capture devices 122, 124, and 126. Processing unit 110 may also exclude information that is inconsistent across the captured images (e.g., a vehicle changing lanes, a lane model indicating a vehicle that is too close to vehicle 200, etc.). Thus, processing unit 110 may select information derived from two of the first, second, and third plurality of images based on the determinations of consistent and inconsistent information.

Navigational responses may include, for example, a turn, a lane shift, a change in acceleration, and the like. Processing unit 110 may cause the one or more navigational responses based on the analysis performed at step 720 and the techniques as described above in connection with FIG. 4. Processing unit 110 may also use data derived from execution of velocity and acceleration module 406 to cause the one or more navigational responses. In some embodiments, processing unit 110 may cause the one or more navigational responses based on a relative position, relative velocity, and/or relative acceleration between vehicle 200 and an object detected within any of the first, second, and third plurality of images. Multiple navigational responses may occur simultaneously, in sequence, or any combination thereof.

Navigating Lane Merges and Lane Splits

In one embodiment, an autonomous vehicle (e.g., vehicle 200) may encounter lanes of different types while navigating. For example, the lane in which the autonomous vehicle is traveling may merge with an adjacent lane. When encountering a lane merge scenario, another vehicle may be traveling in a neighboring lane that is ending and that vehicle may merge in front of the autonomous vehicle. The autonomous vehicle may therefore slow down and/or adjust its course in view of one or more characteristics of the other vehicle. For example, if the other vehicle moves over quickly and without leaving much space in between, the autonomous vehicle may need to adjust its speed and/or change lanes. As another example, the lane in which the autonomous vehicle is traveling may split to form an additional adjacent lane, such as an exit lane.

When encountering a lane split scenario, another vehicle ahead of the autonomous vehicle may change lanes or exit a road and no longer be positioned ahead of the autonomous vehicle in the lane. The autonomous vehicle may therefore maintain or increase its rate of acceleration in anticipation of the departure of the other vehicle from the lane. However, if the vehicle is predicted to stay in the same lane as the autonomous vehicle past the split lane, the autonomous vehicle may maintain or decrease its rate of acceleration.

Disclosed embodiments include systems and methods for navigating an autonomous vehicle to take the foregoing lane change scenarios and any potential maneuvers that other neighboring vehicles may make in view of the lane change into consideration while navigating.

For example, in one embodiment, a system for navigating a host vehicle (e.g., an autonomous vehicle) may include an image capture device and at least one processing device. The at least one processing device may be programmed to receive, from the image capture device, a plurality of images representative of an environment of the host vehicle. The environment may include a road on which the host vehicle is traveling and a target vehicle. The target vehicle may be another vehicle in a vicinity of the host vehicle and identified by the host vehicle's navigational system.

In a typical lane merge scenario, the target vehicle may travel in a lane of the road that is different from the lane on which the host vehicle is traveling. That is, the target vehicle may travel in an adjacent lane which is merging with the lane in which the host vehicle is traveling. On the other hand, in a typical lane split scenario, the target vehicle may travel in a lane of the road in which the host vehicle is traveling. That is, the target vehicle may travel forward of the host vehicle and in the same lane as the host vehicle.

The at least one processing device may be further programmed to analyze at least one of the plurality of images to identify the target vehicle, and to analyze at least one of the plurality of images to identify at least one lane mark associated with the lane in which the target vehicle is traveling. A lane mark may be, for example, painted markings or indications delineating a lane of a road or a physical object delineating a lane on a road. Such physical objects may include barriers, dividers, medians, etc.

The at least one processing device may be further programmed to detect one or more lane mark characteristics of the at least one identified lane mark, and use the one or more detected lane mark characteristics to determine a type of the at least one identified lane mark. For example, a lane mark characteristic may indicate a feature of a lane mark, which the system may use to determine a type of the lane mark (e.g., whether the lane mark is a merge lane mark or a split lane mark).

Additionally, the at least one processing device may be further programmed to determine at least one characteristic of the target vehicle. For example, a characteristic of the target vehicle may include a position of the target vehicle on the road. Based on the determined lane mark type and the determined characteristic of the target vehicle, the at least one processing device may be further programmed to determine a navigational action for the host vehicle. The navigational action may include changing or maintaining one or more of steering, braking, or acceleration/deceleration of the host vehicle.

FIG. 8A is an illustration of exemplary lane merges on a roadway consistent with the disclosed embodiments. As shown in FIG. 8A, some lane merges may take the form of a "merge" lane merge 800. In a "merge" lane merge, the lane in which a host vehicle 200 is traveling, that is, the "host" lane, may merge with an adjacent lane, requiring the host vehicle 200 and a target vehicle 802 in the adjacent lane to merge together.

Another example of a lane merge is a "merge to" lane merge. In a "merge to" lane merge 804, the "host" lane in which a host vehicle 200 is traveling may merge into an adjacent lane, as shown, such that the host vehicle will "merge to" the adjacent lane and merge with the target vehicle 802 in the adjacent lane. If the adjacent lane is to the left of the host vehicle, as shown, the lane merge may be a "merge to left" lane merge, while if the adjacent lane is to the right of the host vehicle the lane merge may be a "merge to right" lane merge.

Still another example of a lane merge is a "merge from" lane merge 806. In a "merge from" lane merge, an adjacent lane may merge into the "host" lane in which a host vehicle 200 is traveling, such that a target vehicle 802 in the adjacent lane will "merge from" the adjacent lane into the "host" lane in which the host vehicle 200 is traveling. If the adjacent lane is to the right of the host vehicle 200, as shown, such that the target vehicle 802 will "merge from" the right, the lane merge may be a "merge from right" lane merge, while if the adjacent lane is to the left of the host vehicle 200, such that the target vehicle 802 will "merge from" the left, the lane merge may be a "merge from left" lane merge.

Other lane changes may take the form of a lane split. FIG. 8B is an illustration of exemplary lane splits on a roadway consistent with the disclosed embodiments. For example, in a "split" lane split 808, a "host" lane in which a host vehicle 200 is traveling may split into two lanes, such that the host vehicle 200 will select a lane in which to travel. In some instances of a "split" lane split, a target vehicle (not shown in the example of a "split" lane split in FIG. 8B) may be traveling forward of the host vehicle. The target vehicle may similarly select a lane in which to travel.

Another example of a lane split is a "lane open" lane split 810. In a "lane open" lane split 810, a "host" lane in which the host vehicle 200 is traveling may remain unchanged, but a new lane may appear adjacent to the "host" lane in which the host vehicle 200 is traveling. The new adjacent lane may be, for example, an exit lane. If the new adjacent lane is to the right of the "host" lane in which the host vehicle 200 is traveling, as shown, the lane split may be a "lane open right" lane split, while if the new adjacent lane is to the left of the "host" lane in which the host vehicle 200 is traveling the lane split may be a "lane open left" lane split. In some instances of a "lane open" lane split, a target vehicle (not shown in the example of a "lane open" lane split in FIG. 8B) may be traveling forward of the host vehicle. The target vehicle may continue to travel in the same lane or travel into the new lane.

Still another example of a lane split is a "lane expansion" lane split 812. In a "lane expansion" lane split 812, a "host" lane in which the host vehicle 200 is traveling may expand to form a new adjacent lane. The new adjacent lane may be, for example, an exit lane. If the new adjacent lane is to the right of the "host" lane in which the host vehicle 200 is traveling, as shown, the lane split may be a "lane expansion right" lane split, while if the new adjacent lane is to the left of the "host" lane in which the host vehicle 200 is traveling the lane split may be a "lane expansion left" lane split. In some instances of a "lane open" lane split, a target vehicle 802 may be traveling forward of the host vehicle. The target vehicle 802 may continue to travel in the same lane or travel into the new lane.

Figure 9:
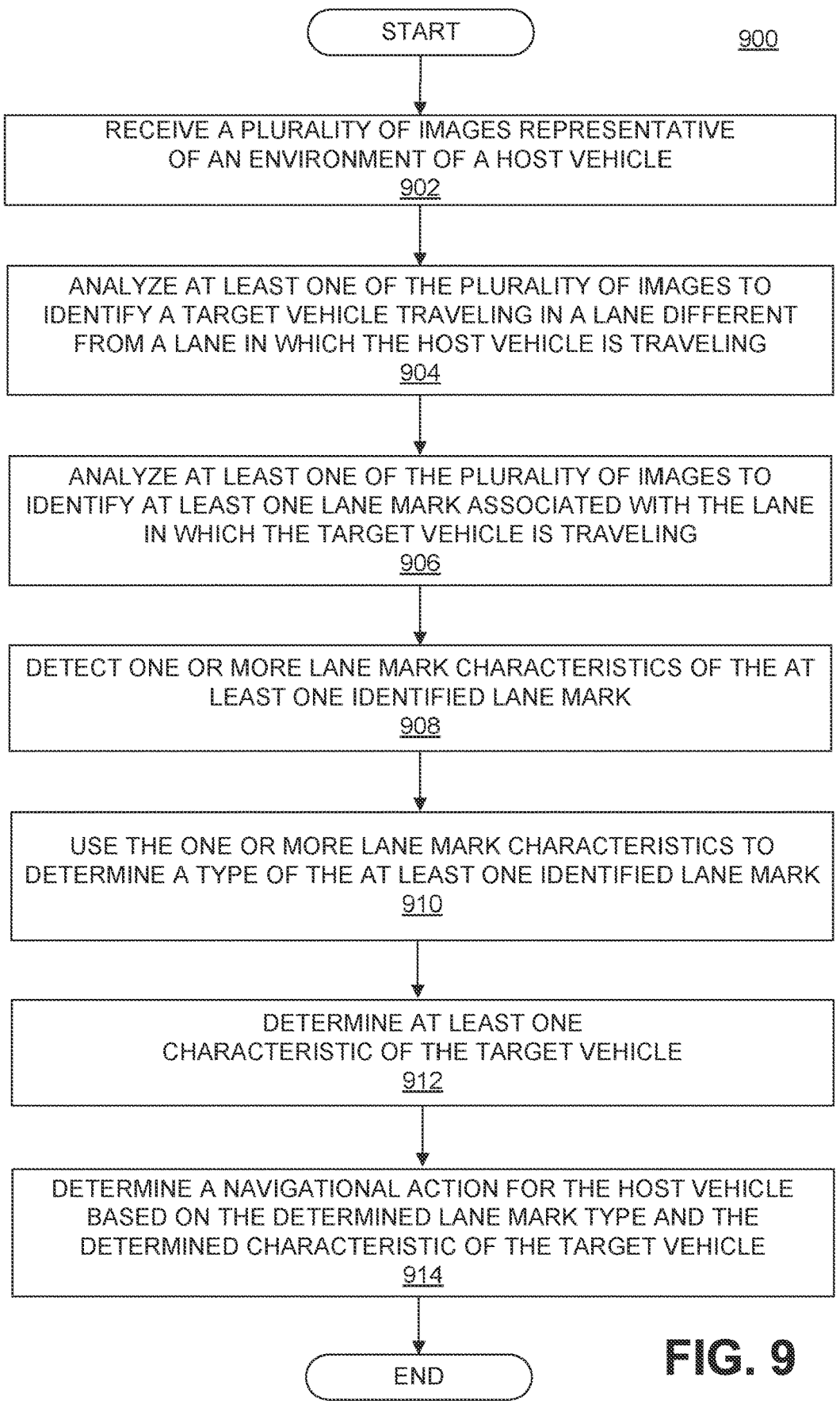
FIG. 9 is a flowchart showing an exemplary process for determining one or more navigational actions based on a lane change analysis consistent with the disclosed embodiments.

FIG. 9 is a flowchart showing an exemplary process 900 for determining one or more navigational actions based on a lane change analysis consistent with the disclosed embodiments. Process 900 may, for example, be carried out by processing unit 110 described above. For purposes of illustration, process 900 will be described with reference to FIG. 10A, which is a top view illustration of an autonomous vehicle (e.g., vehicle 200) on a roadway with a lane merge consistent with the disclosed embodiments, and with reference to FIG. 10B, which is an illustration of an exemplary lane change analysis for a lane merge consistent with disclosed embodiments. In the following discussion, the autonomous vehicle is referred to as a host vehicle (e.g., vehicle 200), and may include any one or more of the components of system 100, as discussed above in connection with FIG. 1.

Figure 10A:
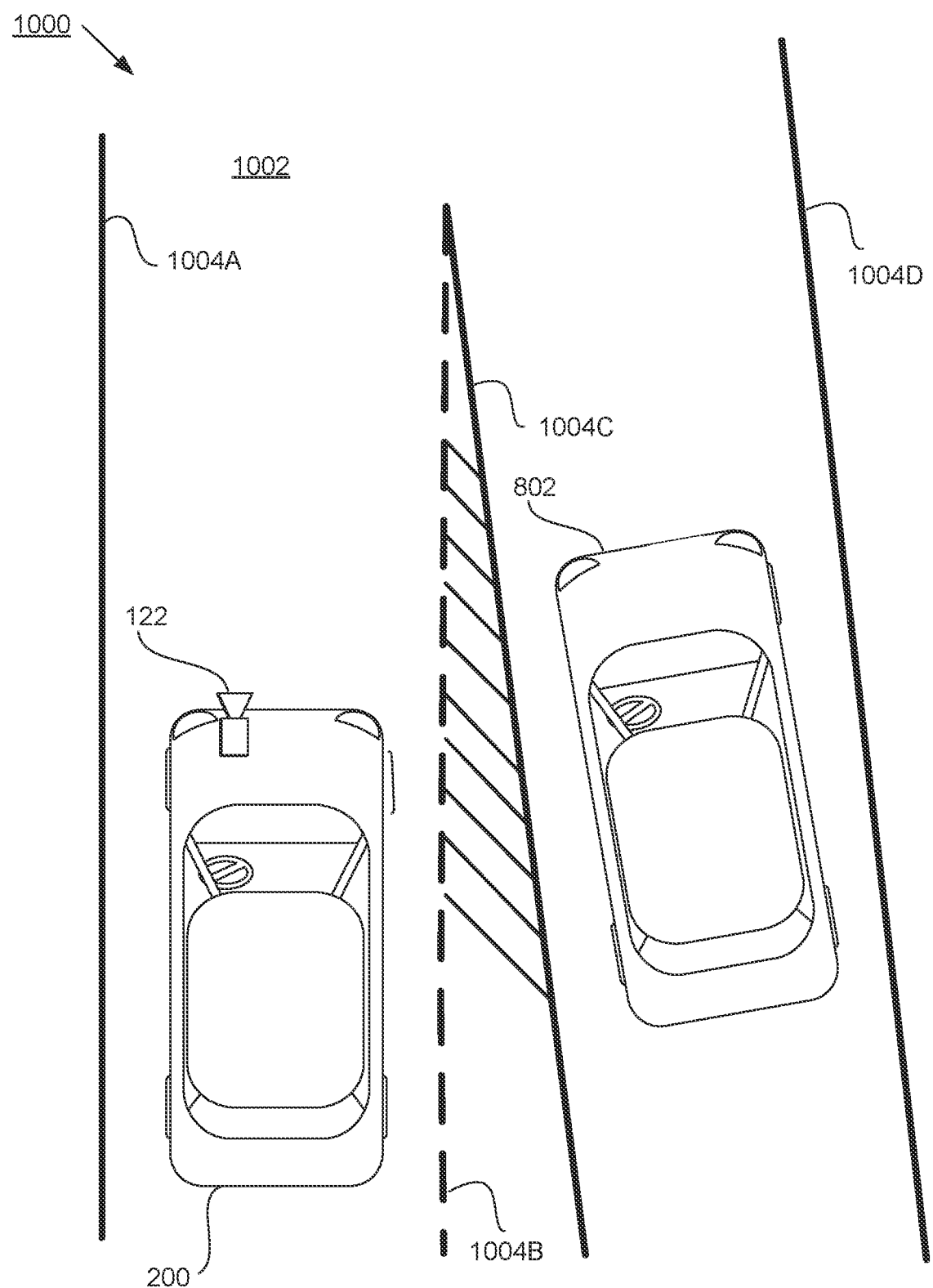
FIG. 10A is a top view illustration of an autonomous vehicle on a roadway with a lane merge consistent with disclosed embodiments.

At step 902, processing unit 110 may receive, from an image capture device, a plurality of images representative of an environment of the host vehicle. The environment includes a road on which the host vehicle is traveling. For example, as shown in FIG. 10A, image capture device 122 may capture at least one image representative of an environment 1000 of host vehicle 200. Environment 1000 may include a road 1002 on which host vehicle 200 is traveling.

Image capture device 122 may take any of the forms described above for image capture device 122, image capture device 124, and/or image capture device 126. While host vehicle 200 is shown with one image capture device 122 in a particular location, it will be understood that host vehicle 200 may include additional image capture device(s) 122 and/or additional or alternative locations for image capture device(s) 122 (e.g., as shown in any of the foregoing figures) other than that depicted in FIG. 10A are possible as well.

As shown, environment 1000 includes, in addition to road 1002, a target vehicle 802. Additionally, as shown, host vehicle 200 is traveling in a lane on road 1002, and target vehicle 802 is traveling in a different lane on road 1002 than the lane in which host vehicle 200 is traveling. While a single target vehicle 802 is shown in a particular location on road 1002, it will be understood that additional target vehicle(s) 802 and/or additional or alternative locations for target vehicle(s) 802 are possible. Moreover, while road 1002 is shown to include two lanes in a particular configuration, it will be understood that road 1002 may include any number of lanes in any configuration.

Road 1002 includes lane marks 1004A-1004D. While lane marks 1004A-1004D are shown as two-dimensional marks (e.g., paint, decals, etc.) on road 1002, in some embodiments lane marks 1004A-1004D may be three-dimensional marks such as barriers, dividers, etc. Other lane marks 1004A-1004D are possible as well. And while lane marks 1004A-1004D are shown in particular locations and having particular configurations, it will be understood that more or fewer lane marks 1004A-1004D and/or lane marks 1004A-1004D having alternative locations and/or configurations are contemplated.

As noted above, one or more image capture devices (e.g., image capture device 122) may capture at least one image representative of environment 1000. In some embodiments, image(s) captured by image capture device 122 may include a representation of road 1002, target vehicle 802, and/or one or more of lane marks 1004A-1004D on road 1002. The image(s) may take the form of, for example, gray-scale or color images. In some embodiments, the image(s) may not be full resolution images. Alternatively or additionally, resolution may vary within an image as needed to identify and/or label lane marks, as described below. For example, in an image a horizontal strip including the road area and the horizon may be of higher resolution than horizontal strips representing the sky and/or hood of the host vehicle. As another example, horizontal strips of an image representing the horizon may be of higher resolution than horizontal strips representing the road closer to the host vehicle, as lane marks closer to the horizon may be smaller and more difficult to identify. In some embodiments, portions of an image may be subsampled or upsampled as desired to adjust resolution.

Returning to FIG. 9, at step 904, processing unit 110 may analyze at least one of the plurality of images to identify a target vehicle traveling in a lane of the road different from a lane in which the host vehicle is traveling. For example, as shown in FIG. 10A, the images captured by image capture unit 122 may include a representation of target vehicle 802 traveling in a lane of road 1002 that is different from a lane in which host vehicle 200 is traveling. The lane in which target vehicle 802 may include a neighboring and/or adjacent lane to the lane in which host vehicle 200 is traveling. Processing unit 110 may analyze one or more of the captured images to identify target vehicle 802 using, for example, monocular image analysis module 402 and/or stereo image analysis module 404 described above in connection with FIG. 4.

Returning to FIG. 9, at step 906, processing unit 110 may analyze at least one of the plurality of images to identify at least one lane mark associated with the lane in which the target vehicle is traveling. For example, as shown in FIG. 10A, the images captured by image capture unit 122 may include a representation of lane marks 1004C and 1004D on road 1002. Processing unit 110 may analyze the images to identify lane marks 1004C and 1004D using, for example, monocular image analysis module 402 and/or stereo image analysis module 404 described above in connection with FIG. 4. Alternatively or additionally, in some embodiments, processing unit 110 may identify lane marks 1004C and 1004D in a manner similar to that described in Stein, U.S. Pat. No. 7,151,996, the contents of which are incorporated by reference in their entirety. In some embodiments, processing unit 110 may identify one or both of lane marks 1004A and 1004B in any of the manners described above.

Returning to FIG. 9, at step 908 processing unit 110 may detect one or more lane mark characteristics of the at least one identified mark. The detected lane mark characteristic(s) may include, for example, a distance of the at least one identified lane mark to a reference point. The reference point may include, for example, a sign, lamppost, traffic signal, curb, or other road feature. Alternatively or in addition, the reference point may include another landmark (e.g., a tree, building, bridge, overpass, parked vehicle, body of water, etc.). Still further, the reference point may include another lane mark on the road. For instance, referring to FIG. 10A, the detected lane mark characteristic(s) may include a distance between lane marks 1004A and 1004C or between lane marks 1004B and 1004C. As another example, the detected lane mark characteristic(s) may include an intersection of the at least one identified lane mark with at least one other lane mark of the road. Referring to FIG. 10A, the detected lane mark characteristic(s) may include an intersection of lane marks 1004B and 1004C. As still another example, the detected lane mark characteristic(s) may include a change in lateral distance between the at least one identified lane mark and at least one other lane mark of road 1002. For example, referring to FIG. 10A, the detected lane mark characteristic(s) may include a change in lateral distance between lane marks 1004A and 1004C or between lane marks 1004B and 1004C.

Returning to FIG. 9, at step 910, processing unit 110 may use the one or more detected lane mark characteristics to determine a type of the at least one identified lane mark. In some embodiments, such as the example depicted in FIG. 10A, the type of the lane mark may be a merge lane. A merge lane may include a "merge" merge lane, a "merge to" merge lane, or a "merge from" merge lane, as described above in connection with FIG. 8A. Alternatively, in some embodiments, the type of the lane mark may be a split lane, such as a "split" split lane, a "lane open" split lane, or a "lane expansion" split lane, as described above in connection with FIG. 8B, and discussed in connection with FIG. 11 below.

In embodiments where the detected lane mark characteristic(s) include, for example, a distance of the at least one identified lane mark to a reference point, such as another mark on the road, using the detected lane mark characteristic(s) to determine a type of the identified lane mark(s) may involve determining whether the distance between the identified lane mark(s) and the reference point is increasing, decreasing, or remaining constant as a distance from the host vehicle increases (e.g., over a distance along the road forward of the host vehicle). For instance, referring to FIG. 10A, if the detected lane mark characteristic(s) include a distance between lane marks 1004A and 1004C and/or between lane marks 1004B and 1004C, a decreasing distance between the lane marks may indicate that the lane mark type for lane mark 1004C is a merge lane. By contrast, if the distance between lane marks 1004A and 1004C and/or between lane marks 1004B and 1004C is increasing, processing unit 110 may determine that the lane mark type for lane mark 1004C is a split lane.

Alternatively or additionally, in embodiments where the detected lane mark characteristic(s) include, for example, an intersection of the identified lane mark(s) with at least one other lane mark on the road, using the detected lane mark characteristic(s) to determine a type of the identified lane mark(s) may involve determining that the intersection indicates the lane mark type is a merge lane. For instance, referring to FIG. 10A, if the detected lane mark characteristic(s) include an intersection of lane marks 1004B and 1004C, processing unit 110 may determine that the lane mark type for lane mark 1004C is a merge lane.

Still alternatively or additionally, if the detected lane mark characteristic(s) include a change in a lateral distance between the at least one identified lane mark and at least one other lane mark of road 1002, using the detected lane mark characteristic(s) to determine a type of the identified lane mark(s) may involve determining whether the lateral distance between the identified lane mark(s) and the other lane mark(s) is increasing, decreasing, or remaining constant as a distance from the host vehicle increases.

For example, determining a lateral distance between lane marks over a distance along a road forward of the host vehicle may include determining a lateral distance A between a first lane mark and a second lane mark at a reference point A forward of the host vehicle, and determining a lateral distance B between the first lane mark and the second lane mark at a reference point B forward of reference point A. Comparing lateral distance A and lateral distance B may indicate whether the lateral distances between the lane marks is increasing or decreasing. If lateral distance A is greater than lateral distance B, the lateral distances between the first lane mark and the second lane marks may be decreasing. A decreasing lateral distance between lane marks as a distance forward of the host vehicle increases may indicate that a lane mark is a merge lane mark. If lateral distance A is less than lateral distance B, the lateral distances between the first lane mark and the second lane mark may be increasing. An increasing lateral distance between lane marks as a distance forward of the host vehicle increases may indicate that a lane mark is a split lane mark. Other comparisons are contemplated and consistent with the disclosed embodiments. For example, determination of lane mark types may include computing a difference between lateral distance A and lateral distance B, or vice versa. For example, if the difference between lateral distance A and lateral distance B (i.e., A minus B) is a positive value, then the lateral distances between lane marks over a distance forward of the host vehicle may be decreasing, which may indicate a merge lane mark. If, however, the difference between lateral distance A and lateral distance B (i.e., A minus B) is a negative value, then the lateral distances between lane marks over a distance forward of the host vehicle may be increasing, which may indicate that a lane mark is a split lane mark.

For instance, referring to FIG. 10A, if the detected lane mark characteristic(s) include a lateral distance between lane marks 1004A and 1004C and/or between lane marks 1004B and 1004C, a decreasing lateral distance between the lane marks over a distance forward of the host vehicle may indicate that the lane mark type for lane mark 1004C is a merge lane. By contrast, if the lateral distance between lane marks 1004A and 1004C and/or between lane marks 1004B and 1004C is increasing over a distance forward of the host vehicle, processing unit 110 may determine that the lane mark type for lane mark 1004C is a split lane.

Other lane mark characteristics are contemplated and consistent with the disclosed embodiments. For example, a lane mark characteristic may include one or more of a size, shape, and color of a lane mark. Still further, in some embodiments, a lane mark characteristic may include a positional relationship between a lane mark and another lane mark. For example, a lane mark may be adjoining (e.g., next to or joining) another lane mark, or the lane mark may be oriented in a particular direction (e.g., at a particular angle) in relation to another lane mark.

Returning to FIG. 9, at step 912, processing unit 110 may determine at least one characteristic of the target vehicle. In some embodiments, determining the characteristic(s) of the target vehicle may involve analyzing the plurality of images, as described above in connection with steps 904 and 906. In some embodiments, determining the characteristic(s) of the target vehicle may involve analyzing data from one or more sensors and/or devices of the host vehicle (e.g., an image sensor, lidar, radar, a GPS device, a speed sensor, an accelerometer, a suspension sensor, an acoustic sensor, etc.).

In some embodiments, the determined characteristic(s) of the target vehicle may include a position of the target vehicle on the road forward of the host vehicle. For example, referring to FIG. 10A, the determined characteristic(s) of target vehicle 802 may include a position of target vehicle 802 on road 1002. The position may be a position relative to host vehicle 200, one or more of lane marks 1004A-1004D, and/or another reference point on road 1002, or may be position data (e.g., GPS position data), as described above in connection with FIG. 1. Alternatively or additionally, in some embodiments the determined characteristic(s) of the target vehicle may include a detected lateral motion of the target vehicle relative to the identified lane mark(s). For example, referring to FIG. 10A, the determined characteristic(s) of target vehicle 802 may include a detected lateral motion of target vehicle 802 relative to lane mark 1004C. Still alternatively or additionally, in some embodiments the determined characteristic(s) of the target vehicle may include a velocity of the target vehicle relative to the host vehicle. For example, referring to FIG. 10A, the determined characteristic(s) of target vehicle 802 may include a velocity of target vehicle 802 relative to host vehicle 200. Alternatively or additionally, in some embodiments the determined characteristic(s) of the target vehicle may include a predicted trajectory of the target vehicle. For example, referring to FIG. 10A, the determined characteristic(s) of target vehicle 802 may include a predicted trajectory of target vehicle 802. Processing unit 110 may predict the trajectory of target vehicle 802 based on, for example, an analysis of at least two of the plurality of images captured in step 902.

Returning to FIG. 9, at step 914, processing unit 110 may determine a navigational action for the host vehicle based on the determined lane mark type and the determined characteristic of the target vehicle. The navigational action may include changing or maintaining one or more of steering, braking, or acceleration/deceleration of the host vehicle. In some embodiments, the navigational action may be carried out using one or more of the throttling system 220, braking system 230, steering system 240, velocity and acceleration module 406, and navigational response module 408 described above in connection with FIGS. 2F and 4. For example, the navigational action may be an increase, a maintaining of, or a decrease in a rate of acceleration of the host vehicle. As another example, the navigational action may be a steering of the host vehicle, such as a leftward or rightward steering.

While step 914 contemplates determining a navigational action for the host vehicle based on both the determined lane mark type and the determined characteristic of the target vehicle, it will be understood that, in some embodiments, the navigational action may be determined based only on the determined lane mark type or only on the determined characteristic of the target vehicle. For example, while FIG. 10A shows target vehicle 802, in some embodiments no target vehicle 802 may be present, and the navigational action may be determined based only on the determined lane mark type.

The determined navigational action for the host vehicle may be based on the determined lane mark type. For example, if the determined lane mark type is a lane merge, the navigational action for the host vehicle may be determined to facilitate a safe merge with the target vehicle. This may involve, for instance, an acceleration or deceleration of the host vehicle to avoid a collision with the target vehicle. In some instances, to safely merge with the target vehicle, the navigational action may include steering the host vehicle to an adjoining lane. As another example, if the determined lane mark type is a lane split, the navigational action for the host vehicle may be determined to facilitate traveling of the host vehicle in the appropriate lane. This may involve, for instance, steering of the host vehicle to remain aligned with the appropriate lane.

The determined navigational action for the host vehicle may be further based on the determined characteristic of the target vehicle. For example, if the determined characteristic(s) of the target vehicle include a position of the target vehicle on the road forward of the host vehicle, the navigational action for the host vehicle may be determined to avoid a collision with the target vehicle, e.g., through acceleration or deceleration of the host vehicle. As another example, if the determined characteristic(s) of the target vehicle include a detected lateral motion of the target vehicle relative to the identified lane mark(s), the navigational action for the host vehicle may be determined to facilitate a safe merge with the target vehicle. For instance, referring to FIG. 10A, processing unit 110 may use the detected lateral motion of target vehicle 802 relative to lane mark 1004C to determine whether target vehicle 802 is moving at a reasonable speed and/or maintaining a safe distance from host vehicle 200. For instance, when target vehicle 802 maintains a position that is parallel or substantially parallel to lane mark 1004C or moves over lane mark 1004C at an angle that is approaching 90 degrees, target vehicle 802 is likely to be moving over at a reasonable pace with sufficient distance between it and host vehicle 200. If, however, target vehicle 802 is moving such that its trajectory is intersecting lane mark 1004C at an angle (e.g., a small angle less than 90 degrees), then target vehicle 802 is likely moving over quickly and will merge close to host vehicle 200. The navigational action may be a change in acceleration of host vehicle 200 to accommodate the lateral movement of target vehicle 802. As still another example, if the determined characteristic(s) of the target vehicle includes a velocity of the target vehicle relative to the host vehicle, the navigational action for the host vehicle may include maintaining a safe distance from the target vehicle, e.g., through acceleration or deceleration. And as another example, if the determined characteristic(s) of the target vehicle may include a predicted trajectory of the target vehicle, the navigational action for the host vehicle may include avoid the trajectory of the target vehicle, e.g., through steering and/or acceleration or deceleration of the host vehicle.

As yet another example, if the determined lane mark type is a lane split and a target vehicle is ahead of the host vehicle but before the lane split, the navigational action for the host vehicle may include an acceleration or deceleration of the host vehicle depending on the determined characteristic of the target vehicle. For example, the determined characteristic of the target vehicle may indicate the target vehicle is changing (or will change) lanes or is exiting (or will exit the road) and no longer be positioned ahead of the host vehicle. The host vehicle may therefore maintain or increase its rate of acceleration in anticipation of the departure of the target vehicle from the lane. As another example, if the determined characteristic of the target vehicle indicates the target vehicle is remaining in (or will remain in) the same lane as the host vehicle past the split lane, the host vehicle may maintain or decrease its rate of acceleration. In such embodiments, determining the navigational action for the host vehicle may include consideration one or more predicted navigational actions of the target vehicle, as discussed below.

For example, in addition to or as part of determining a navigational action for the host vehicle, processing unit 110 may predict a navigational action of the target vehicle. Processing unit 110 may predict the navigational action of the target vehicle based on the type of lane in which the target vehicle is traveling. For instance, if the target vehicle is traveling in a merge lane, processing unit 110 may predict that the target vehicle will change lanes. As another example, if the target vehicle is traveling in a split lane, processing unit 110 may predict that the target vehicle will exit the road.

As another example, referring to FIG. 10A, processing unit 110 may identify a position of target vehicle 802 relative to lane mark 1004C, which is a lane merge lane mark, in order to determine if target vehicle 802 will merge into the lane in which host vehicle 200 is traveling. If, for example, a lateral distance between target vehicle 802 and lane mark 1004C is constant or decreases, processing unit 110 may determine that target vehicle 802 will merge into the lane in which host vehicle 200 is traveling. In this manner, processing unit 110 may determine whether target vehicle 802 is tracking lane mark 1004C and, accordingly, whether target vehicle 802 will merge into the lane in which host vehicle 200 is traveling, even before target vehicle 802 crosses lane mark 1204B into the exit lane. In some embodiments, the predicted navigational action of the target vehicle may be determined based on a predicted trajectory of the target vehicle. For example, if it is predicted that target vehicle 802 will merge into the lane in which host vehicle 200 is traveling, host vehicle 200 may slow down, speed up, change lanes, or use the horn to facilitate a safe merge. Such predicted navigational actions of the target vehicle may be based on analysis of at least two images captured by an image capture device of the host vehicle. In still other embodiments, such predication navigational actions may be based on analysis of data from one or more sensors and/or devices of the host vehicle (e.g., an image sensor, lidar, radar, a GPS device, a speed sensor, an accelerometer, a suspension sensor, an acoustic sensor, etc.).

In some embodiments, in addition to identifying any of lane marks 1004A-100D, processing unit 110 may label any of lane marks 1004A-1004D. For example, processing unit 110 may identify lane marks 1004A-1004D in the images captured by image processing unit 122 and generate a label for each identified lane mark 1004A-1004D. The labels may take the form of, for example, a binary map. Alternatively, the labels may take the form of a data structure, such as a list of image segment coordinates.

In some embodiments, generating the labels may involve feeding the image(s) to a trained system, which may take the form of any of the neural networks described above in connection with FIG. 4 and/or a convolutional neural network. The neural network may be trained using labeled images and/or lane mark identifiers stored in association with one or more images. Labeled images or images in associated with labels and/or lane mark identifiers may be received by the neural network from a variety of resources, such as one or more databases. The one or more databases may located locally (e.g., included in system 100) and/or remotely (e.g., available over a network, such as a cellular network and/or the Internet, etc.) and received via, for example, a wireless transceiver 172 of system 100. The labeling of the stored images be done by, for example, storing a label (e.g., a merge or split label) in associated with an identified lane mark. In some embodiments, not every identified lane mark may be labeled; rather, labeling may be limited to only those lane marks that are relevant to detecting a lane change and determining a type of lane, as described below. Eventually, the neural network may become capable of automatically identifying and labeling lane marks.

In some embodiments, the neural network may output labeled images in which pixels of the images representing lane marks 1004A-1004D are labeled as being part of a lane mark. In some embodiments, only pixels representing lane marks 1004A-1004D may be labeled and/or associated with a label or lane mark type identifier. Alternatively, in some embodiments, every pixel may be labeled, even those that do not represent lane marks 1004A-1004D, and the labeled image may be "anded" with the binary map to isolate labels for lane marks 1004A-1004D.

In some embodiments, the labeled images may not be full resolution images. Alternatively or additionally, the labeled images may not have the same resolution as the images captured by the image capture unit 122 and/or the binary map. In some embodiments, the images captured by the image capture unit 122 may be of higher resolution than the labeled images, as the higher resolution may aid the processing unit 110 in identifying the lane marks, but a lower resolution may be sufficient to indicate the labeled lane marks. For example, the identified lane marks may be subsampled down to a lower resolution for the labeled images and/or the labeled lane marks can be upsampled to a higher resolution for the identified lane marks.

Figure 10B:
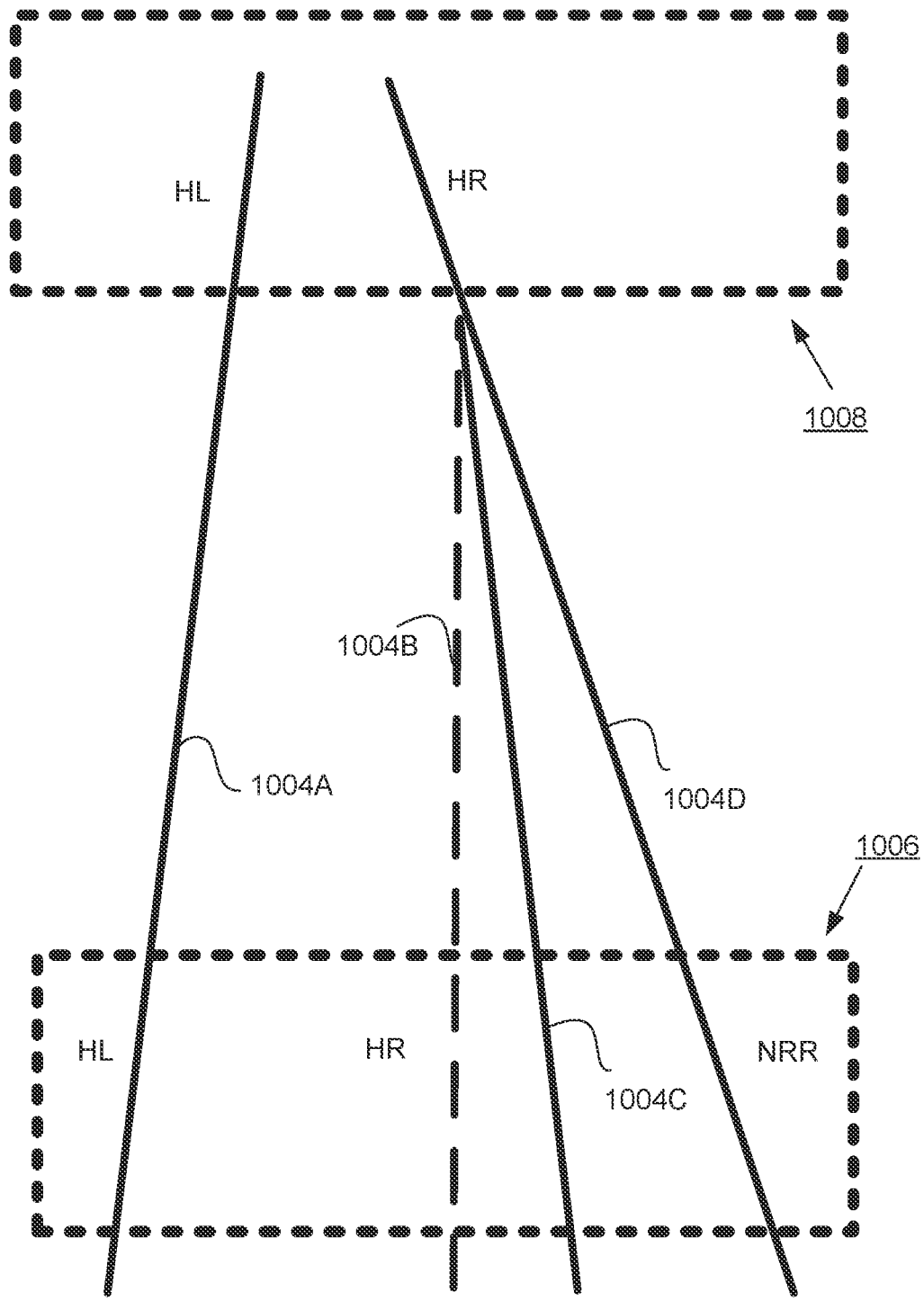
FIG. 10B is an illustration of an exemplary lane change analysis for a lane merge consistent with the disclosed embodiments.

Example labeled lane marks are shown in FIG. 10B, which illustrates portions of road 1002 captured in a first image 1006. For example, processing unit 110 may identify lane marks 1004C and 1004D in first image 1006. Alternatively or additionally, processing unit 110 may identify lane marks 1004A and 1004B. Once identified, processing unit 110 may label lane marks 1004A, 1004B, 1004C, and 1004D, and/or generate lane mark identifiers for one or more of the lane marks.

In some embodiments, lane marks may be labeled as "regular" lane marks or "lane change" lane marks. For example, in first image 1006, lane marks 1004A and 1004D may be labeled as "regular" lane marks, while lane marks 1004B and 1004C may be labeled as a "lane change" lane mark. In some embodiments, "lane change" lane marks may be stored as known landmarks, as described above in connection with FIG. 1. For example, rough localization of a lane merge or a lane split may be determined from the intersection and/or relative location of one or more "lane change" lane marks. Such "lane change" landmarks may improve localization technology, such as REM™, used in map creation. In some embodiments, localization technology may rely on "lane change" lane marks identified by a large number of vehicles traveling on the same road to determine which lane marks can be fused and which cannot. For example, localization technology may discern, based on the identified "lane change" lane marks, that numerous identifications of lane marks before a split can be fused into a consistent model, while numerous identifications of lane marks after the split cannot. As another example, localization technology may discern, based on the identified "lane change" lane marks, that numerous identifications of lane marks after a merge can be fused into a consistent model, while numerous identifications of lane marks before the split cannot.

In some embodiments, processing unit 110 may further determine, for one or more identified lane marks, the lane mark's relationship to host vehicle 200. For example, lane mark 1004A may be labeled as a "host left" lane mark indicating the left side of a "host" lane in which host vehicle 200 is traveling. As another example, lane mark 1004B may be labeled as a "host right" lane mark indicating the right side of a "host" lane in which host vehicle 200 is traveling. Lane mark 1004D may be labeled as a "next right right" lane mark indicating the right side of a "next right" lane to host vehicle 200.

As shown in FIG. 10B, processing unit 110 may additionally identify and label lane marks and/or generate lane mark identifiers for lane marks in a second image 1008. Second image 1008 may be captured later in time and/or at a location further down road 1002 than first image 1006. In some embodiments, first image 1006 and second image 1008 may permit processing unit 110 to identify and label lane marks in a distance ahead on road 1002. The distance between the images may be, for example, a distance of 25 meters to 75 meters. Other distances are possible as well.

As shown, lane marks 1004A and 1004D may be identified in second image 1008. Processing unit 110 may label lane mark 1004A with a "host left" lane mark again indicating the left side of the lane in which host vehicle 200 is traveling. Lane mark 1004D, however may be labeled in second image 1008 as a "host right" lane mark indicating the right side of the lane in which host vehicle 200 is traveling.

In some embodiments, determining the type of the identified lane mark(s) in step 910 may involve determining a change in lane mark labels and/or lane mark identifies between images. Such a determination may permit processing unit 110 to further determine what type of merge lane (e.g., "merge" merge lane, "merge to" merge lane, or "merge from" merge lane) or what type of split lane (e.g., "split" split lane, "lane open" split lane, or "lane expansion" split lane) is occurring on road 1002. For example, referring to FIG. 10B, processing unit 110 may determine that first image 1006 includes a "host left" lane mark (shown as lane mark 1004A and labeled "HL"), a "host right" lane mark (shown as lane mark 1004B and labeled "HR"), and a "next right right" lane mark (shown as lane mark 1004 and labeled "NRR"), as discussed above. Processing unit 110 may further determine that a second image 1008 still includes a "host left" lane mark (labeled "HL") and a "host right" lane mark (labeled "HR"), but does not include the "next right right" lane mark from first image 1006. Based on these lane mark labels, processing unit 110 may determine that the "next right" lane delineated in part by the "next right right" lane mark in first image 1006 will merge into the "host" lane in which the host vehicle 200 is traveling. Accordingly, processing unit 110 may determine that target vehicle 802 is traveling in a "merge from" merge lane, meaning host vehicle 200 may prepare for target vehicle 802 to merge from its lane (the "next right" lane) into the "host" lane in which host vehicle 200 is traveling.

As another example, processing unit 110 may determine that first image 1006 includes a "host left" lane mark, a "host right" lane mark, and a "next right right" lane mark. Processing unit 110 may further determine that, in a second image 1008, the "host right" lane mark has become a "host left" lane mark and the "next right right" lane mark has become a "host right" lane mark. The second image 1008 may not include a "host left" lane mark. Based on these lane mark labels, processing unit 110 may determine that the "host" lane delineated by the "host right" and "host left" lane marks in first image 1006 will merge into the "next right" lane delineated in part by the "next right right" lane mark in which the target vehicle 802 is traveling. Accordingly, processing unit 110 may determine that target vehicle 802 is traveling in a "merge to" merge lane, meaning host vehicle 200 may prepare to merge from the "host" lane into the "next right right" lane in which the target vehicle 802 is traveling.

While FIG. 10B contemplates a target vehicle 802, it will be understood that, in some embodiments, the lane mark labels may be used to determine a navigational action for host vehicle 200 even absent a target vehicle. For example, in some embodiments, a neural network to which labeled images are fed, as described above, may be configured to recognize a lane merge, as shown in FIG. 10B, based on labeled lane marks, and host vehicle 200 may take a navigational action to accommodate the lane merge.

Figure 11:
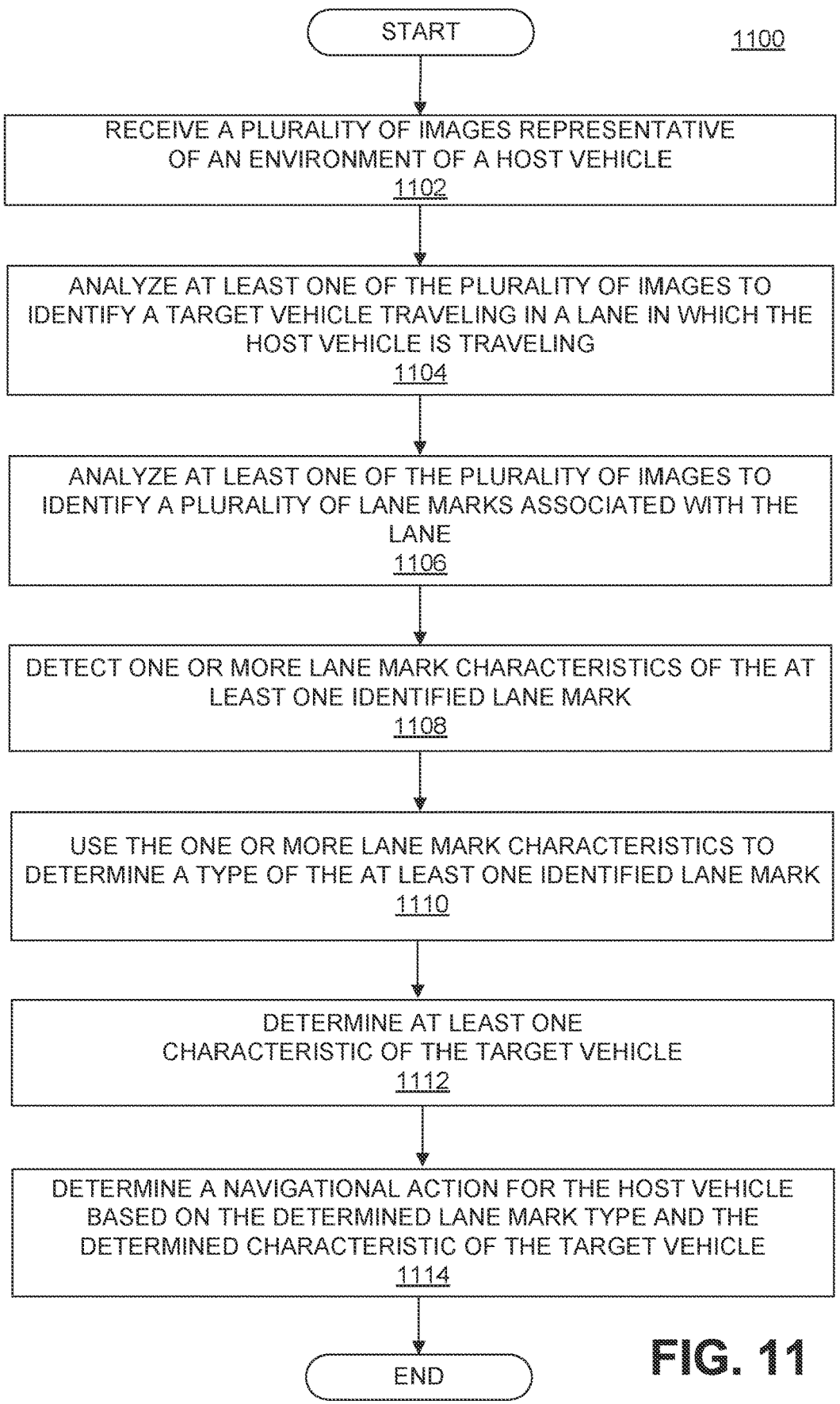
FIG. 11 is a flowchart showing another exemplary process for determining one or more navigational actions based on a lane change analysis consistent with the disclosed embodiments.

FIG. 11 is a flowchart showing another exemplary process 1100 for determining one or more navigational actions based on a lane change analysis consistent with the disclosed embodiments. Process 1100 may, for example, be carried out by processing unit 110 described above. For purposes of illustration, process 1100 will be described with reference to FIG. 12A, which is a top view illustration of an autonomous vehicle (e.g., vehicle 200) on a roadway with a lane split consistent with disclosed embodiments, and with reference to FIG. 12B, which is an illustration of an exemplary lane change analysis for a lane split consistent with the disclosed embodiments. In the following discussion, the autonomous vehicle is referred to as a host vehicle (e.g., vehicle 200), and may include any one or more of the components of system 100, as discussed above in connection with FIG. 1.

Figure 12A:
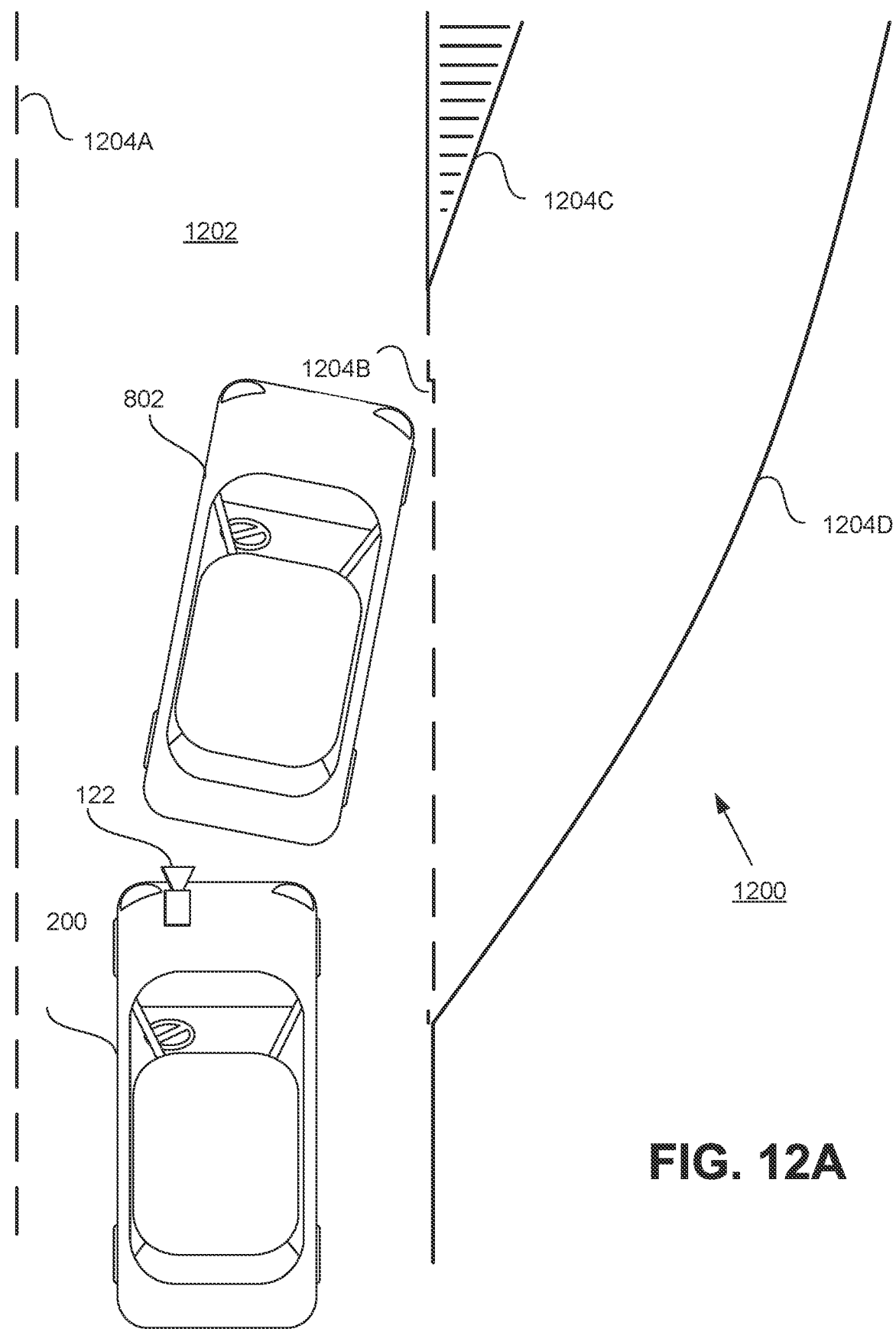
FIG. 12A is a top view illustration of an autonomous vehicle on a roadway with a lane split consistent with disclosed embodiments.

At step 1102, processing unit 110 may receive, from an image capture device, a plurality of images representative of an environment of the host vehicle. The environment includes a road on which the host vehicle is traveling. For example, as shown in FIG. 12A, image capture device 122 may capture a plurality of images representative of an environment 1200 of the host vehicle 200. Environment 1200 may include a road 1202 on which the host vehicle 200 is traveling, and road 1202 may include lane marks 1204A-1204D. Image capture device 122, road 1202, and lane marks 1204A-1204D may take any of the forms described above for image capture device 122, road 1002, and lane marks 1004A-1004D in connection with FIG. 10.

As discussed above, one or more image capture devices (e.g., image capture device 122) may capture a plurality of images representative of environment 1200. In some embodiments, images captured by image capture device 122 may include a representation of road 1202, and/or one or more of lane marks 1204A-1204D on road 1202. The images may take any of the forms described above for the image(s) in connection with FIG. 9.

At step 1104, processing unit 110 may analyze at least one of the plurality of images to identify a target vehicle traveling in a lane of the road in which the host vehicle is traveling. That is, in a split lane scenario, prior to the split, the target vehicle may travel forward of the host vehicle and in the same lane as the host vehicle. For example, as shown in FIG. 12A, the image(s) captured by image capture unit 122 may include a representation of target vehicle 802 traveling forward of host vehicle 100 in a lane of road 1202 in which host vehicle 200 is traveling. Processing unit 110 may analyze the image(s) to identify the target vehicle 802 using, for example, monocular image analysis module 402 and/or stereo image analysis module 404 described above in connection with FIG. 4.

At step 1106, processing unit 110 may analyze at least one of the plurality of images to identify a plurality of lane marks associated with the lane. For example, as shown in FIG. 12A, the image(s) captured by image capture unit 122 may include a representation of lane marks 1204A and 1204B on road 1202. In some embodiments, the image(s) may additionally include lane marks 1204C and 1204D. Processing unit 110 may analyze the image(s) to identify the lane marks 1204A-1204D using, for example, monocular image analysis module 402 and/or stereo image analysis module 404 described above in connection with FIG. 4 and/or in any manner discussed above.

At step 1108, processing unit 110 may detect one or more characteristics of the at least one identified lane mark. The detected lane mark characteristic(s) may include, for example, a distance of the at least one identified lane mark to a reference point, such as another mark on the road. For instance, referring to FIG. 12A, the detected lane mark characteristic(s) may include a distance between lane marks 1204A and 1204C or between lane marks 1204B and 1204D. As another example, the detected lane mark characteristic(s) may include a split of the at least one identified lane mark into another lane mark. For instance, referring to FIG. 12A, the detected lane mark characteristic(s) may include a split of lane mark 1204B into lane mark 1204C. As still another example, the detected lane mark characteristic(s) may include a change in a lateral distance between the at least one identified lane mark and at least one other lane mark of the road. For example, referring to FIG. 10A, the detected lane mark characteristic(s) may include a change in a lateral distance between lane marks 1204A and 1204C or between lane marks 1204B and 1204C over a distance forward of the host vehicle. Such changes in lateral distances may be determined as discussed above including, for example, in connection with FIG. 9.

At step 1110, processing unit 110 may use the one or more detected lane mark characteristics to determine a type of the at least one identified lane mark. In the example shown in FIG. 12A, the determined type of the lane mark may be a split lane. A split lane may include a "split" split lane, a "lane open" split lane, or a "lane expansion" split lane, as described above in connection with FIG. 8B. In some instances, the split lane may include an exit lane (e.g., an exit lane of a road or a highway such as an interstate highway).

In embodiments where the detected lane mark characteristic(s) include, for example, a distance of the at least one identified lane mark to a reference point, such as another mark on the road, using the detected lane mark characteristic(s) to determine a type of the identified lane mark(s) may involve determining whether the distance between the identified lane mark(s) and the reference point is increasing, decreasing, or remaining constant as a distance from the host vehicle increases (e.g., over a distance along the road forward of the host vehicle). For instance, referring to FIG. 12A, if the detected lane mark characteristic(s) include a distance between lane marks 1204A and 1204C and/or between lane marks 1204B and 1204D, an increasing distance between the lane marks may indicate that the lane mark type is a split lane.

Alternatively or additionally, in some embodiments, a detected lane mark characteristic may include identification of a split of the identified lane mark(s) into another lane mark. For instance, referring to FIG. 12A, if a detected lane mark characteristic includes a split of lane mark 1204B into lane mark 1204B and lane mark 1204C, processing unit 110 may determine that the lane mark type is a split lane.

Still alternatively or additionally, if the detected lane mark characteristic(s) include a change in a lateral distance between the at least one identified lane mark and at least one other lane mark of the road, using the detected lane mark characteristic(s) to determine a type of the identified lane mark(s) may involve determining whether the lateral distance between the identified lane mark(s) and the other lane mark(s) is increasing, decreasing, or remaining constant as a distance from the host vehicle increases (e.g., over a distance along the road forward of the host vehicle). For instance, referring to FIG. 12A, if the detected lane mark characteristic(s) include a lateral distance between lane marks 1204A and 1204C and/or between lane marks 1204B and 1204D, an increasing lateral distance between the lane marks may indicate that the lane mark type is a split lane. Such changes in lateral distances between lane marks over a distance along the road forward of the host vehicle may be determined as discussed above including, for example, in connection with FIG. 9.

Returning to FIG. 11, at step 1112, processing unit 110 may determine at least one characteristic of the target vehicle. In some embodiments, determining the characteristic(s) of the target vehicle may involve analyzing the plurality of images, as described above in connection with steps 1104 and 1106. The determined characteristic(s) of the target vehicle may take any of the forms described above in connection with step 912.

At step 1114, processing unit 110 may determine a navigational action for the host vehicle based on the determined lane mark type and the determined characteristic of the target vehicle. The navigational action may take any of the forms described above including, for example, in connection with step 914 of FIG. 9.

While step 1114 contemplates determining a navigational action for the host vehicle based on both the determined lane mark type and the determined characteristic of the target vehicle, it will be understood that, in some embodiments, the navigational action may be determined based only on the determined lane mark type or only on the determined characteristic of the target vehicle. For example, while FIG. 12A shows target vehicle 802, in some embodiments no target vehicle 802 may be present, and the navigational action may be determined based only on the determined lane mark type.

For example, if the determined characteristic(s) of the target vehicle include a detected lateral motion of the target vehicle relative to the identified lane mark(s), the navigational action for the host vehicle may be determined to accommodate an exit from the road by the target vehicle. For instance, referring to FIG. 12A, processing unit 110 may use the detected lateral motion of target vehicle 802 relative to lane mark 1204B to determine whether target vehicle 802 will stay in the lane in which host vehicle 802 is traveling or will exit road 1202. For instance, if target vehicle 802 continues to parallel lane mark 1204B as it travels, it may be more likely that target vehicle 802 will stay in the lane in which host vehicle 200 is traveling, and host vehicle 200 may maintain a safe following distance and not accelerate. On the other hand, if the lateral distance indicates a slight movement of target vehicle away from lane mark 1204B (or toward, for example, lane mark 1204C), host vehicle 200 may anticipate target vehicle 802 will exit road 1202, and host vehicle 802 may accelerate or continue to maintain its velocity.

In some embodiments, the navigational action may also depend on a predicted trajectory of the target vehicle. As an example, referring to FIG. 12A, if the predicted trajectory indicates that target vehicle 802 will exit road 1202, host vehicle 200 may accelerate to close a headway distance between host vehicle 200 and target vehicle 800 and/or may pass target vehicle 802 on the left. As another example, if the predicted trajectory indicates that target vehicle 802 will remain on road 1202, host vehicle 200 may decelerate to maintain a safe distance between host vehicle 200 and target vehicle 802.

In some embodiments, the determined navigational action for the host vehicle may involve lateral control of the host vehicle. For example, as shown in FIG. 12A, the road 1202 splits to form an exit lane, and host vehicle 200 may remain on road 1202 to reach its intended destination rather than using the exit lane to exit the road 1202. Accordingly, processing unit 110 may identify lane mark 1204A (e.g., via analysis of one or more captured images by one or more image capture devices), which is a "host left" lane mark delineating a left edge of the "host lane," and determine that the host vehicle should maintain lateral control while passing the exit lane. In particular, the navigational action determined by processing unit 110 may include maintaining host vehicle 200 at a constant lateral distance from lane mark 1204A in order to remain on road 1202. Alternatively, if host vehicle 200 may use the exit lane to exit the road 1202 in order to reach its intended destination, processing unit 110 may identify lane mark 1204D (e.g., via analysis of one or more captured images by one or more image capture devices), which is a "near right right" lane mark delineating a right edge of the exit lane, and determine that the host vehicle should maintain lateral control while exiting the road 1202. In particular, the navigational action determined by processing unit 110 may include maintaining host vehicle 200 at a constant lateral distance from lane mark 1204D in order to exit the road 1202.

Alternatively or additionally, the determined navigational action for the host vehicle may involve steering the host vehicle along a curvature of the road. For example, if, as shown in FIG. 12A, the road 1202 splits to form an exit lane, and host vehicle 200 is to remain on road 1202, processing unit 110 may identify lane mark 1204A, which is a "host left" lane mark delineating a left edge of the "host lane," to estimate a curvature of road 1202, while ignoring use lane mark 1204D, which is a "near right right" lane mark delineating a right edge of the exit lane.

In some embodiments, in addition to determining a navigational action for the host vehicle or as part of determining a navigational action for the host vehicle, processing unit 110 may predict a navigational action of the target vehicle. For example, processing unit 110 may predict the navigational action of the target vehicle based on the type of lane in which the target vehicle is traveling. If the target vehicle is traveling in a split lane, processing unit 110 may predict that the target vehicle will exit the road.

For example, referring to FIG. 12A, processing unit 110 may identify a position of target vehicle 802 relative to lane mark 1204C, which is a split lane mark, in order to determine if target vehicle 802 will exit road 1202. If, for example, a lateral distance between target vehicle 802 and lane mark 1204C is constant or decreases, processing unit 110 may determine that target vehicle 802 will exit road 1202. If, on the other hand, processing unit 110 determines that a lateral distance between target vehicle 802 and lane mark 1204C increases, processing unit 110 may determine that target vehicle 802 will not exit road 1202. In this manner, processing unit 110 may determine whether target vehicle 802 is tracking the exit lane and, accordingly, whether target vehicle 802 will exit road 1202, even before target vehicle 802 crosses lane mark 1204B into the exit lane. In some embodiments, the navigational action of the target vehicle may be determined based on the predicted trajectory. For example, if it is predicted that target vehicle 802 will exit road 1202, host vehicle 200 may accelerate or continue to maintain its velocity.

In some embodiments, in addition to identifying any of lane marks 1204A-1204D, processing unit 110 may label any of lane marks 1204A-1204D. The determined lane mark label(s) may identify a type of the lane in which the target vehicle and the host vehicle are traveling. In some embodiments, the determined lane mark label(s) may identify the type of the lane to be a merge lane, such as a "merge" merge lane, a "merge to" merge lane, or a "merge from" merge lane, as described above in connection with FIG. 8A. Alternatively, in some embodiments, the determined lane mark label(s) may identify the type of the lane to be a split lane, such as a "split" split lane, a "lane open" split lane, or a "lane expansion" split lane, as described above in connection with FIG. 8B. Generating the labels may involve feeding the image(s) to a neural network, as described above in connection with FIG. 9. Furthermore, the labeled image may take any of the forms described above in connection with FIG. 9.

Figure 12B:
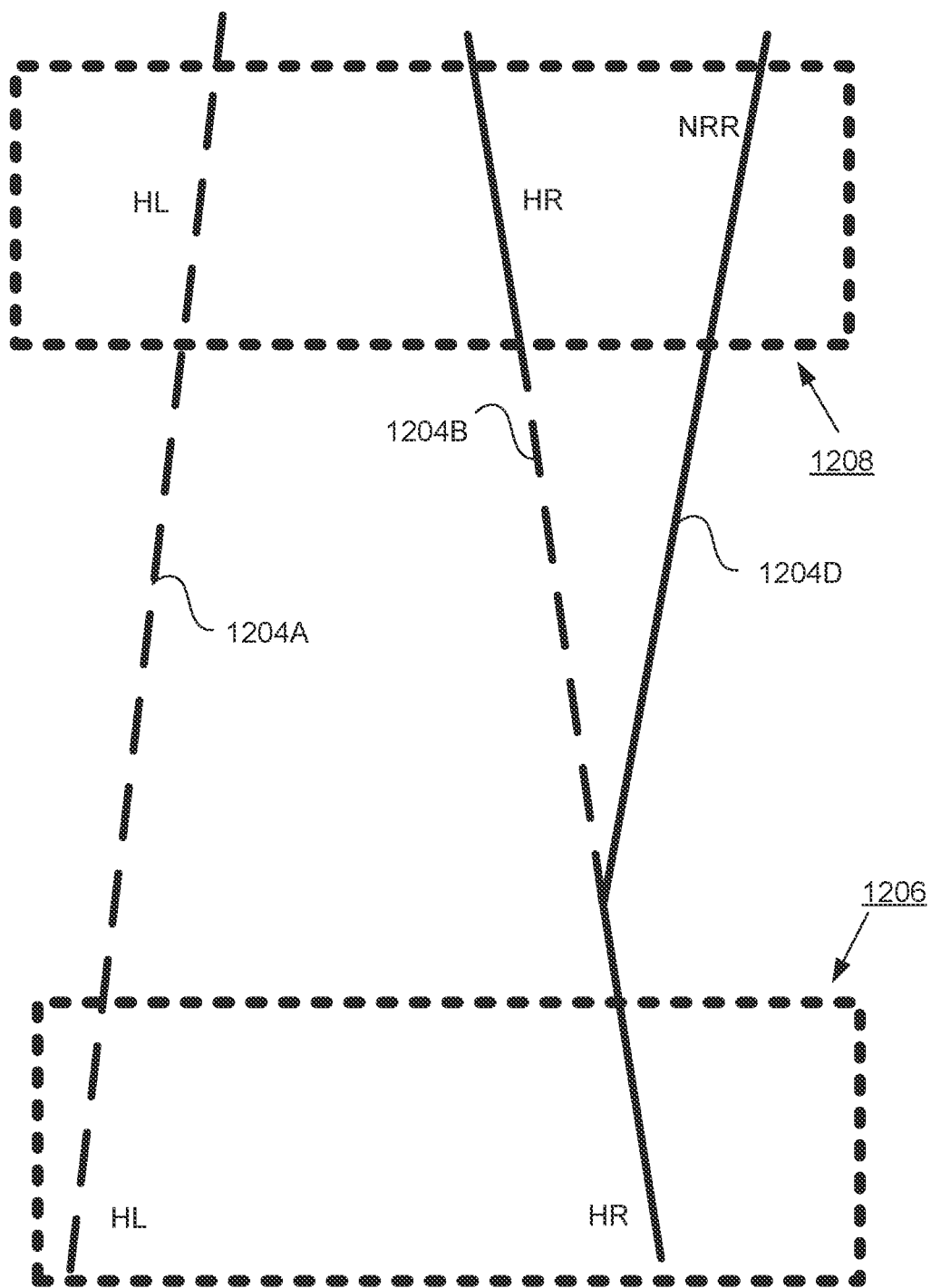
FIG. 12B is an illustration of an exemplary lane change analysis for a lane split consistent with the disclosed embodiments.

Example labeled lane marks are shown in FIG. 12B. As shown, processing unit 110 may identify and label marks in a first image 1206. For example, lane mark 1204A may be labeled as a "host left" lane mark (labeled "HL") indicating the left side of a "host" lane in which host vehicle 200 is traveling. Lane mark 1204B may be labeled as a "host right" lane mark (labeled "HR") indicating the right side of a "host" lane in which host vehicle 200 is traveling.

As shown in FIG. 12B, processing unit 110 may additionally identify and label lane marks in a second image 1208. As shown, lane marks 1204A, 1204B, and 1204D may be identified in second image 1208. Processing unit 110 may label lane mark 1204A with a "host left" lane mark again and may label lane mark 1204B with a "host right" lane mark again. Lane mark 1204D, which did not appear in first image 1206, may be labeled in second image 1208 as a "next right right" lane mark indicating the right side of the lane to the right of the lane in which host vehicle 200 is traveling.

While FIG. 12B contemplates a target vehicle 802, it will be understood that, in some embodiments, the lane mark labels may be used to determine a navigational action for host vehicle 200 even absent a target vehicle. For example, in some embodiments, a neural network to which labeled images are fed, as described above, may be configured to recognize a lane split, as shown in FIG. 12B, based on labeled lane marks, and host vehicle 200 may take a navigational action to accommodate the lane split.

As discussed above, the determined lane mark label(s) may identify a type of the lane in which the target vehicle and the host vehicle are traveling. Accordingly, processing unit 110 may determine a type of the lane in which the target vehicle is traveling based on the identified lane marks and/or lane labels.

In some embodiments, determining the type of the lane in which the target vehicle is traveling may involve determining a change in lateral distance between at least two of the identified lane marks. For example, if the change in the lateral distance between the at least two identified lane marks increases, processing unit 110 may determine that the lane in which the target vehicle is traveling is a split lane. For example, referring to FIG. 12B, the at least two identified lane marks may be lane marks 1204B and 1204D. Processing unit 110 may determine a change in lateral distance between lane marks 1204B and 1204D in order to determine a type of lane in which target vehicle 802 is traveling. As shown, the lateral distance between lane marks 1204B and 1204D is increasing. That is, at a distance closer to host vehicle 200, a lateral distance between lane marks 1204B and 1204D is less than a lateral distance between lane marks 1204B and 1204D at a distance further from host vehicle 200. Accordingly, processing unit 110 may determine that target vehicle 802 is traveling in a split lane. In some embodiments, processing unit 110 may verify a determined lane type using map data (e.g., from map database 160).

Alternatively or additionally, in some embodiments determining the type of the lane in which the target vehicle is traveling may involve determining a change in lane mark labels between images or between lane marks in a particular image. Such a determination may permit processing unit 110 to further determine what type of merge lane (e.g., "merge" merge lane, "merge to" merge lane, or "merge from" merge lane) or what type of split lane (e.g., "split" split lane, "lane open" split lane, or "lane expansion" split lane) is occurring on road 1202. For example, referring to FIG. 12B, processing unit 110 may determine that first image 12066 includes a "host left" lane mark (labeled "HL") and a "host right"

lane mark (labeled "HR"), as described above. Processing unit 110 may further determine that a second image 1208 still includes a "host left" lane mark (labeled "HL") and a "host right" lane mark (labeled "HR"), but also includes a "next right right" lane mark (labeled "NRR"). Based on these lane mark labels, processing unit 110 may determine that the "next right" lane delineated in part by the "next right right" lane mark in second image 1206 will expand from the "host" lane in which the host vehicle 200 is traveling. Accordingly, processing unit 110 may determine that target vehicle 802 is traveling in a "lane expansion" split lane. As the "lane expansion" split lane is on the right side of road 1202, processing unit 110 may determine that it is like that the "next right" lane in which the target vehicle 802 is traveling is an exit lane, meaning host vehicle 200 may prepare for target vehicle 802 to exit from the road 1202.

Figure 13:
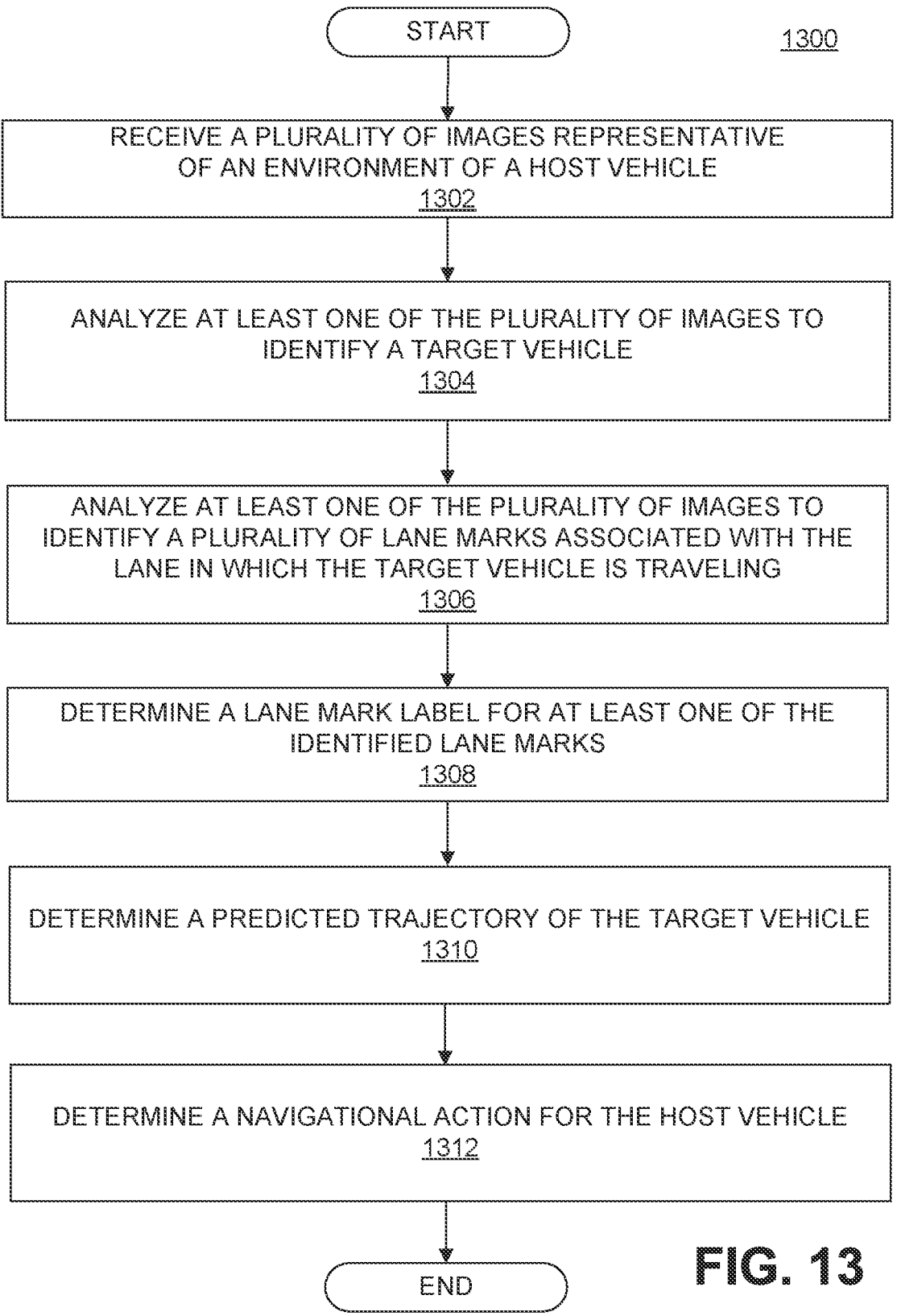
FIG. 13 is a flowchart showing another exemplary process or determining one or more navigational actions based on a lane change analysis consistent with the disclosed embodiments.

FIG. 13 is a flowchart showing another exemplary process 1300 for determining one or more navigational actions based on a lane change analysis consistent with the disclosed embodiments. Process 1300 may, for example, be carried out by processing unit 110 described above. For purposes of illustration, process 1300 will be described with reference to FIGS. 14A-14C, which are illustrations of an exemplary lane change analysis for a lane merge consistent with the disclosed embodiments, and with reference to FIGS. 15A-15C, which are illustrations of an exemplary lane change analysis for a lane split consistent with disclosed embodiments. In the following discussion, the autonomous vehicle is referred to as a host vehicle (e.g., vehicle 200), and may include any one or more of the components of system 100, as discussed above in connection with FIG. 1.

As shown, process 1300 begins at step 1302 with receiving, from an image capture device, a plurality of images representative of an environment of the host vehicle. The environment includes a road on which the host vehicle is traveling. Image capture device 122 and the images may take any of the forms described above for image capture device 122 and the image(s), respectively, in connection with FIG. 19.

Figure 14A:
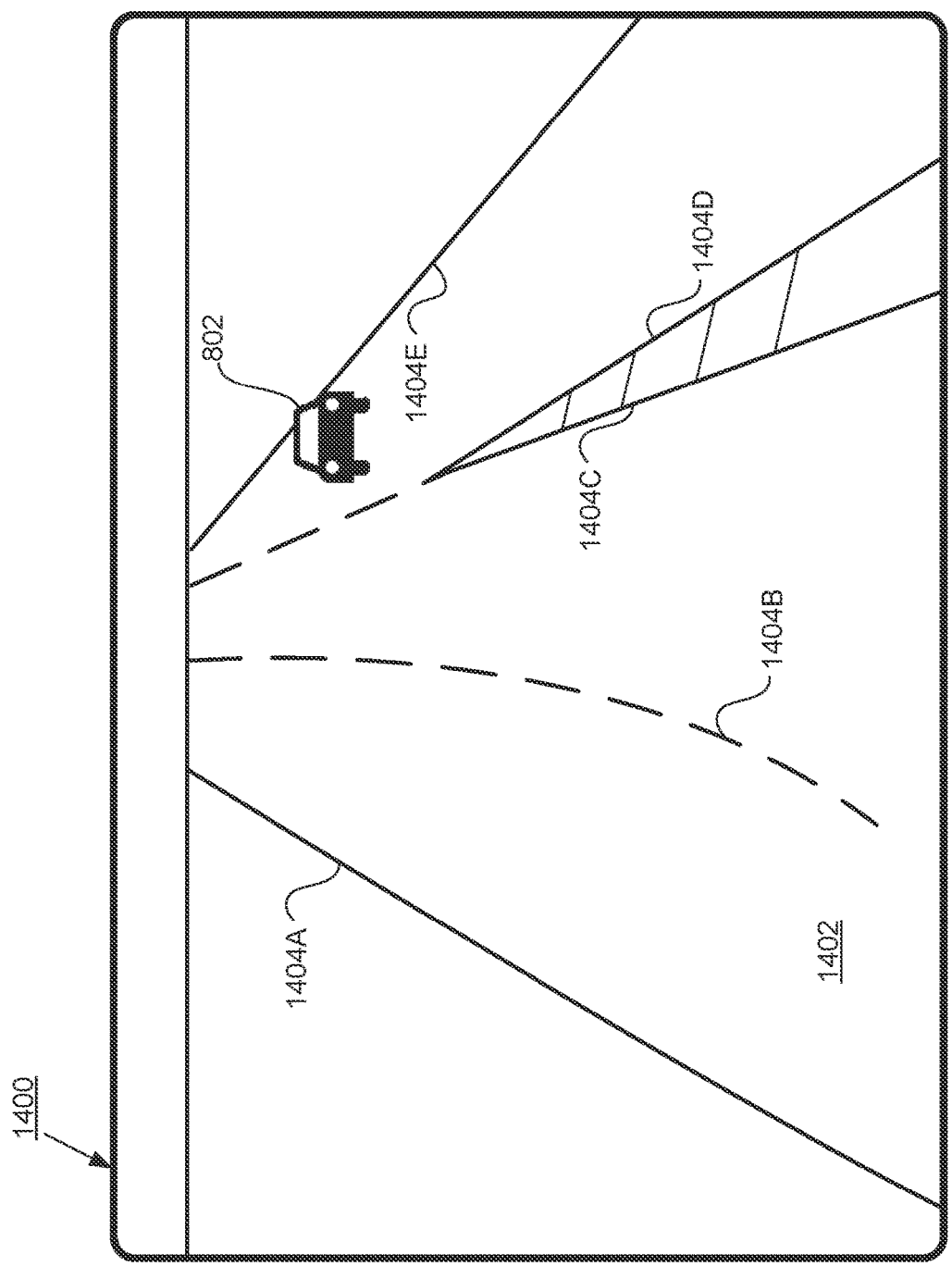
FIGS. 14A-14C are illustrations of an exemplary lane change analysis for a lane merge consistent with the disclosed embodiments.

An example image 1400 captured by an image capture device 122 and representing a road 1402 with a lane merge is shown in FIG. 14A. As shown in FIG. 14A, image 1400 may be representative of an environment of the host vehicle 200. For example, image 1400 may include representations of a road 1402 on which the host vehicle 200 is traveling and of lane marks 1404A-1404E on road 1402. Road 1402 and lane marks 1404A-1404E may take any of the forms described above for road 1002 and lane marks 1004A-1004D in connection with FIG. 10.

Figure 15A:
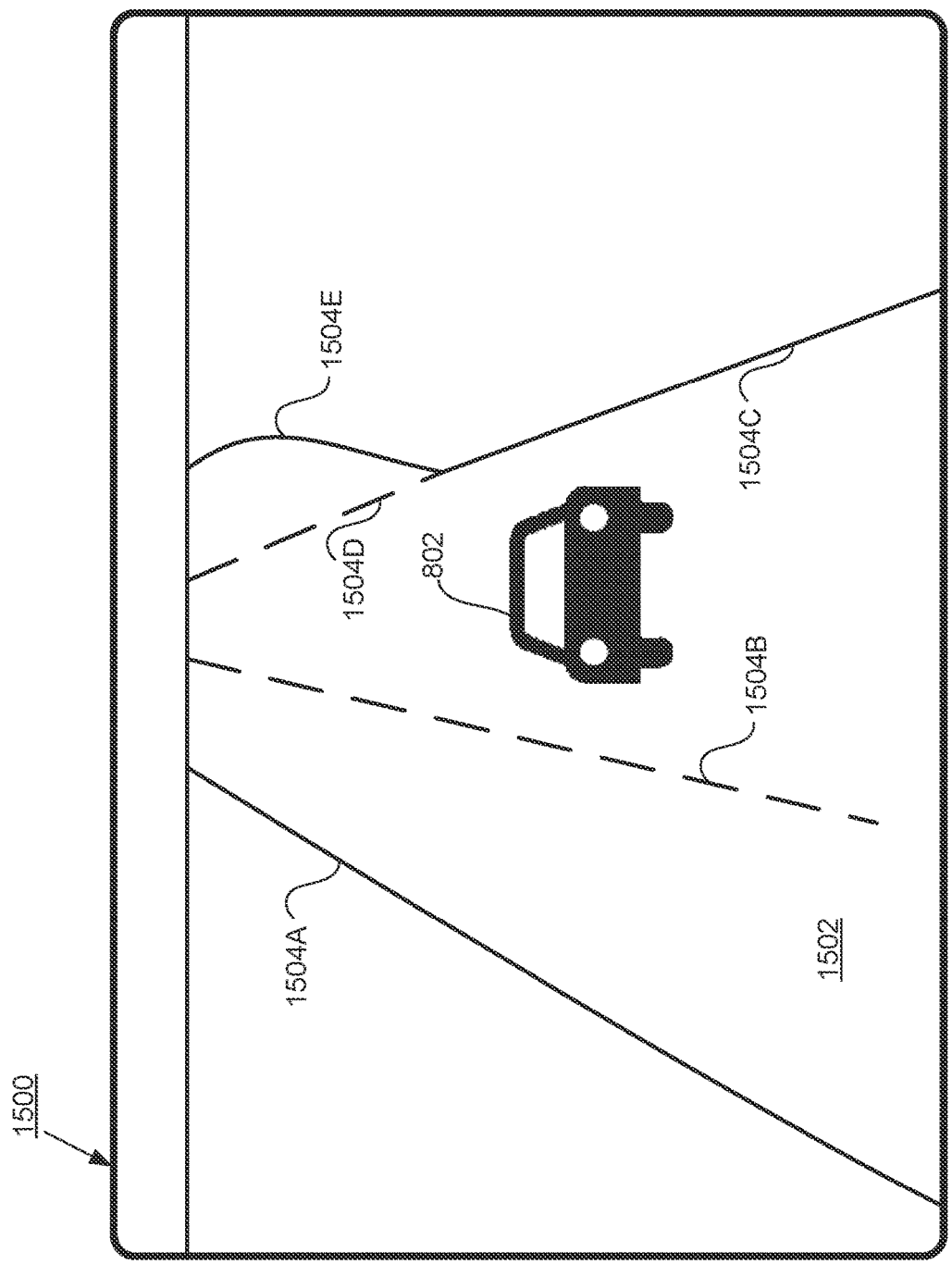
FIGS. 15A-15C are illustrations of an exemplary lane change analysis for a lane split consistent with the disclosed embodiments.

Another example image 1500 captured by an image capture device 122 and representing a road 1502 with a lane split is shown in FIG. 15A. As shown in FIG. 15A, image 1500 may be representative of an environment of the host vehicle 200. For example, image 1500 may include representations of a road 1502 on which the host vehicle 200 is traveling and of lane marks 1504A-1504E. Road 1502 and lane marks 1504A-1504E may take any of the forms described above for road 1002 and lane marks 1004A-1004D in connection with FIG. 10.

Returning to FIG. 13, at step 1304, processing unit 110 may analyze at least one of the plurality of images to identify a target vehicle. As discussed earlier, the target vehicle may be traveling in the same lane as the lane in which the host vehicle is traveling or may be traveling in a different lane than the lane in which the host vehicle is traveling. For example, as shown in FIG. 14A, in some embodiments, target vehicle 802 may be traveling forward of host vehicle 200 in a different lane than the lane in which host vehicle 200 is traveling as host vehicle 200 and target vehicle 802 approach the lane merge. As another example, as shown in FIG. 15A, in some embodiments target vehicle 802 may be traveling forward of host vehicle 200 in the same lane as the lane in which host vehicle 200 is traveling as host vehicle 200 and target vehicle 802 approach the lane split. Processing unit 110 may analyze one or more of the captured images to identify target vehicle 802 using, for example, monocular image analysis module 402 and/or stereo image analysis module 404 described above in connection with FIG. 4.

At step 1306, processing unit 110 may analyze at least one of the plurality of images to identify a plurality of lane marks associated with the lane in which the target vehicle is traveling. For example, as shown in FIG. 14A, processing unit may analyze image 1400 to identify one or more lane marks 1404A-1404E. Processing unit 110 may analyze image 1400 to identify the lane marks 1404A-1404E using, for example, monocular image analysis module 402 and/or stereo image analysis module 404 described above in connection with FIG. 4 and/or in any manner discussed above. As another example, as shown in FIG. 15A, processing unit may analyze image 1500 to identify one or more lane marks 1504A-1504E. Processing unit 110 may analyze image 1500 to identify the lane marks 1504A-1504E using, for example, monocular image analysis module 402 and/or stereo image analysis module 404 described above in connection with FIG. 4 and/or in any manner discussed above.

Returning to FIG. 13, at step 1308, processing unit 110 may determine a lane mark label for at least one of the identified lane marks. In some embodiments, determining the labels may involve feeding the image(s) to a neural network, such as the neural networks described above in connection with FIG. 4 and/or a convolutional neural network. The neural network may be trained using labeled images and/or lane mark identifiers stored in association with one or more images. Labeled images or images in associated with labels and/or lane mark identifiers may be received by the neural network from a variety of resources, such as one or more databases. The one or more databases may located locally (e.g., included in system 100) and/or remotely (e.g., available over a network, such as a cellular network and/or the Internet, etc.) and received via, for example, a wireless transceiver 172 of system 100. The labeling of the stored images be done by, for example, storing a label (e.g., a merge or split label) in associated with an identified lane mark. In some embodiments, not every identified lane mark may be labeled; rather, labeling may be limited to only those lane marks that are relevant to detecting a lane change and determining a type of lane, as described below. Eventually, the neural network may become capable of automatically identifying and labeling lane marks.

Figure 14B:
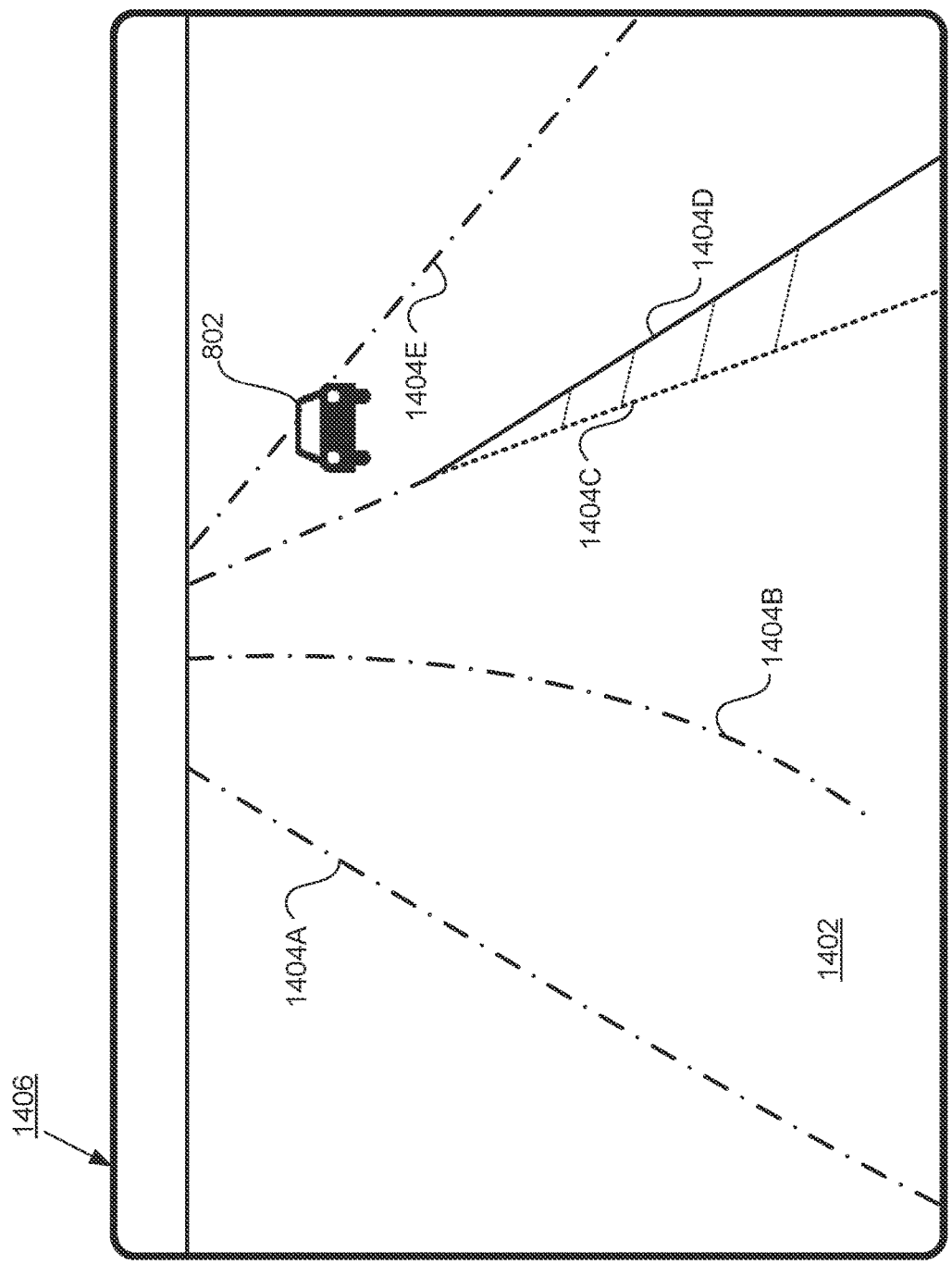
Figure 15B:
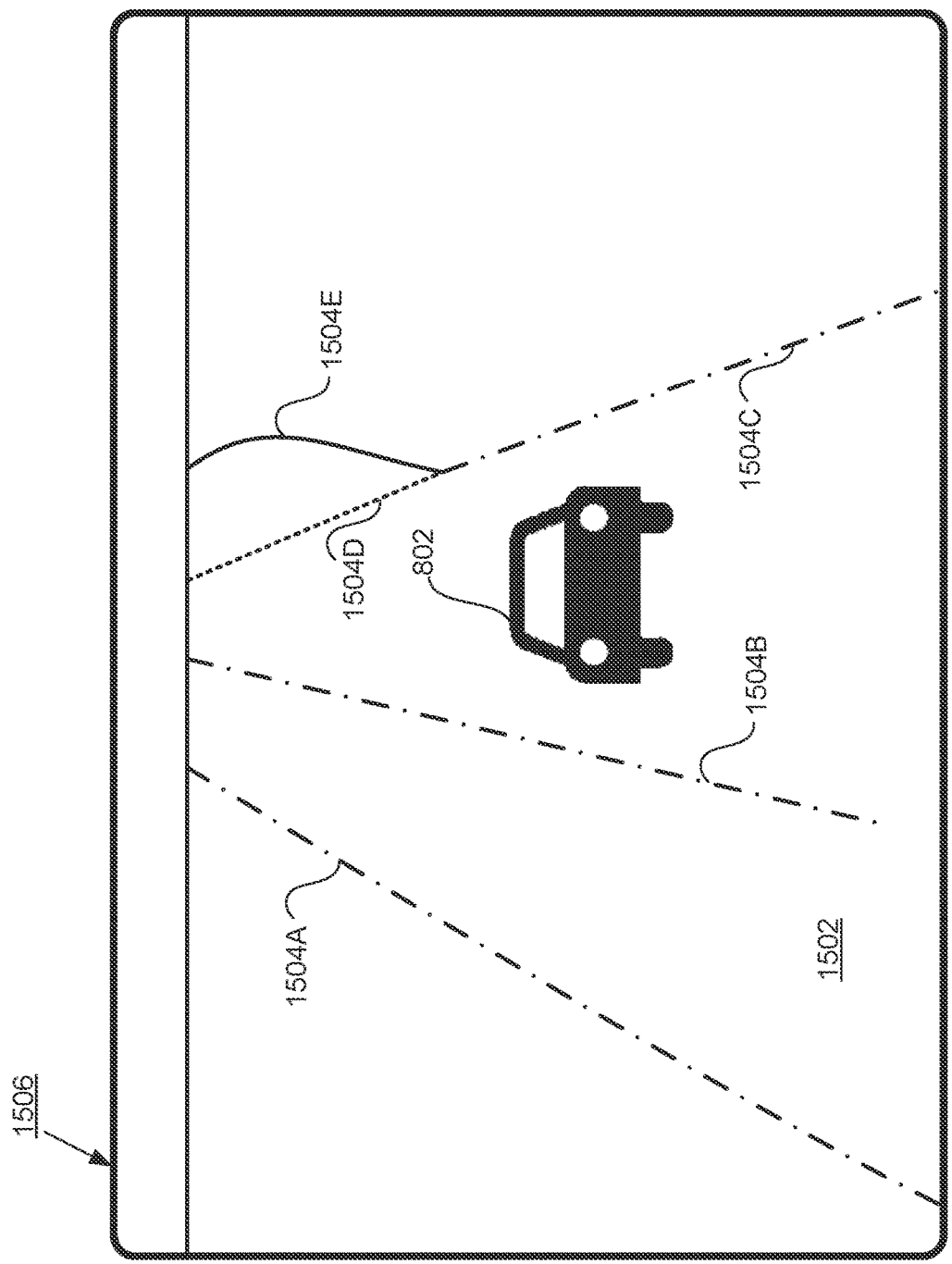

An example labeled image 1406 for use by, for example, a neural network is shown in FIG. 14B. As shown, labeled image 1406 includes a representation of road 1402 with the lane merge, and lane marks 1404A-1404E have been labeled, as indicated by the differing line patterns. For example, the dot-dash lines on lane marks 1404A, 1404B, and 1404E may indicate "regular" lane marks that do not form part of the lane merge, the small-dash line on lane mark 1404C may indicate the inner portion of a merge lane, and the solid line on lane mark 1404D may indicate the outer portion of a merge lane. Another example labeled image 1506 for use by a neural network is shown in FIG. 15B. As shown, labeled image 1506 includes a representation of road 1502 with the lane split, and lane marks 1504A-1504E have been labeled, as indicated by the differing line patterns. For example, the dot-dash lines on lane marks 1504A, 1504B, and 1504C may indicate "regular" lane marks that do not form part of the lane split, the small-dash line on lane mark 1504D may indicate the inner portion of a split lane, and the solid line on lane mark 1504E may indicate the outer portion of a split lane. While FIGS. 14B and 15B depict labels in the form of differing line patterns, in some embodiments the labels may alternatively or additionally take the form of coloring, alphabetical and/or numeric tagging, or other indicators associated with the labeled lane marks. Through, for example, machine learning, the neural network may use labeled image 1406 and/or 1506 to improve lane mark labeling.

In some embodiments, lane marks may be labeled for the lane mark's relationship to host vehicle 200. For example, referring to FIG. 14C and labeled image 1410, lane mark 1404B may be labeled as a "host left" ("HL," as shown) lane mark indicating the left side of a "host" lane in which host vehicle 200 is traveling, and lane mark 1404C may be labeled as a "host right" ("HR," as shown) lane mark indicating the right side of the "host lane." Additionally, as shown, lane mark 1404A may be labeled as a "next left left" ("NLL," as shown) lane mark indicating the left side of a "next left" lane immediately to the left of the "host lane." Lane mark 1404B may be labeled as, in addition to a "host left" lane mark, a "next left right" ("NLR," as shown) lane mark indicating the right side of the "next left" lane immediately to the left of the "host" lane. Lane mark 1404E may be labeled as a "next right right" ("NRR," as shown) lane mark indicating the right side of the "next right" lane immediately to the right of the "host" lane. The lane marks 1404C and 1404D forming the lane merge, as shown, may be labeled as "inner" and "outer" lane merge marks: lane mark 1404C may be labeled as an "inner lane merge" ("ILM," as shown) lane mark and lane mark 1404D may be labeled as an "outer lane merge" ("OLM," as shown) lane mark.

Figure 15C:
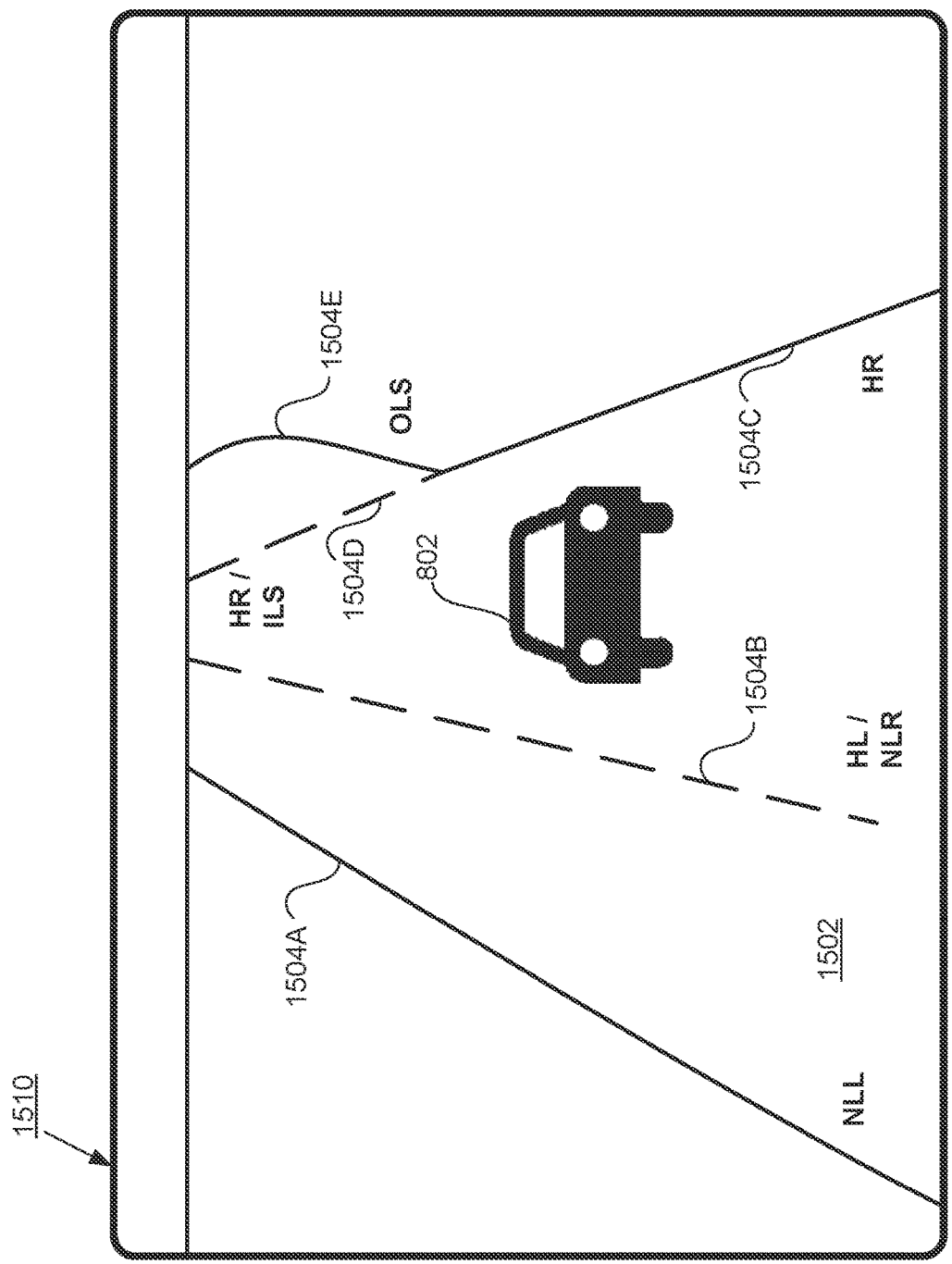

As another example, referring to FIG. 15C and labeled image 1510, lane mark 1504B may be labeled as a "host left" ("HL," as shown) lane mark indicating the left side of a "host" lane in which host vehicle 200 is traveling, and lane mark 1504C may be labeled as a "host right" ("HR," as shown) lane mark indicating the right side of the "host lane." Additionally, as shown, lane mark 1504A may be labeled as a "next left left" ("NLL," as shown) lane mark indicating the left side of a "next left" lane immediately to the left of the "host lane." Lane mark 1504B may be labeled as, in addition to a "host left" lane mark, a "next left right" ("NLR," as shown) lane mark indicating the right side of the "next left" lane immediately to the left of the "host" lane. The lane marks 1504D and 1504E forming the lane split, as shown, may be labeled as "inner" and "outer" lane split marks: lane mark 1504D may be labeled as an "inner lane split" ("ILS," as shown) lane mark and lane mark 1504E may be labeled as an "outer lane split" ("OLS," as shown) lane mark.

In some embodiments, labels for lane marks may be stored in a database (e.g., a relational database). For example, identifiers of lane marks (e.g., identifiers to corresponding to lane mark labels and/or lane mark types) may be stored in the database in association with identifiers of lane marks and/or lane mark locations (e.g., geographical coordinates). In some embodiments, the database of the identifiers of lane marks and/or the lane mark locations may be included in, for example, a memory (e.g., memory 150) of system 100 and/or a memory of a remote server accessible by processing unit 110 of system 100 over a network.

Returning to FIG. 13, at step 1310, processing unit 110 may determine a predicted trajectory of the target vehicle. For example, processing unit 110 may determine a predicted trajectory of the target vehicle based on based on analysis of data from one or more sensors and/or devices of the host vehicle (e.g., an image sensor, lidar, radar, a GPS device, a speed sensor, an accelerometer, a suspension sensor, an acoustic sensor, etc.).

In some embodiments, processing unit 110 may determine the predicted trajectory of the target vehicle based on analysis of at least two of the plurality of images captured by at least one image capture device of the host vehicle. The analysis of the images may, for example, take any of the forms described above in, for example, step 1304. In some embodiments, processing unit 110 may determine the predicted trajectory of the target vehicle based on, for example, the lane mark label(s) of the lane in which the target vehicle is traveling. For instance, referring to FIG. 14C, processing unit 110 may determine that marks 1404C and 1404D are labeled "inner lane merge" and "outer lane merge," respectively, indicating that target vehicle 802 is traveling in lane that will merge with the lane in which host vehicle 200 is traveling forward of the host vehicle 200. Accordingly, processing unit 110 may determine that the predicted trajectory of target vehicle 802 is to merge to the lane in which host vehicle 200 is traveling. In some embodiments, by predicting the trajectory of target vehicle 802 using lane mark labels, processing unit 110 may determine whether target vehicle 802 will merge into the lane in which host vehicle 200 is traveling, even before target vehicle 802 crosses lane mark 1404C into the lane. As another example, referring to FIG. 15C, processing unit 110 may determine that marks 1504D and 1504E are labeled "inner lane split" and "outer lane split," respectively, indicating that target vehicle 802 is traveling in lane that will split forward of the host vehicle 200 to form an exit lane. Accordingly, processing unit 110 may determine that the predicted trajectory of target vehicle 802 may be to exit to the exit lane, leaving the lane in which host vehicle 200 is traveling. In some embodiments, by predicting the trajectory of target vehicle 802 using lane mark labels, processing unit 110 may determine whether target vehicle 802 will exit to the exit lane, even before target vehicle 802 crosses lane mark 1504D into the exit lane.

Figure 14C:
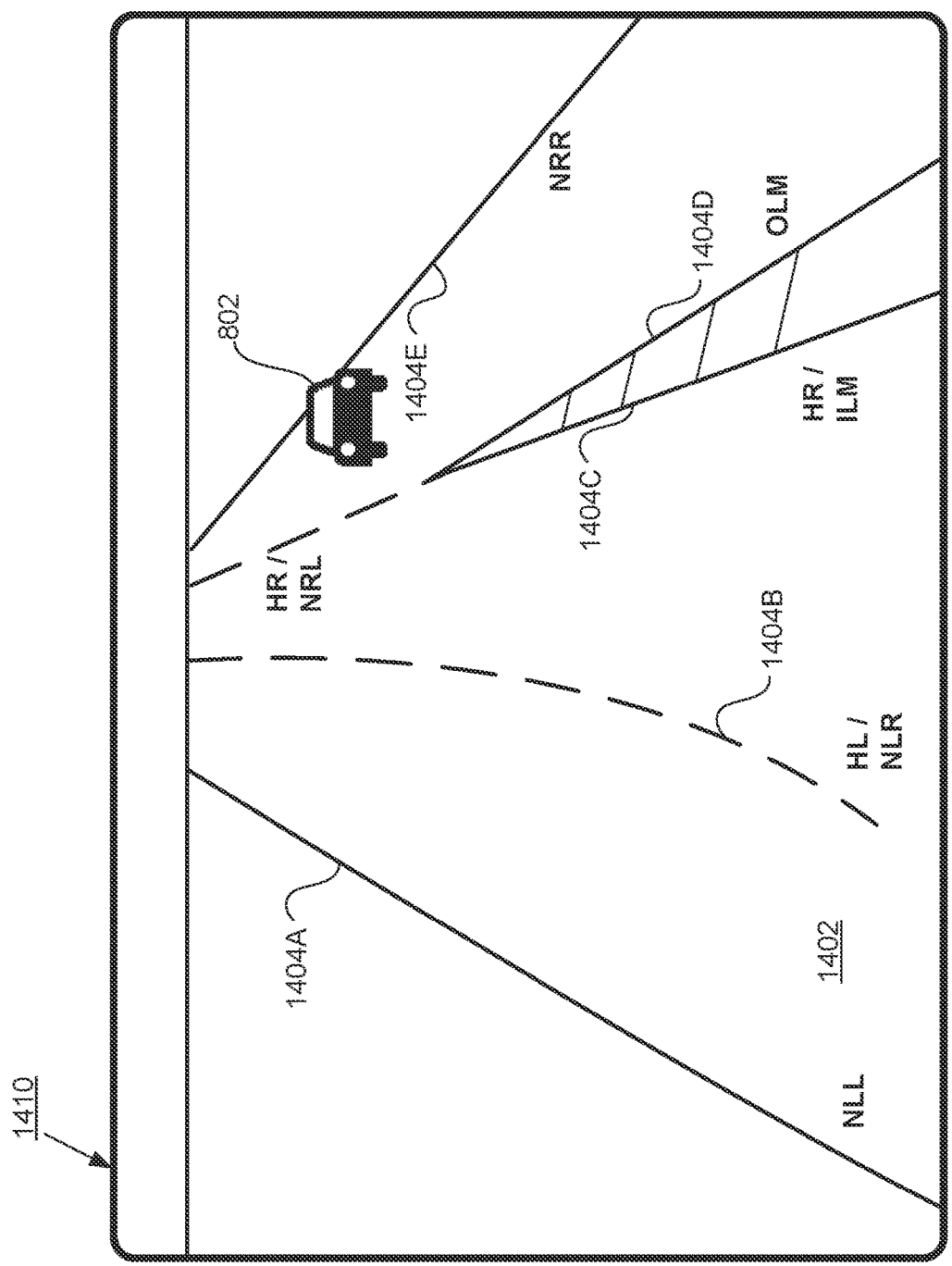

Alternatively or additionally, in order to determine a predicted trajectory of target vehicle 802, processing unit 110 may identify a position of target vehicle 802 relative to one or more lane marks. Referring to FIG. 14C, for example, if a lateral distance between target vehicle 802 and lane mark 1404E is constant or increases, processing unit 110 may determine that target vehicle 802 will merge into the lane in which host vehicle 200 is traveling. In this manner, it may be determined whether target vehicle 802 is tracking the merge lane and, accordingly, whether target vehicle 802 will merge into the lane in which host vehicle 200 is traveling, even before target vehicle 802 crosses lane mark 1404C into the lane.

As another example, referring to FIG. 15C, if a lateral distance between target vehicle 802 and lane mark 1504E is constant or decreases, processing unit 110 may determine that target vehicle 802 will exit road 1502 by splitting into the newly formed exit lane. In this manner, it may be determined whether target vehicle 802 is tracking the exit lane and, accordingly, whether target vehicle 802 will exit road 1502, even before target vehicle 802 crosses lane mark 1504D into the exit lane.

Returning to FIG. 13, at step 1312, processing unit 110 may determine a navigational action for the host vehicle. In some embodiments, processing unit 110 may determine the navigational action for the host vehicle based on the determined lane mark label or the predicted trajectory of the target vehicle. In some embodiments, processing unit 110 may determine the navigational action for the host vehicle based on the determined lane mark label and the predicted trajectory of the target vehicle.

For example, referring to FIG. 14C, if lane mark labels 1404C and 1404D indicated that target vehicle 802 is traveling in a merge lane and/or the predicted trajectory indicates that target vehicle 802 will merge into the lane in which host vehicle 200 is traveling, host vehicle 200 may decelerate to maintain a safe distance between host vehicle 200 and target vehicle 802. As another example, referring to FIG. 15C, if lane mark labels 1504D and 1404E indicate that target vehicle 802 is traveling in an exit lane and/or the predicted trajectory indicates that target vehicle 802 will exit road 1502, host vehicle 200 may accelerate to close a headway distance between host vehicle 200 and target vehicle 802 and/or may pass target vehicle 802 on the left.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, 4K Ultra HD Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A system for navigating a host vehicle, the system comprising:
at least one processing device comprising circuitry and a memory, wherein the memory includes instructions that when executed by the circuitry cause the at least one processing device to:
receive a plurality of images acquired by an image capture device, the plurality of images being representative of an environment of the host vehicle;
analyze at least one of the plurality of images to identify a target vehicle traveling in a lane of a road;
analyze at least one of the plurality of images to identify at least one lane mark associated with the lane in which the target vehicle is traveling;
determine at least one characteristic of the target vehicle based on at least one of the plurality of images, wherein the at least one determined characteristic of the target vehicle includes a detected motion of the target vehicle relative to the at least one identified lane mark; and
determine a navigational action for the host vehicle based on the determined characteristic of the target vehicle.

2. The system of claim 1, wherein the at least one identified lane mark includes a merge lane.

3. The system of claim 1, wherein the instructions when executed by the circuitry further cause the at least one processing device to detect a distance of the at least one identified lane mark to a reference point.

4. The system of claim 3, wherein the reference point includes at least one other lane mark of the road.

5. The system of claim 1, wherein the instructions when executed by the circuitry further cause the at least one processing device to detect an intersection of the at least one identified lane mark with at least one other lane mark of the road.

6. The system of claim 1, wherein the instructions when executed by the circuitry further cause the at least one processing device to detect a change in lateral distances between the at least one identified lane mark and at least one other lane mark of the road.

7. The system of claim 1, wherein determining at least one characteristic of the target vehicle includes analyzing at least one of the plurality of images.

8. The system of claim 1, wherein the at least one determined characteristic of the target vehicle includes a position of the target vehicle on the road forward of the host vehicle.

9. The system of claim 1, wherein the at least one determined characteristic of the target vehicle includes a velocity of the target vehicle relative to the host vehicle.

10. The system of claim 1, wherein the at least one determined characteristic of the target vehicle includes a predicted trajectory of the target vehicle.

11. The system of claim 1, wherein the determined navigation action for the host vehicle includes changing a rate of acceleration.

12. The system of claim 1, wherein the determined navigation action for the host vehicle includes a steering action of the host vehicle.

13. The system of claim 1, wherein the instructions when executed by the circuitry further cause the at least one processing device to predict a navigational action of the target vehicle based on a determined lane mark type.

14. The system of claim 13, wherein the predicted navigational action of the target vehicle includes a lane merge.

15. The system of claim 1, wherein the at least one identified lane mark includes a split lane.

16. The system of claim 1, wherein the instructions when executed by the circuitry further cause the at least one processing device to detect a distance of the at least one identified lane mark to a reference point.

17. The system of claim 16, wherein the reference point includes at least one other lane mark of the road.

18. The system of claim 1, wherein the instructions when executed by the circuitry further cause the at least one processing device to detect a split of the at least identified lane mark into another lane mark.

19. A method for navigating a host vehicle, the method comprising:
  receiving a plurality of images acquired by an image capture device, the plurality of images being representative of an environment of the host vehicle;
  analyzing, by at least one processing device, at least one of the plurality of images to identify a target vehicle traveling in a lane of a road;
  analyzing at least one of the plurality of images to identify at least one lane mark associated with the lane in which the target vehicle is traveling;
  determining at least one characteristic of the target vehicle based on at least one of the plurality of images, wherein the at least one determined characteristic of the target vehicle includes a detected motion of the target vehicle relative to the at least one identified lane mark; and
  determining a navigational action for the host vehicle based on the determined characteristic of the target vehicle.

20. The method of claim 19, wherein the at least one identified lane mark includes a merge lane.

21. The method of claim 19, wherein the instructions when executed by the circuitry further cause the at least one processing device to detect a distance of the at least one identified lane mark to a reference point.

22. The method of claim 21, wherein the reference point includes at least one other lane mark of the road.

23. The method of claim 19, further comprising detecting an intersection of the at least one identified lane mark with at least one other lane mark of the road.

24. The method of claim 19, further comprising detecting a change in lateral distances between the at least one identified lane mark and at least one other lane mark of the road.

25. The method of claim 19, wherein determining at least one characteristic of the target vehicle includes analyzing at least one of the plurality of images.

26. The method of claim 19, wherein the at least one determined characteristic of the target vehicle includes a position of the target vehicle on the road forward of the host vehicle.

27. The method of claim 19, wherein the at least one determined characteristic of the target vehicle includes a velocity of the target vehicle relative to the host vehicle.

28. The method of claim 19, wherein the at least one determined characteristic of the target vehicle includes a predicted trajectory of the target vehicle.

29. The method of claim 19, wherein the determined navigation action for the host vehicle includes changing a rate of acceleration.

30. The method of claim 19, wherein the determined navigation action for the host vehicle includes a steering action of the host vehicle.

31. The method of claim 19, further comprising predicting a navigational action of the target vehicle based on a determined lane mark type.

32. The method of claim 31, wherein the predicted navigational action of the target vehicle includes a lane merge.

33. The method of claim 19, wherein the at least one identified lane mark includes a split lane.

34. The method of claim 19, further comprising detecting a distance of the at least one identified lane mark to a reference point.

35. The method of claim 34, wherein the reference point includes at least one other lane mark of the road.

36. The method of claim 19, further comprising detecting a split of the at least identified lane mark into another lane mark.

37. A non-transitory computer-readable medium storing instructions executable by at least processor to perform a method for navigating a host vehicle, the method comprising:
  receiving a plurality of images acquired by an image capture device, the plurality of images being representative of an environment of the host vehicle;
  analyze at least one of the plurality of images to identify a target vehicle traveling in a lane of a road;
  analyze at least one of the plurality of images to identify at least one lane mark associated with the lane in which the target vehicle is traveling;
  determine at least one characteristic of the target vehicle based on at least one of the plurality of images, wherein the at least one determined characteristic of the target vehicle includes a detected motion of the target vehicle relative to the at least one identified lane mark; and
  determine a navigational action for the host vehicle based on the determined at least one characteristic of the target vehicle.

* * * * *